United States Patent
Hotta et al.

(10) Patent No.: US 6,275,902 B1
(45) Date of Patent: Aug. 14, 2001

(54) DATA PROCESSOR WITH VARIABLE TYPES OF CACHE MEMORIES AND A CONTROLLER FOR SELECTING A CACHE MEMORY TO BE ACCESS

(75) Inventors: Takashi Hotta; Toshihiko Kurihara, both of Hadano; Shigeya Tanaka, Hitachi; Hideo Sawamoto, Machida; Akiyoshi Osumi, Hitachi; Koji Saito, Hadano; Kotaro Shimamura, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/188,693

(22) Filed: Nov. 10, 1998

Related U.S. Application Data

(63) Continuation of application No. 08/281,002, filed on Jul. 27, 1994, now Pat. No. 5,848,432.

(30) Foreign Application Priority Data

Aug. 5, 1993 (JP) .................................................. 5-194482
Sep. 28, 1993 (JP) .................................................. 5-240937

(51) Int. Cl.$^7$ ............................................................ G06F 12/08
(52) U.S. Cl. ............................................. 711/129; 711/120
(58) Field of Search .................................... 711/119, 120, 711/121, 122, 123, 129, 131, 133, 137

(56) References Cited

U.S. PATENT DOCUMENTS

| 5,185,878 | 2/1993 | Baror et al. ............................ 395/450 |
| 5,226,133 | 7/1993 | Taylor et al. ........................... 395/417 |
| 5,375,216 | 12/1994 | Moyer et al. .......................... 395/450 |
| 5,404,484 | 4/1995 | Schlansker et al. .................. 395/460 |
| 5,561,781 | 10/1996 | Braceras et al. ...................... 395/458 |
| 5,822,757 | * 10/1998 | Chi ....................................... 711/129 |

FOREIGN PATENT DOCUMENTS 0496439   7/1992   (EP) .

OTHER PUBLICATIONS

Intel, "Intel 386 DX Microprocessor Hardware Reference Manual", 1991, pp. 7–3 to 7–8 and 7–20 to 7–22.
Hennessay et al, "Computer Architecture A. Quatitative Approach", 1990, pp. 460–465.

* cited by examiner

*Primary Examiner*—Kevin L. Ellis
(74) *Attorney, Agent, or Firm*—Antonelli, Terry, Stout & Kraus, LLP

(57) ABSTRACT

A data processor has a first cache memory with a large capacity and one port and a second cache memory with a small capacity and two ports disposed between a main memory and an instruction processing section. Data which is frequently used is stored in the first cache memory and data which is less frequently used is stored in the second cache memory under control of a controller responsive to prefetch instructions. One of the cache memories may be a set associative cache memory composed of a plurality of memory chips each having at least two memory banks and an output part to gain access to data sets consecutively and one at a time within the memory banks. On the basis of an address sent from the instruction processing section, a memory bank is selected, and a data set from the selected memory bank is supplied to the processing section.

2 Claims, 43 Drawing Sheets

FIG. 13

| CLASSIFICATION | MNEMONIC | EXPLANATION |
|---|---|---|
| LOGICAL OPERATION | AND A, B, C | $R(A) \cap R(B) \rightarrow R(C)$ |
| | OR A, B, C | $R(A) \cup R(B) \rightarrow R(C)$ |
| | NOT A, C | $\overline{R(A)} \rightarrow R(C)$ |
| ARITHMETIC OPERATION | ADD A, B, C | $R(A) + R(B) \rightarrow R(C)$ |
| | SUB A, B, C | $R(A) - R(B) \rightarrow R(C)$ |
| BRANCH | BRA d | $PC + d \rightarrow PC$ |
| MEMORY REFERENCE INSTRUCTION | LD A, B, C | $M(R(A) + R(B)) \rightarrow R(C)$ |
| | ST A, B | $R(A) \rightarrow M(R(B))$ |
| | PF1 A, B | $M(R(A) + R(B)) \rightarrow$ FIRST CACHE MEMORY |
| | PF2 A, B | $M(R(A) + R(B)) \rightarrow$ SECOND CACHE MEMORY |

R(A) $\cdots$ REGISTER A    M(X) $\cdots$ MEMORY OF ADDRESS X

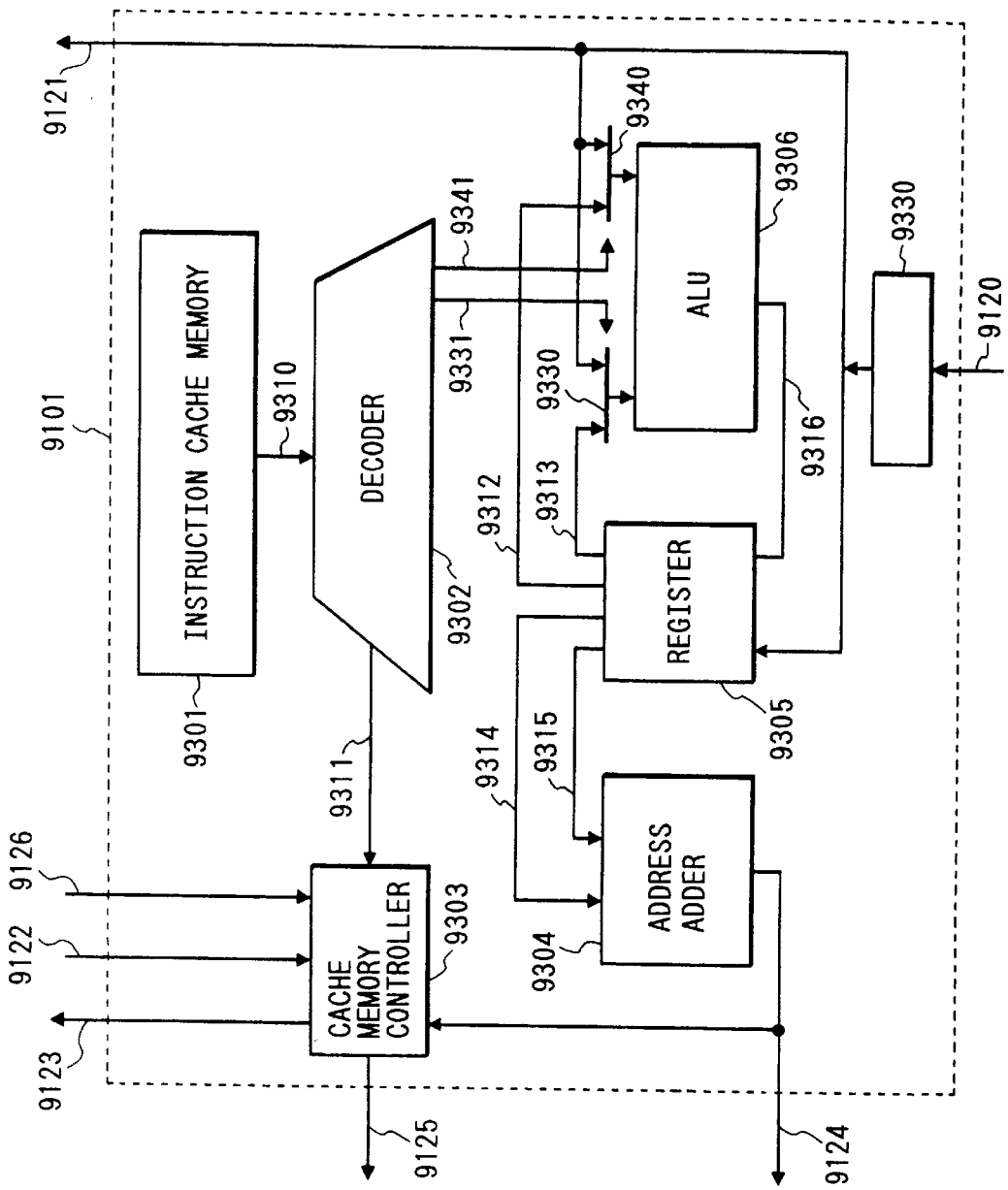

FIG. 37

| | A STAGE | R STAGE |
|---|---|---|
| INSTRUCTION 1 (LD) | MISS (1) HIT (2) | |
| INSTRUCTION 2 (LD) | HIT (2) | |
| INSTRUCTION 3 (LD) | MISS (1) HIT (2) | |
| INSTRUCTION 4 (LD) | MISS (2) | HIT (1) |
| INSTRUCTION 5 (LD) | HIT (1) MISS (2) | |
| INSTRUCTION 6 (LD) | HIT (2) | |
| INSTRUCTION 7 (LD) | HIT (1) MISS (2) | |
| INSTRUCTION 8 (LD) | MISS (2) | HIT (1) |

Instruction 1: IF D E A W
Instruction 2: IF D E A W
Instruction 3: IF D E A R W
Instruction 4: IF D E A R W
Instruction 5: IF D E X A W
Instruction 6: IF D E X A W
Instruction 7: IF D X E A R W
Instruction 8: IF D X E A R W

FIG. 50(a)

|  | A STAGE | R STAGE |
|---|---|---|
| INSTRUCTION 1 (LD1) | HIT (1) |  |
| INSTRUCTION 2 (LD2) | HIT (2) |  |
| INSTRUCTION 3 (LD1) | HIT (1) |  |
| INSTRUCTION 4 (LD2) | MISS (2) | HIT (1) |
| INSTRUCTION 5 (LD1) | MISS (1) | HIT (2) |
| INSTRUCTION 6 (LD2) | HIT (2) |  |
| INSTRUCTION 7 (LD1) | MISS (1) | HIT (2) |
| INSTRUCTION 8 (LD2) | MISS (2) | HIT (1) |

FIG. 50(b)

|  | A STAGE | R STAGE |
|---|---|---|
| INSTRUCTION 1 (LD2) | HIT (2) |  |
| INSTRUCTION 2 (LD1) | HIT (1) |  |
| INSTRUCTION 3 (LD2) | MISS (2) | HIT (1) |
| INSTRUCTION 4 (LD1) | HIT (1) |  |
| INSTRUCTION 5 (LD2) | HIT (2) |  |
| INSTRUCTION 6 (LD1) | MISS (1) | HIT (2) |
| INSTRUCTION 7 (LD2) | MISS (2) | HIT (1) |
| INSTRUCTION 8 (LD1) | MISS (1) | HIT (2) |

FIG. 51

| INSTRUCTION TYPE | MNEMONIC | DESCRIPTION |
|---|---|---|
| LOGICAL OPERATION | AND A, B, C | R(A) ∩ R(B) → R(C) |
| | OR A, B, C | R(A) ∪ R(B) → R(C) |
| | NOT A, C | $\overline{R(A)}$ → R(C) |
| ARITHMETIC OPERATION | ADD A, B, C | R(A) + R(B) → R(C) |
| | SUB A, B, C | R(A) − R(B) → R(C) |
| BRANCHING | BRA d | PC + d → PC |
| MEMORY REFERENCE | LD1 A, B, C | M(R(A) + R(B)) → R(C)<br>(IT IS QUITE PROBABLE THAT FIRST CACHE MEMORY WILL HAVE DATA) |
| | LD2 A, B, C | M(R(A) + R(B)) → R(C)<br>(IT IS QUITE PROBABLE THAT SECOND CACHE MEMORY WILL HAVE DATA) |
| | ST1 A, B | R(A) → M(R(B))<br>(IT IS QUITE PROBABLE THAT FIRST CACHE MEMORY WILL HAVE DATA) |
| | ST2 A, B | R(A) → M(R(B))<br>(IT IS QUITE PROBABLE THAT SECOND CACHE MEMORY WILL HAVE DATA) |
| | PF1 A, B | M(R(A) + R(B)) → FIRST CACHE MEMORY |
| | PF2 A, B | M(R(A) + R(B)) → SECOND CACHE MEMORY |

R(A) ··· REGISTER A     M(X) ··· MEMORY OF ADDRESS X

DATA PROCESSOR WITH VARIABLE TYPES OF CACHE MEMORIES AND A CONTROLLER FOR SELECTING A CACHE MEMORY TO BE ACCESS

This is a continuation of application Ser. No. 08/281,002, filed Jul. 27, 1994 now U.S. Pat. No. 5,848,432.

FIELD OF THE INVENTION

The present invention relates to a data processor having a cache memory, and more particularly to a software prefetch for efficiently using two types of cache memories and set associative control for most favorably controlling the access of the set associative cache memories. Moreover, the present invention relates to a data processor having a controller for these operations.

BACKGROUND OF THE INVENTION

In general, a computer having a cache memory stores data to be frequently used in a small-capacity high-speed cache memory as a copy of part of the data stored in a large-capacity low-speed main memory, so that an instruction unit, such as a CPU, may make a high-speed data access to the cache memory for frequently used data and accesses to the main memory only when the desired data is not present in the cache memory.

However, because the machine cycle of the CPU is significantly shorter compared with that of the main memory, the penalty in the case of a cache miss (the time until requested data is obtained from the main memory) increases.

A method called software prefetch for solving the above problem is described in David Callhan et al., "Software Prefetching" Fourth International Conference on Architectural Support for Programming Languages and Operating Systems, 1991, pp. 40–52. In the method described in this first publication, an address is computed by a prefetch instruction before an instruction unit requires data, the address is checked to see if data indicated by the address is present in the cache memory, and if not, the data is transferred from the main memory to the cache memory. Therefore, it is possible to improve the hit ratio of the cache memory and minimize the penalty because data is previously stored in the cache memory by the prefetch instruction whenever data is required.

A cache memory comprising two buffers with different purposes, which are properly used by hardware is disclosed in Japanese Patent Laid-Open No. 303248/1992

In this second publication, the cache memory has an S buffer and a P buffer. The S buffer stores data to be accessed frequently over time. The P buffer stores data of which the addresses to be referenced from now on by the program are close to the currently referenced address, i.e. the P buffer stores the array data to be accessed in the array computation. Either one of the two buffers may be used selectively depending on the addressing mode in effect and on the type of register being used for the address calculation.

In general, a computer stores instructions or data to be frequently called and processed by a processor in a high-speed small-capacity memory, called a cache memory, as a copy of part of the instructions or data stored in a comparatively low-speed large-capacity main memory. Thus, the computer operation speed is increased. A data access system for such a cache memory includes a direct-mapped memory and a set associative memory.

The direct mapping system is used for accessing a cache memory by directly outputting data or an instruction stored in an address designated by a processor or the like and storing it in the designated address.

The set associative memory is used for accessing a plurality of sets of data values or a plurality of instructions (called a data set) in a cache memory having a plurality of sets, each of which comprises a plurality of memories common in allocation of addresses. A plurality of accessed sets of data values or a plurality of accessed instructions required are selected and processed in the processor.

FIG. 17 shows a schematic view of a data processor having a two-set associative cache memory according to a third conventional arrangement. In FIG. 17, symbol 9201 represents a CPU, 9202 to 9217 represent 8-bit output universal memories, 9218 represents an address bus, 9219 represents a 64-bit data bus of a first set, and 9220 represents a 64-bit data bus of a second set. The universal memories are used as data arrays of the two-set associative cache memory. The memories 9202 to 9209 are used as the data array of the first set and the memories 9210 to 9217 are used as the data array of the second set.

When an address designated by the CPU is sent to memories through the address bus, two sets of data values each having a width of 64 bits are outputted to the CPU through a respective data bus.

To constitute a set associative cache memory having m sets of data values with the width of n bits by using k-bit output memories, "n×m/k" memory chips are necessary in general. In the case of the above-described third conventional arrangement, 16 memories are necessary because n equals 64, m equals 2, and k equals 8.

The method described in first publication has the problem that an expensive two-port cache memory must be used in order to process transfer of data from the main memory to the cache memory and a memory referencing instruction sent from the instruction unit at the same time. Unless simultaneous processing is carried out, it is possible to use a generally-used one-port cache memory. In this case, however, a lot of processing time is required and the feature of software prefetch cannot effectively be used.

Moreover, the method described in the first publication has the additional problem that, when data, which is read from a cache memory only once and is immediately expelled from the cache memory, is held in the cache memory, the cache memory is filled with useless data and the hit ratio decreases.

These problems frequently occur in a program for handling large-scale data exceeding the capacity of a cache memory.

The arrangement described in the second publication has the problem that, because a cache memory for storing data between two cache memories is determined by an address designation system and a register used for address computation, two cache memories must properly be used for considering data characteristics including data size.

It is the first object of the present invention to provide a data processor for solving the above problems, which is capable of quickly and efficiently processing small-capacity frequently accessed data stored in a cache memory and large-scale data exceeding the capacity of the cache memory, and which is also capable of lessening the contamination of the cache memory and improving the hit ratio.

The third conventional arrangement described with reference to FIG. 17 has a problem that, when the number of sets of set associative cache memories increases, or the data bit width increases and the number of memories for constituting the cache memories increases, the cache memory cost increases.

When the number of memories increases, problems occur in that the address bus fan-out, address bus length, and data bus length increase, the cache memory access time increases, and the machine cycle of the entire data processor cannot be shortened.

When the number of sets increases, problems occur in that a number of data buses equivalent to the number of sets is required and the number of pins of the CPU increases. That is, a problem occurs in that it is impossible to meet the restriction on the number of pins of a package in the case of one chip.

It is the second object of the present invention to provide a set associative cache memory comprising a smaller number of memories.

SUMMARY OF THE INVENTION

To achieve the above first object, the present invention involves the use of a first cache memory with a large capacity and one port and a second cache memory with a small capacity and two ports disposed between a main memory and an instruction processing section, and a control section controlled by a prefetch instruction to store data to be frequently accessed in the first cache memory and data to be less frequently accessed in the second cache memory.

Because data to be frequently accessed is stored in the first cache memory, the hit ratio is improved. Moreover, because data to be less frequently accessed is not stored in the first cache memory, the storing of useless data in the first cache memory can be lessened.

Because data to be less frequently used is stored in the second cache memory, the data can be removed from the second cache memory after it is processed. That is, because data to be always accessed is stored in the second cache memory, though the capacity of the second cache memory is small, the hit ratio can be improved.

Moreover, because the second cache memory has two ports, efficient processing is realized by simultaneously processing the transfer of large-scale data to be less frequently accessed from the main memory and the memory referencing instruction sent from the instruction unit.

Furthermore, because it is sufficient to provide only a small-capacity second cache memory with the function for simultaneously processing a data transfer from the main memory and the memory referencing instruction sent from the instruction unit, it is possible to decrease the hardware volume and the cost.

To achieve the above second object, the present invention provides a processor for processing instructions or data; a set associative cache memory comprising a plurality of memory chips each of which includes m (m is an integer equal to or larger than 2) sets of memory bank regions and an output section for sequentially accessing data sets one by one out of the above m sets of memory bank regions; a set judging section for generating a selection signal for selecting a memory bank region out of the above m sets of memory bank regions in accordance with an address sent from the processor; a set selecting section for outputting a data set selected by the selection signal out of the data sets to be sequentially accessed from the set associative cache memory to the processor; an address bus connected between the set associative cache memory and the processor to transfer an address for designating data from the processor; a first data bus connected between the set associative cache memory and the set selecting section to access the data sets; and a second data bus connected between the set selecting section and the processor to access the selected data set.

The above-described constitution makes it possible to decrease the number of memories to 1/m, as small as the existing number of memories, because m sets of memory bank regions are present in one memory chip.

Because the number of memories decreases, it is possible to decrease the loads on the address bus and the data bus, to access the cache memory at a high speed, and to shorten the machine cycle.

Moreover, because data sets are sequentially outputted from one memory chip one by one, only one data bus is required. Therefore, it is possible to decrease the number of pins and the load of the CPU.

BRIEF DESCRIPTION OF THE DRAWINGS

These and other objects, features, and advantages of the present invention will be understood more clearly from the following detailed description with reference to the accompanying drawings, wherein

FIG. 13 is a table for explaining types of instructions;

FIG. 27 is a schematic block diagram of a second embodiment of the processor 9101 in FIG. 16;

FIG. 37 is a diagram for explaining the pipeline operation in effect when the data processor in FIG. 34 executes instructions;

FIGS. 50(a) and 50(b) are diagrams for explaining the pipeline operation in effect when the data processor of in FIG. 49 executes instructions; and FIG. 51 is a table for explaining the types of instructions to be processed by the data processor in FIG. 49.

DESCRIPTION OF THE PREFERRED EMBODIMENTS

Figure 1:
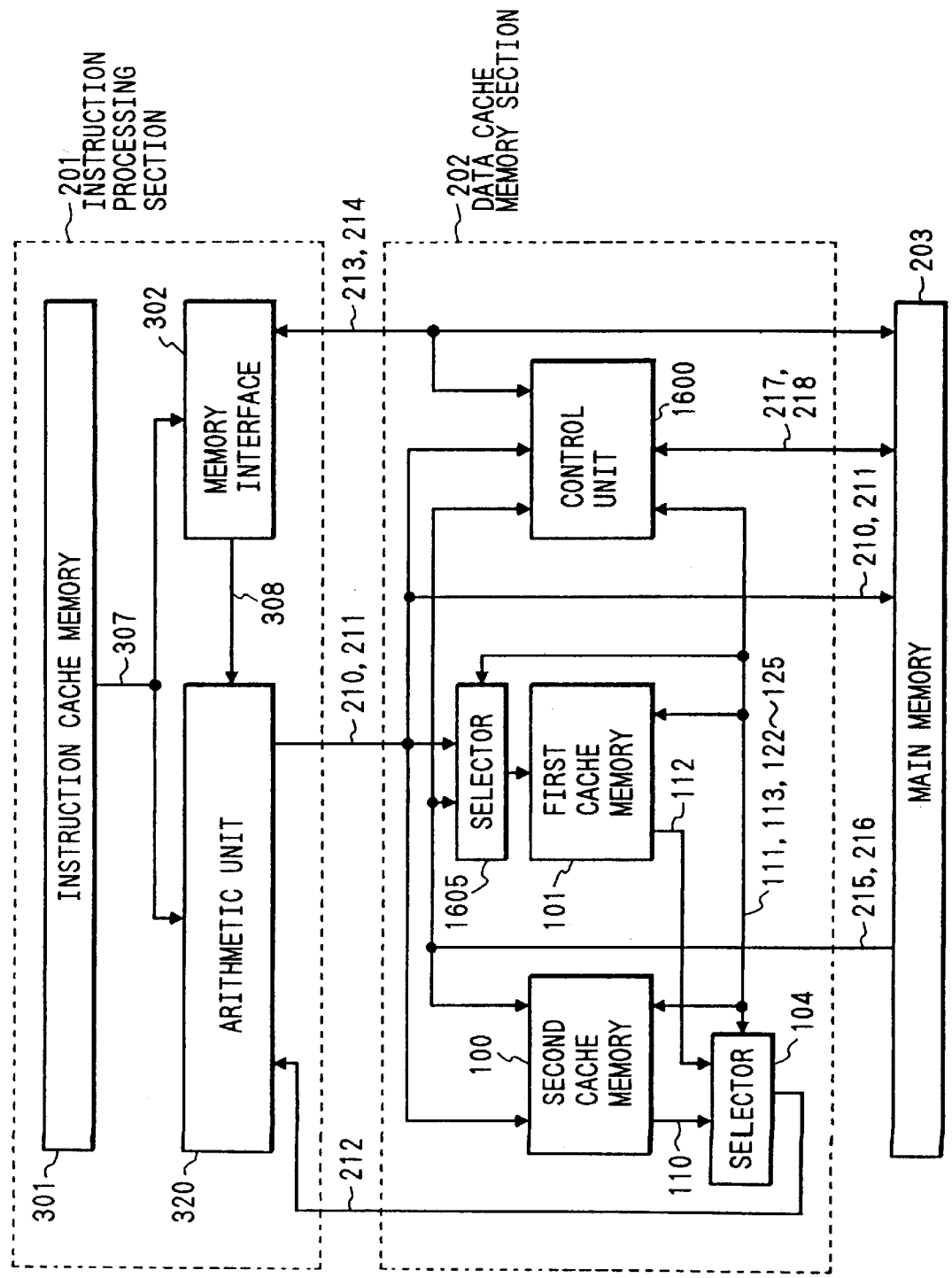
FIG. 1 is a schematic block diagram of an embodiment of the present invention.

FIG. 1 shows a schematic view of the present invention.

The computer of the present invention comprises an instruction unit 201, a memory unit 202, and a main memory 203.

The instruction unit 201 uses, for example, a CPU for performing operations and control.

The memory unit 202 comprises a control section comprising a first cache memory 101, a second cache memory 100, selectors 104 and 1605 for transferring data to and from these memories, and a control unit 1600.

The main memory 203 is a memory for storing instructions and data.

The first cache memory 101 is a one-port cache memory having a capacity larger than that of the second cache memory 100.

The second cache memory 100 is a two-port cache memory having a capacity smaller than that of the first cache memory 101.

The instruction unit 201 is a unit for processing instructions, which transfers data to and from the first cache memory 101 and the second cache memory 100 through buses 210, 211, and 212. That is, the unit 201 transmits an address, data, and a control signal to the memory unit 202 and main memory 203 through the address bus 210, four-byte-width write data bus 211, and control signal line 213.

The memory unit 202 transmits data and a wait signal to the instruction unit 201 through the four-byte-width read data bus 212 and a wait signal line 214 and a request signal to the main memory 203 through a request signal line 218.

The main memory 203 transmits data to the first cache memory 101 and the second cache memory 100 through buses 215 and 216. That is, the main memory 203 transmits data, an address, and a response signal to the memory unit 202 through the transfer address bus 216 and a response signal line 217.

Figure 12:
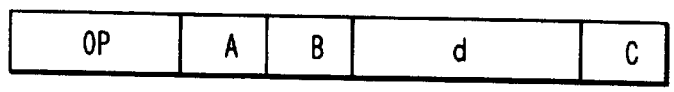
FIG. 12 is a diagram for explaining an instruction format.

FIG. 12 is an illustration for explaining a format of the operation code of an instruction processed by the instruction unit 201 in FIG. 1. In FIG. 12, symbol OP represents an operation code, A and B represent fields for designating a source register, C represents a field for designating a target register, and d represents a field for showing immediate data.

FIG. 13 is an illustration showing types of instructions processed by the instruction unit 201 in FIG. 1. Though the number of instructions is restricted to ten in this embodiment for easy understanding, this is not to be construed as a restriction on the present invention. The present invention can also be applied to a computer having several tens of instructions to more than one hundred instructions similar to a normal processor.

Instructions AND, OR, ADD, and SUB perform operations corresponding to the source registers A and B and store data in the target register C.

The instruction NOT stores the negation of bits in the source register A into the target register C.

The branch instruction BRA adds the immediate data d to the program counter PC and stores it in the program counter PC.

The load instruction LD stores read data in the register C by using the sum of the contents of the register A and those of the register B as an address.

The store instruction ST writes the contents of the register s by using the contents of the register A as an address.

A prefetch instruction is described below.

The prefetch instruction PF1 checks if data corresponding to the first cache memory 101 and the second cache memory 100 is present by using the sum of the contents of the register A and those of the register B as an address. If not successful, the instruction PF1 transfers data to the first cache memory 101 from the main memory 203.

The prefetch instruction PF2 has the same functions as PF1 except that PP2 writes transferred data in the second cache memory 100.

Though described in detail later, the first cache memory 101 is a cache memory having a capacity of 1 M bits and a block size of 16 bytes using the direct map system.

The direct map system is a system in which a place for storing data in a cache memory is uniquely determined by an address of a memory.

The second cache memory 100 is a cache memory with a block size of 4 bytes and 64 entries using the full associative system.

The full associative system is a system for storing data of optional address of a memory in an optional storing place of a cache memory. The instruction PF1 is used to prefetch data to be probably reused and the instruction PF2 is used to prefetch data not to be reused.

A compiler judges whether to reuse the data when generating an object code. For example, when accessing large-scale data exceeding the capacity of a cache memory, the compiler uses the instruction PF2 by judging that the data will not be reused even if the data to be stored in the cache memory.

Though the first cache memory 101 has a capacity of 1 M bits, which is larger than that of the second cache memory, the entire size of the cache memory 101 is not very large and the cache memory 101 operates at a high speed because it has one port.

The second cache memory 100 uses the full associative system and processes the memory referencing instruction sent from the instruction unit 1 and the transfer of the data sent from the main memory 203 at the same time. Therefore, though the cell structure is complicated, the entire size of the cache memory 100 is small, and moreover, the operation speed of it can be increased because the cache memory 100 has only sixty-four entries.

The second cache memory 100 is used to store data not to be reused by the instruction PF2. Therefore, because the cache memory 100 only temporarily stores data transferred from the main memory 203 by the instruction PF2, but not used yet by the instruction LD, it has a high hit ratio, though its capacity is small and the performance of it can be improved.

When executing a load instruction, the instruction unit 201 sends the address of data to be loaded to the address bus 210 and designates the load instruction by the control signal 213. When data corresponding to a cache memory in the memory unit 202 is present, the memory unit 202 reads the data and sends it to the data bus 212. Unless the data is present, the memory unit 202 transmits the wait signal 214 to the instruction unit 201 and sets the request signal 218, for requesting the main memory 203 to transfer the data, to '1'. When receiving the signal 218, the main memory 203 reads the data, sends the data to the transfer data bus 215, and returns the response signal 217 to the memory unit 202. The memory unit 202 writes the data in a stored cache memory, reads the data to the instruction unit 201 to send it through the data bus 212, and sets the wait signal 214 to '0'.

When executing a store instruction, the instruction unit 201 sends a write address to the address bus 210 and data to be written to the write data bus 211 to send the data to the memory unit 202, main memory 203, and input/output unit 204. In the case of this embodiment, data is written in both the cache memory 100 or 101 and the main memory 203 (write-through) for easy understanding. Even if the cache memory makes a mistake when writing the data, the data is not transferred from the main memory 203 to the cache memory. When data is written in a data space, the memory unit 202 writes the data sent from the write data 211 in the cache memory if the cache memory hits and the main memory 203 also writes the same data in the main memory.

Symbol 301 represents an instruction cache memory, 320 represents an arithmetic unit, and 302 represents a memory interface. The instruction cache memory 301 converts an instruction into a signal 307 and sends the signal 307 to the arithmetic unit 320 and memory interface 302. When executing the instructions LD, ST, PF1, and PF2, the memory interface 302 sends the control signal 213 and receives the signal 214. When the wait signal 214 is set to '1', the interface 302 transmits the signal 308 to the arithmetic unit 320 and stops the pipeline operation until the wait signal 214 comes to '0'. Symbol 1600 represents a control unit and 1605 and 104 represent selectors. The control unit 1600 transfers the control signals 213, 214, 217, and 218 to and from the memory interface 302 and main memory 203 and controls the selector 1605, second cache memory 100, and first cache memory 101 by the signals 111, 113, and 122 to 125. The selector 104 selects correct data out of the data sent through the data bus 110 close to the second cache memory 100 and the data sent though the data bus 112 close to the first cache memory 101 and sends the selected data to the instruction unit 201 as the signal 212. Because the first cache memory 101 has only one port, it is only able to sequentially process the access from the main memory 203 and the access from the instruction unit 201. The control unit 1600 decides which one accesses the first cache memory 101 by way of the selector 1605.

Figure 3:
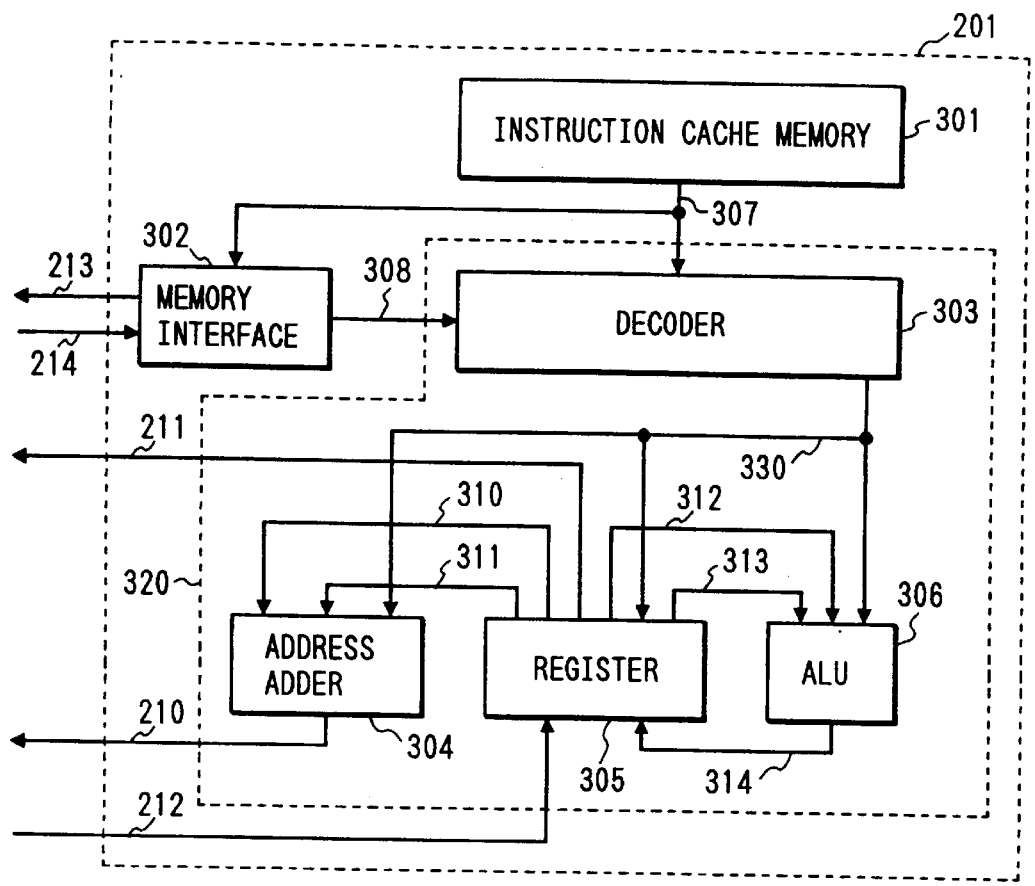
FIG. 3 is a schematic block diagram of the instruction unit 201 in FIG. 2.

FIG. 3 shows a constitution of the instruction un it 201 in FIG. 1. In FIG. 3, symbol 301 represents an instruction cache memory, 303 represents a decoder, 302 represents a memory interface, 305 represents a register, 306 represents an ALU, and 304 represents an address adder. The instruction cache memory 301 transmits an instruction to the decoder 303 and memory interface 302 through a bus 307. The decoder 303 decodes the received instruction and controls the register 305, ALU 306, and address adder 304 by a signal 330. The ALU 306 receives data from the register 305 through buses 312 and 313, operates on the data, and writes the operation result in the register 305 through a bus 314. The address adder 304 reads data from the register 305 through buses 310 and 311, adds the read data values, and transmits the result to the bus 210 as an address to be loaded or stored. To store the result, data to be stored is read from the register 305 and transmitted to the bus 211. To load the result, the adder 304 receives read data through the bus 212 and writes it in the register 305.

The memory interface 302 outputs the control signal 213 when executing the instructions LD, ST, PF1, and PF2 and receives the signal 214. When the wait signal 214 is set to '1', the interface 302 transmits the signal 308 to the decoder 303 and stops the pipeline operation until the wait signal 214 comes to '0'.

Figure 4:
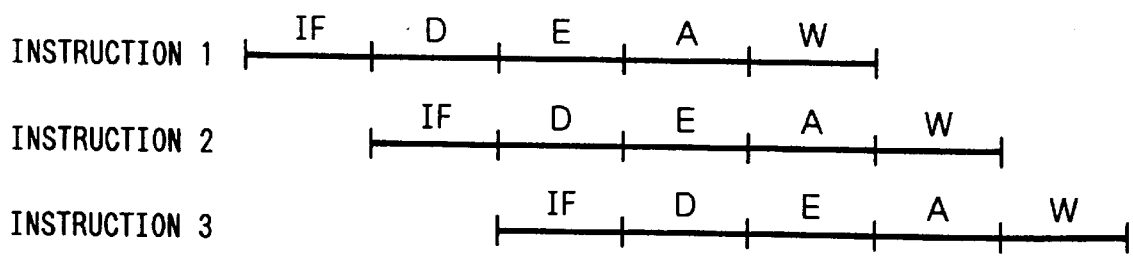
FIG. 4 is a diagrammatic illustration for explaining a pipeline.

FIG. 4 shows an illustration for explaining the processing by the pipeline. In FIG. 4, symbol IF represents an instruction read stage, D represents a decode stage, E represents an operation and address addition stage, A represents a cache memory access stage, and W represents a register write stage. When a load instruction is executed, a cache memory is accessed at the stage A and data read at the stage W is written in the register 305. When a store instruction is executed, a cache memory is checked at the stage A and, if it is hit, data is written in the cache memory at the stage A.

Figure 2:
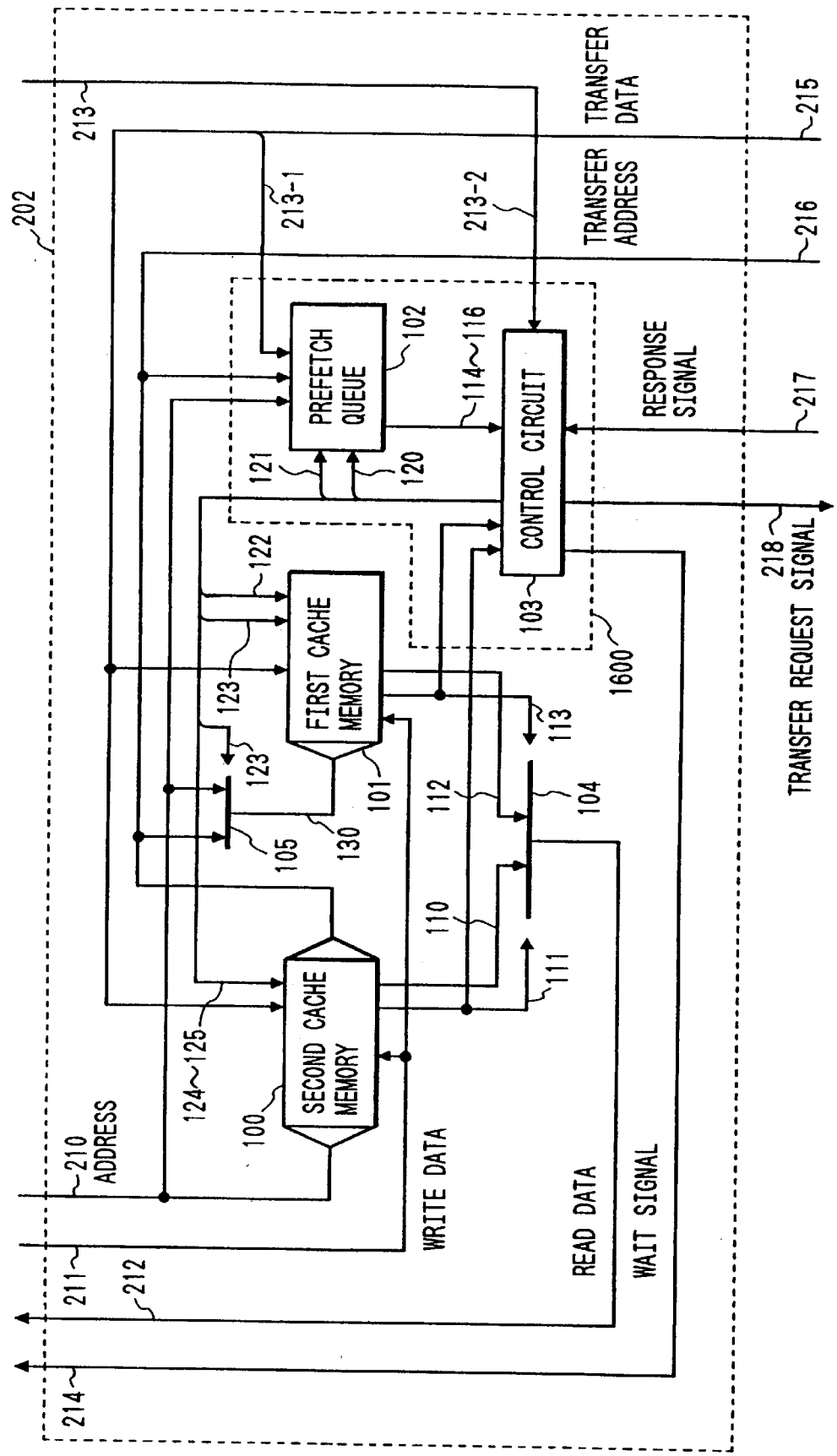
FIG. 2 is a schematic diagram of the memory unit 202 in FIG. 1.

FIG. 2 shows a constitution of the memory unit 202 in FIG. 1. In FIG. 2, symbol 100 represents a second cache memory with a capacity of 1 M bytes and a block size of 16 bytes using the direct map system, 101 represents a cache memory with a capacity of 256 bytes using the full associative system, 102 represents a four-entry prefetch queue, i103 represents a control circuit, and 104 and 105 represent selectors.

The first cache memory 101 receives an address 130, transfer data 215, a select or control signal 123, a write signal 122, and write data 211, and outputs read data 112 and a hit signal 113. The second cache memory 100 receives an address 210, a transfer address 216, transfer data 215, an entry signal 124, a write signal 125, and write data 211, and outputs read data 110 and a hit signal 111. The prefetch queue 102 receives a cache memory selection signal 213-1, a transfer address 216, an address 210, a set signal 120, and a reset signal 121, and outputs a full signal 114, a hit signal 115, and a cache memory selection signal 116.

The control circuit 103 receives a control signal 213-2 from the instruction unit 201; the full signal 114, the hit signal 115, and the cache memory selection sign al 116 from the prefetch queue 102; the response signal 217 from the main memory 203; the hit signal 111 from the second cache memory 100; and the hit signal 113 from the first cache memory 101; and transmits the wait signal 214 to the instruction unit 201; the set signal 120 and the reset signal 121 to the to the prefetch queue 102; the transfer request signal 218 to the main memory 203; the entry signal 124 and the write signal 125 to the second cache memory 100; the write signal 122 and the selector control signal 123 to the first cache memory 101; and the selector control signal 123 to the selector 105.

The selector 104 receives the data 110 and the hit signal 111 from the second cache memory 100 and the data 112 and the hit signal 113 from the first cache memory 101, and reads the data 110 as an output when the hit signal 111 is asserted and the data 110 as an output when the hit signal 113 is asserted to output the data to the data bus 212. The selector 105 selects either of the address 210 and the transfer address 216 in accordance with the control by the selector control signal 123 and transmits it to the first cache memory 101 as an output 130.

The first cache memory 101 reads data from the cache memory in accordance with the contents of the address 130 when the write signal 122 designates a data read operation and outputs the read data 112 and the hit signal 113. When the write signal 122 designates a data write operation, the cache memory 101 writes the transfer data 215 if the selector control signal 123 is set to 1 and the contents of the write data 211 if the signal 123 is set to 0.

The second cache memory 100 checks the contents of the cache memory at the address 210 and outputs the read data 110 and the hit signal 111 when the write signal 125 is negated and designates a data read operation. When the write signal 125 is asserted and designates a data write operation, the cache memory 100 checks the contents of the cache memory and, if it is hit, the cache memory 100 writes the contents of the write data bus 211. When the entry signal 124 is asserted simultaneously with the above operation, the cache memory 100 enters a set consisting of the transfer address 216 and the transfer data 215.

Figure 14:
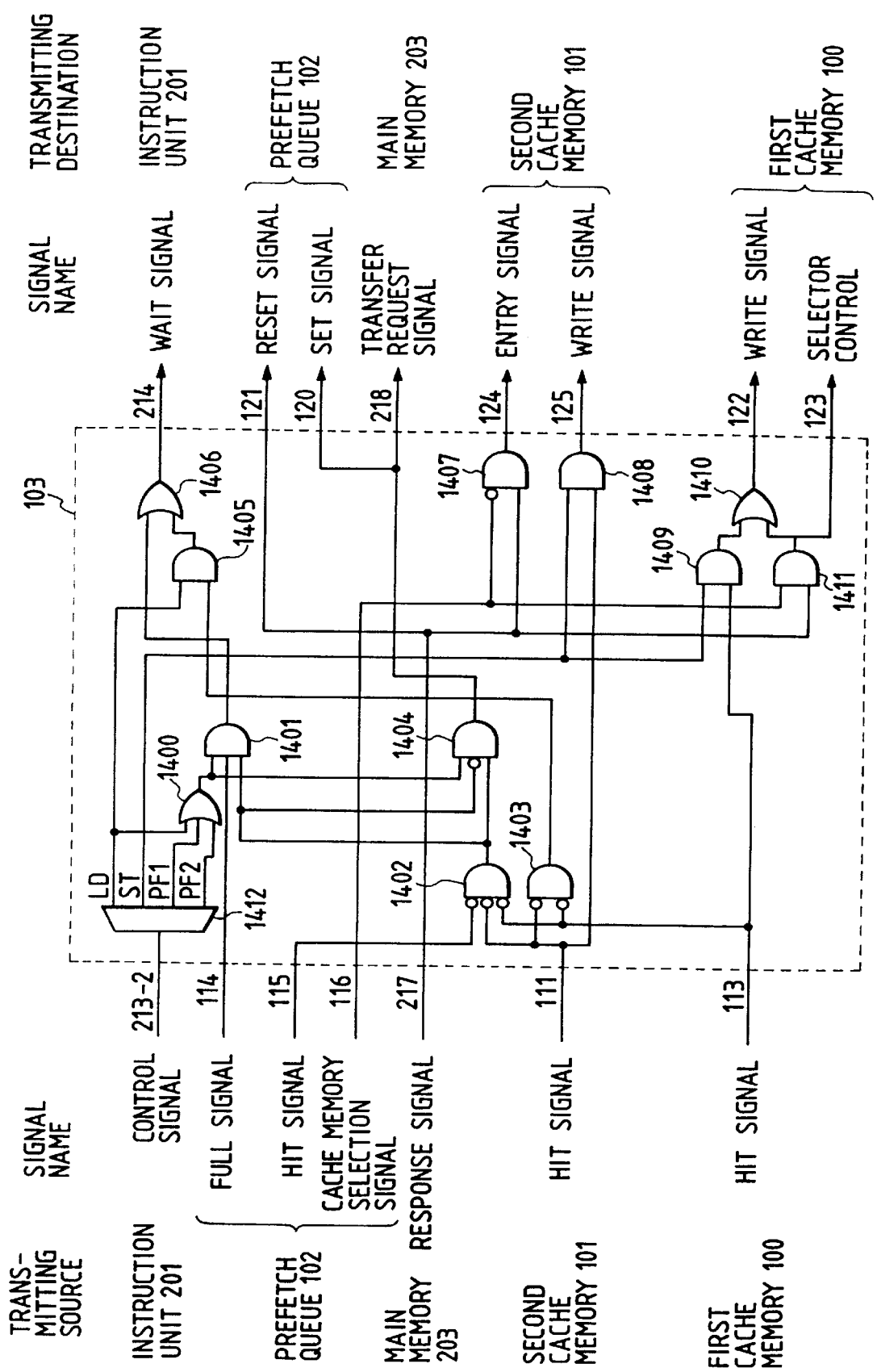
FIG. 14 is a schematic circuit diagram of the control circuit 103 in FIG. 2.

The prefetch queue 102 is a queue for holding the address of the data being transferred from the main memory 203 up to four entries, and enters the contents of the address 210 and set selection signal 213-1 in the queue when the set signal 120 is asserted and outputs the cache memory selection signal 116 corresponding to the transfer address 216 when the reset signal 121 is asserted to negate the entry. Moreover, the queue 102 compares the address 210 with its holding address and asserts the hit signal 115 if the entry is currently transferred from the main memory 203. Moreover, while an address valid for every entry is held, the queue 102 asserts the full signal 114 showing the address. Finally, the operation of the control circuit 103 is described below. FIG. 14 shows details of the control circuit 103. The control circuit 103 decodes the control signal 213-2 and accepts the start of each of the instructions LD, ST, PF1, and PF2. When the instruction LD is under execution and both the hit signal 111 sent from the second cache memory 100 and the hit signal 113 sent from the first cache memory 101 are negated, the circuit 103 asserts the wait signal 214 to make the instruction unit 201 wait while transferring data from the main memory 203 because of errors of both cache memories. When the instructions LD, Pa1, and PF2 are under execution, both the hit signal 111 sent from the second cache memory 100 and the hit signal 113 sent from the first cache memory 101 are negated, and the full signal 114 sent from the prefetch queue 102 is asserted; and, though the hit signal 115 sent from the prefetch queue 102 is also negated, the circuit 103 asserts the wait signal 214 in order to make the instruction unit 201 wait because the prefetch queue 102 is full and therefore no instruction can be loaded in the queue.

When the instruction LD, PF1, or PF2 is under execution, the full signal 114 sent from the prefetch queue 102 is negated, and the hit signal 111 sent from the second cache memory 100 and the hit signal 113 sent from the first cache memory 101 are also negated. Thus, the circuit 103 asserts the transfer request signal 218 to be sent to the main memory 203 and also asserts the set signal 120 to be sent to the prefetch queue 102 to enter them in the prefetch queue 102.

Moreover, when the response signal 217 sent from the main memory 203 is asserted, the circuit 103 asserts the reset signal 121 to be sent to the prefetch queue 102 in order to reset the entry from the prefetch queue 102; and, in order to enter transfer data in a cache memory, the circuit 103 asserts the write signal 122 to be sent to the first cache memory 101 when the cache memory selection signal 116 designates the writing of data in the first cache memory 101 and asserts the entry signal 124 to be sent to the second cache memory 100 when the signal 116 designates the writing of data in the second cache memory 100.

When the instruction ST is under execution and the hit signal 113 sent from the first cache memory 101 is asserted, the circuit 103 asserts the write signal 122 to be sent to the first cache memory 101 in order to write the data showing that the signal 113 is asserted in the first cache memory 101. Similarly, when the instruction ST is under execution and the hit signal 111 sent from the second cache memory 100 is asserted, the circuit 103 asserts the write signal 125 to be sent to the second cache memory 100 in order to write the data showing that the signal 111 is asserted.

Figure 5:
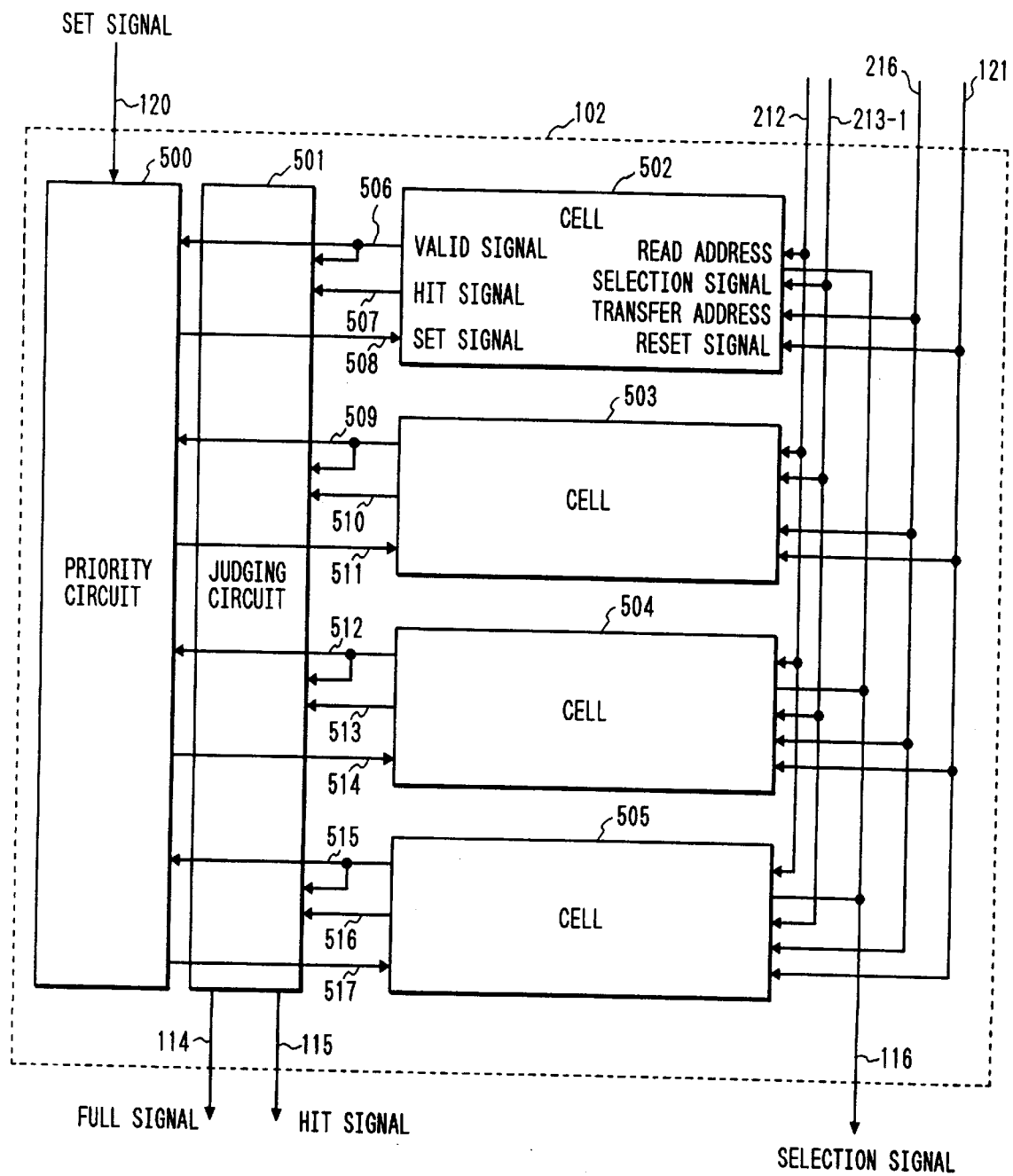
FIG. 5 is a schematic block diagram of the prefetch queue in FIG. 2.

FIG. 5 shows details of the prefetch queue 102 in FIG. 2. In FIG. 5, symbol 500 represents a priority circuit, 501 represents a judging circuit, and 502 to 505 represent cells.

The cells 502 to 505 receive a read address 212, a cache memory selection signal 213-1, a transfer address 216, and a reset signal 121, and output valid signals 506, 509, 512, and 515, hit signals 507, 510, 513, and 516, and a selection signal 116. Moreover, the cells receive set signals 508, 511, 514, and 517.

The priority circuit 500 receives valid signals 506, 509, 512, and 515 from the cells 502 to 505 and the reset signal 120 from the control circuit 103, and transmits the set signals 508, 511, 514, and 517 to the cells 502 to 505.

The judging circuit 501 receives the valid signals 506, 509, 512, and 515 and the hit signals 507, 510, 513, and 516 from the cells 502 to 505 and transmits the full signal 114 and hit signal 115 to the control circuit 103.

Because the cells 502 to 505 all have the same function, the operation of only the cell 502 is described below. The cell 502 stores a register for holding addresses and a cache memory selection bit and its valid bit. When the set signal 508 is asserted, the cell 502 asserts the valid bit and incorporates the contents of the transfer address 216 and those of the cache memory selection signal 213-1 and compares the read address 212 with its holding valid address. When they coincide with each other, the cell 502 transmits a holding corresponding cache memory selection bit to the signal line 116. When the transfer address 216 coincides with a holding address and the reset signal 121 is asserted, the cell 502 negates the valid bit. When the set signal 120 is asserted, the priority circuit 500 checks the valid signals 506, 509, 512, and 515 and selects one of the valid cells to assert the corresponding signals 508, 511, 514, and 517. The highest priority is given to the cell 502 and the lowest priority is given to the cell 505 and the cells are set starting with the cell 502.

The judging circuit 501 asserts the hit signal 115 if there is only one cell in which both the valid signal and hit signal are asserted. When valid signals 506, 509, 512, and 515 are all asserted, the circuit 501 asserts the full signal 114.

Figure 6:
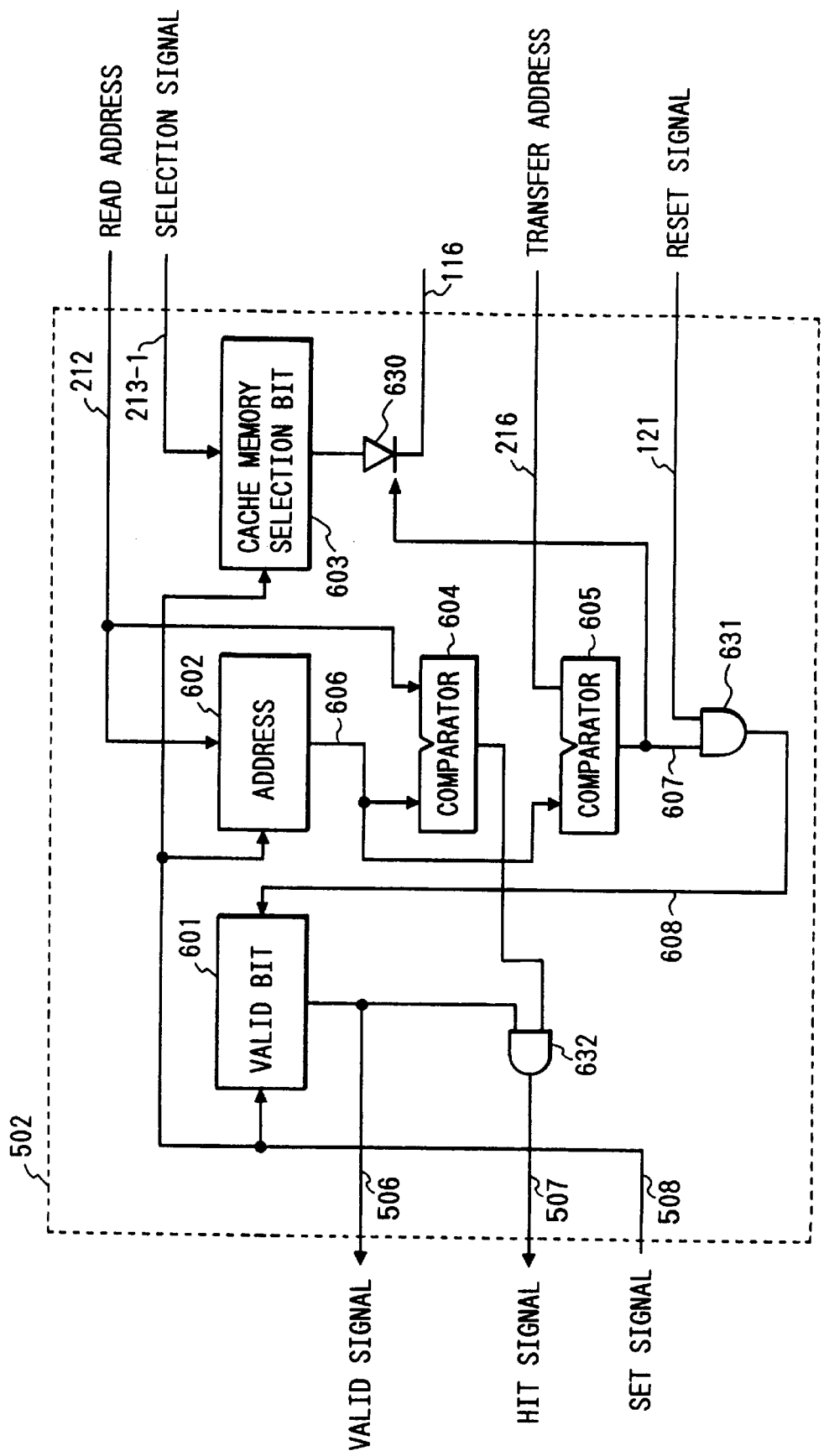
FIG. 6 is a schematic diagram of the cell 502 in FIG. 5.

FIG. 6 shows details of the cell 502 in FIG. 5. In FIG. 6, symbol 601 represents a register for holding a valid bit, 602 represents a register for holding addresses, 603 represents a register for holding cache memory selection bits, 604 and 605 represent comparators, 630 represents a tristate buffer, and 631 and 632 represent AND gates. The valid bit 601 is set when the set signal 508 is asserted and reset when the signal 608 is asserted. The set signal 508 is connected to the valid bit 601, address register 602, and cache memory selection bit 603. When the set signal 508 is asserted, the valid bit 601 is set, the address register 602 incorporates the read address 212, and the cache memory selection register 603 incorporates the cache memory selection signal 213-1. The valid bit transmits its output as the valid signal 506. The comparator 604 compares the address 212 with an output 606 of the address register 602. When they coincide with each other and the valid bit 601 is asserted, the comparator 604 asserts the hit signal 507. The comparator 605 compares the output 606 of the address register 602 with the transfer address 216. When they coincide with each other, the comparator 605 opens the tristate buffer 630 and transmits the contents of the cache memory selection bit register 603 to the signal 116. Moreover, when the reset signal 121 is asserted, the signal 608 is asserted and the valid bit 601 is reset.

Figure 7:
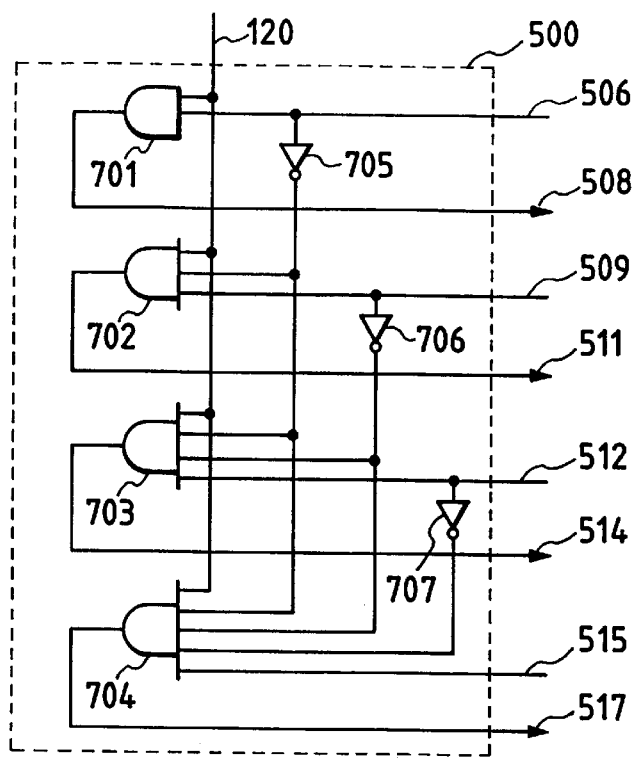
FIG. 7 is a schematic circuit diagram of the priority circuit 500 in FIG. 5.
Figure 8:
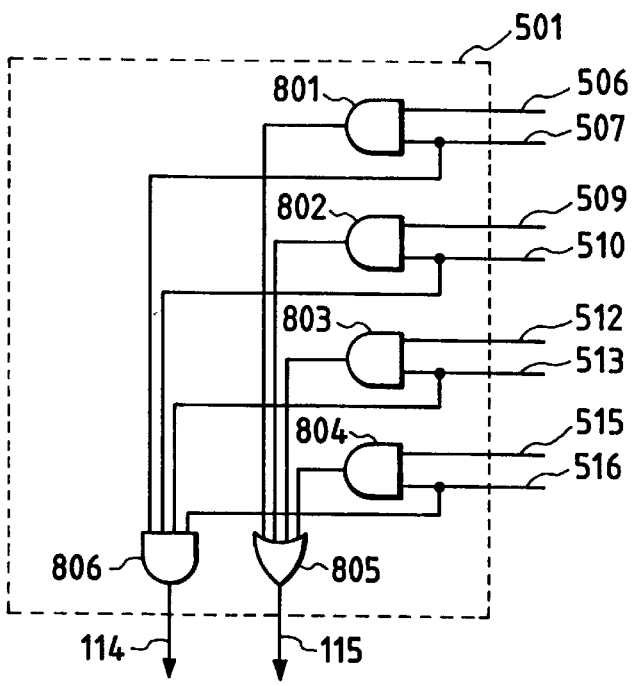
FIG. 8 is a schematic circuit diagram of the judging circuit 501 in FIG. 5.
Figure 9:
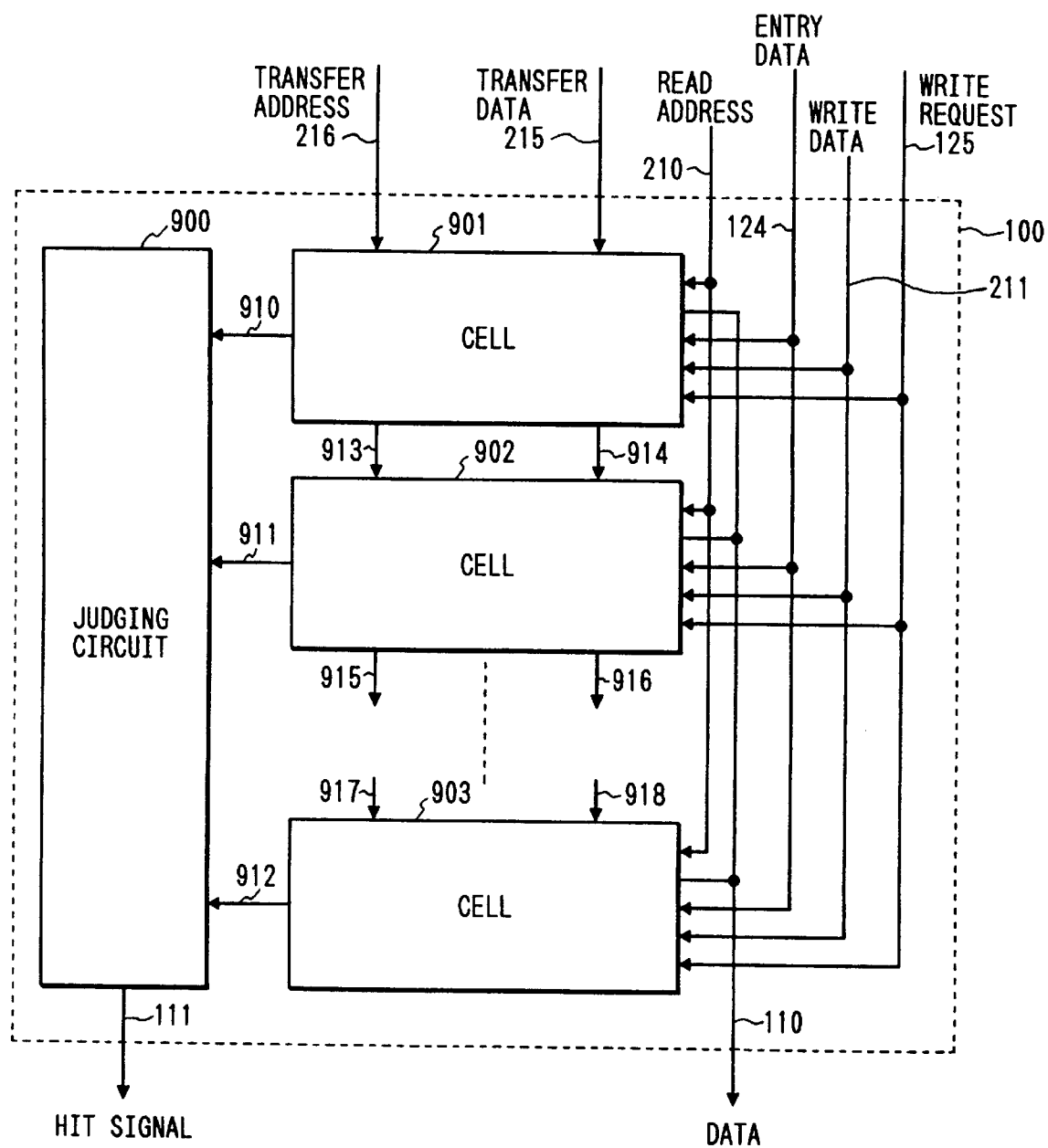
FIG. 9 is a schematic block diagram of the second cache memory 100 in FIG. 2.

FIG. 7 shows details of the priority circuit 500 in FIG. 5. In FIG. 7, symbols 705 to 707 represent inverters and 701 to 704 represent AND gates. FIG. 8 shows a constitution of the judging circuit 501 in FIG. 5. In FIG. 8, symbols 801 to 804 and 806 represent AND gates and 805 represents an OR gate. FIG. 9 shows details of the cache memory 100 in FIG. 2. In FIG. 9, symbol 900 represents a judging circuit and 901 to 903 represent cells for holding a set consisting of a valid bit, address and data. The cells 901 to 903 receive the read address 210, entry request 124, write data 211, and write request 125 as inputs and they output the data 110. Moreover, the cells 901 to 903 transmit the hit signals 910 to 912 to the judging circuit 900, respectively. The cell 901 receives the transfer address 216 and transfer data 215 and sends an address 913 and data 914 to the cell 902. Similarly, the cell 902 sends addresses 915 and 916 to the next cell. The last cell 912 receives an address 917 and data 918.

Figure 10:
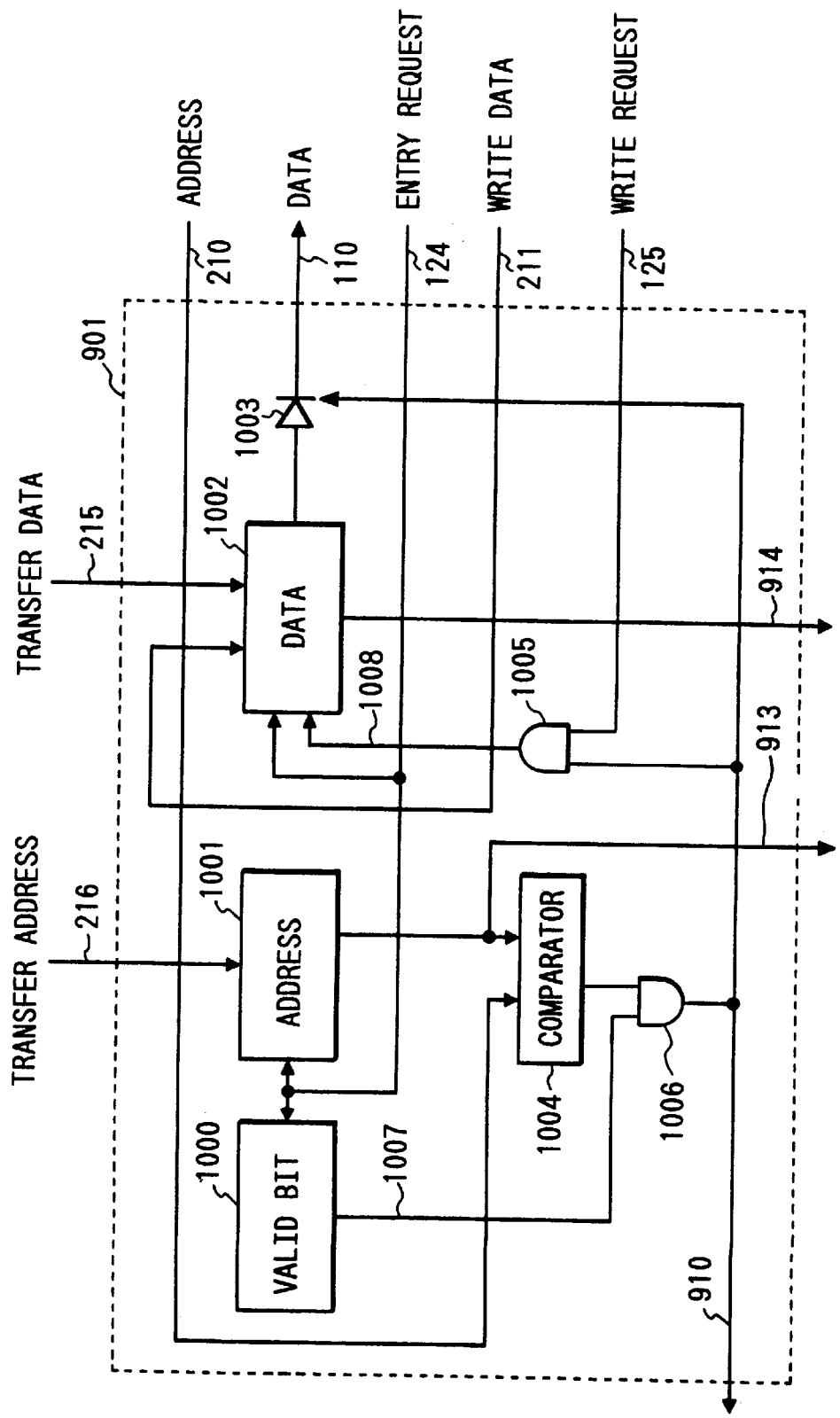
FIG. 10 is a schematic diagram of the cell 901 in FIG. 9.

If any one of the hit signals 910 to 912 sent from the cells 901 to 903 is asserted, the judging circuit 900 asserts the hit signal 111 to be sent to the control circuit 103 and selector 104. The cell 901 compares the address 210 with its holding address. When they coincide with each other and are valid, the cell 901 transmits the hit signal 910 and outputs the corresponding holding data to the bus 110. When the write request 125 is asserted, the cell 901 compares its holding address with the write address 210. When they coincide with each other and the valid bit is asserted, the cell 901 incorporates the contents of the write data 211. When the entry request 124 is asserted simultaneously with the above operation, the cell 901 asserts the valid bit and incorporates the transfer address 216 and transfer data 215. In this case, the cell 902 incorporates the address and data held by the cell 901 through the signals 913 and 914. That is, the cells 901 to 903 follow a FIFO operation. FIG. 10 shows details of the cell 901 in FIG. 9. In FIG. 10, symbols 1000, 1001, and 1002 represent registers for holding a valid bit, addresses, and data respectively. Symbol 1004 represents a comparator, 1005 and 1006 represent AND gates, and 1003 represents a tristate buffer. The entry request 124 is connected to the register 1000 for holding a valid bit, the register 1001 for holding addresses, and the register 1002 for holding data. When the entry request 124 is asserted, the register 1000 for holding a valid bit is set, the register 1001 for holding addresses incorporates the transfer address 216, and the register 1002 for holding data incorporates the data 215. The comparator 1004 compares an output 913 of the register for holding addresses with the address 210. When the output of the comparator 1004 is asserted and also the valid bit is asserted, the AND gate 1006 asserts the hit signal 910 and opens the tristate buffer 1003 to transmit the contents of the register for holding data to the data bus 110. Moreover, when the AND gate 1005 detects that the hit signal 910 and a write request are asserted, it asserts the signal 1008 to be sent to the register 1002 for holding data and incorporates the write data 211 into the register 1002 for holding data.

As described above, the second cache memory 100 uses the full associative system and processes a memory referencing instruction sent from the instruction unit 201 and transfer of the data sent from the main memory 203 at the same time. Therefore, the overall size of the cache memory 100 is small and the operation speed thereof can be increased because it has only 64 entries, though the cell structure is complicated.

Moreover, the second cache memory 100 has a high hit ratio, though the capacity of it is small, and the operation speed thereof can be increased, because it stores data which is not to be reused in accordance with the instruction PF2; and thereby, it only temporarily stores data transferred from the main memory 203 in accordance with the instruction PF2, but which has not been used yet by the instruction LD.

The cache memory in FIG. 9 has a block size of as small as 4 bytes. This means that the cache memory provides, given the same capacity, a greater number of entries than if the block size were the same as that of the first cache memory, i.e. 16 bytes. Thus, even when a large amount of array data is to be processed at one time, each array may be stored in a separate entry, whereby any drop in performance attributed conventionally to the lack of entries is prevented. Since data is transferred from the main memory in units of 4 bytes, data of discontinuous addresses may be processed without transferring unnecessary data. This ensures high-speed data processing.

Figure 11:
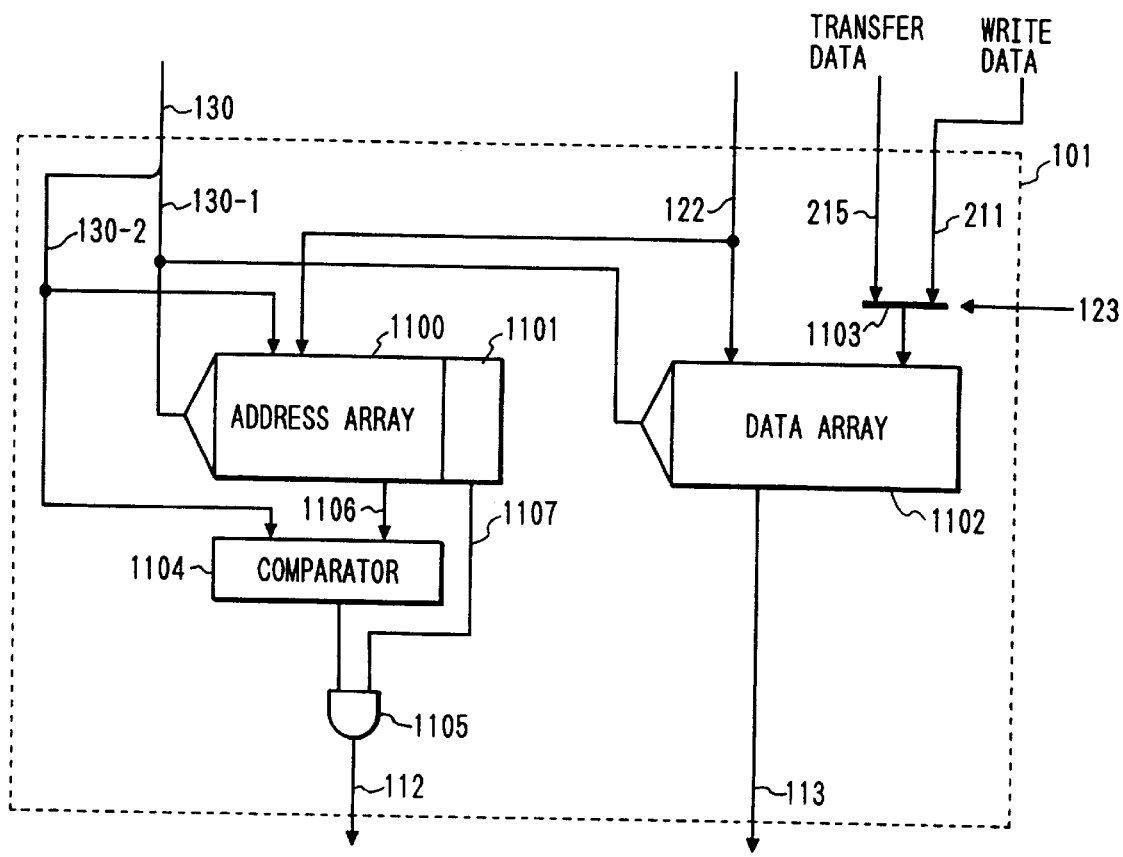
FIG. 11 is a schematic diagram of the first cache memory in FIG. 1.

FIG. 11 shows details of the first cache memory in FIG. 2. In FIG. 11, symbol 1100 represents an address array, 1101 represents a valid bit, 1102 represents a data array, 1104 represents a comparator, and 1105 represents an AND gate, and 1103 represents a selector. The selector 1103 is controlled by the control signal 123, which selects the transfer data 215 or write data 211 and transmits its output to the data array 1102.

The address array 1100 and the valid bit 1101 are accessed by a low-order bit 130-1 of the address 130. The comparator 1104 compares an address array output 1106 with a high-order bit 130-2 of the address 130. The AND gate 1105 outputs the hit signal 112 when detecting that an output of the comparator is asserted and the valid bit 1107 is asserted. Moreover, when the write signal 122 is asserted, the AND gate 1105 incorporates the address 130-2 and sets a corresponding valid bit. The data array is accessed by the low-order bit 130-1 of the address 130, which transmits read data to the bus 113. When the write signal 122 is asserted, the data array writes an output of the selector 1103.

Though the first cache memory 101 has a capacity of 1 M, bits which is larger than that of the second cache memory, the overall size thereof is not very large, because it has only one port, and so an increase in its operation speed can be expected.

FIG. 14 shows a constitution of the control circuit in FIG. 2. In FIG. 14, symbols 1400, 1406, and 1410 represent OR gates and 1401 to 1405, 1407 to 1409, and 1411 represent AND gates. Symbol 1412 represents a decoder which has the function of decoding the control signal 213-2 by the instruction unit 201 to judge whether an instruction under execution is LD, ST, PF1, or PF2.

Figure 15:
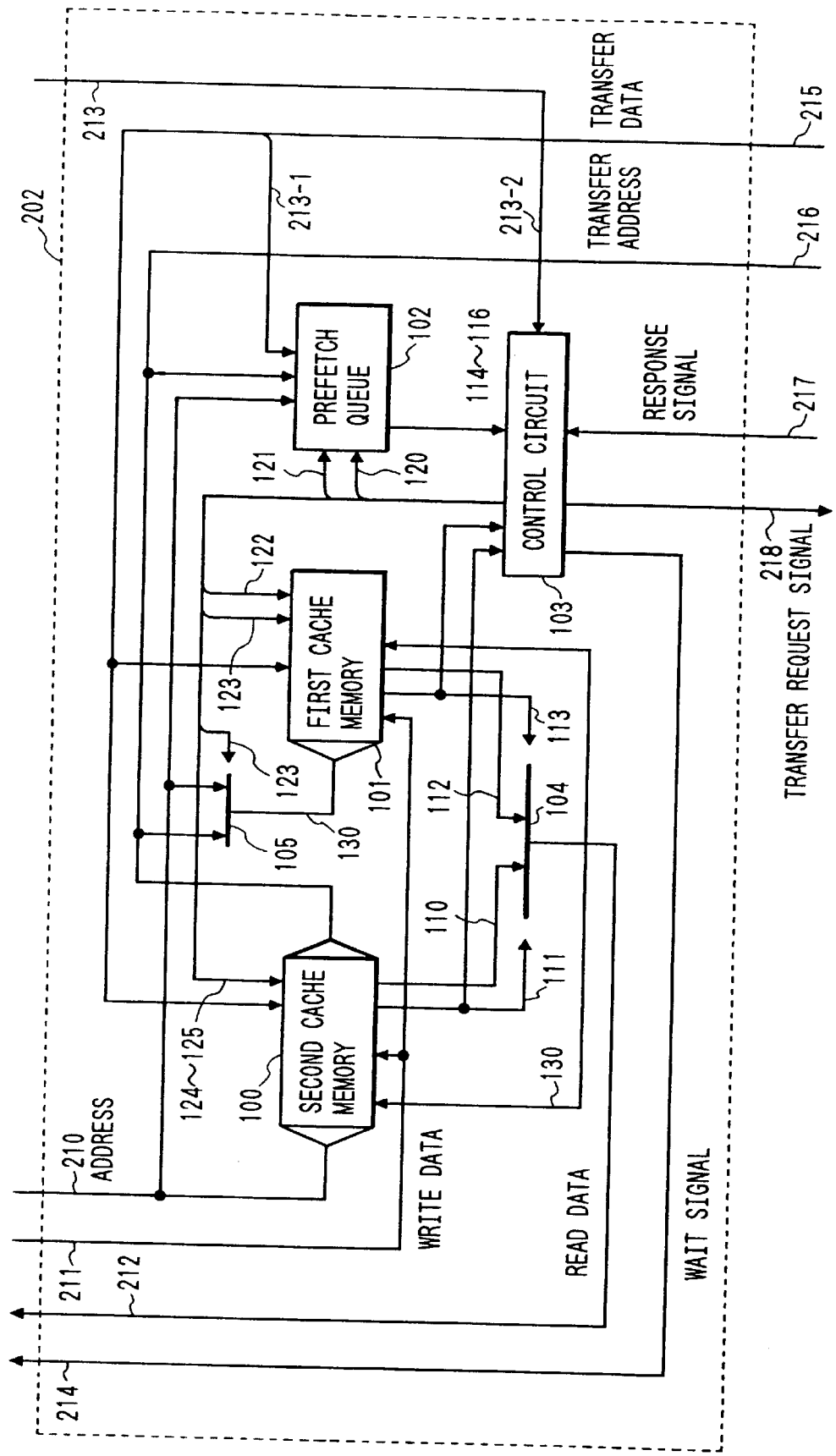
FIG. 15 is a schematic diagram of a second embodiment of the memory unit 202 in FIG. 1.

FIG. 15 shows details of the memory unit 202 in FIG. 1. The constitution shown in FIG. 15 is almost the same as that shown in FIG. 2, except that an interface 130 is present between the first cache memory 101 and the second cache memory 100.

A first problem with the arrangement shown in FIG. 2 is that the second cache memory is useless when a medium or small-scale program is run using the instruction PP1. A second problem is that the hit ratio is low compared with that of the same-capacity cache memory using the set associative system. The embodiment in FIG. 15 solves these problems.

In the case of the embodiment in FIG. 15, if the first cache memory 101 causes an error, the second cache memory 100 is searched. If it is hit, corresponding data is transferred from the second cache memory 100 to the first cache memory 101 through the interface 130. To enter data in the first cache memory, overflow data is entered in the second cache memory 100 through the interface 130. In the publication by Norman P. Jouppi, "Improving Direct-Mapped Cache Performance by the Addition of a small Fully-Associative Cache and Prefetch Buffers," Proc. 17th Symp. on Camp. Arch., Settle, Wash., pp. 364–373, May, 1990, the above cache memory is called a victim cache memory which improves the hit ratio compared with a cache memory using the direct map system.

The embodiment in FIG. 15 makes it possible to improve the performance of a medium- or small-scale program by effectively using both the first cache memory 101 and the second cache memory 100.

The present invention makes it possible to inexpensively improve the performance of a computer having a prefetch function for a cache memory about a medium- or small-scale program for reusing data stored in the cache memory and a large-scale program for not reusing data stored in the cache memory.

Figure 41:
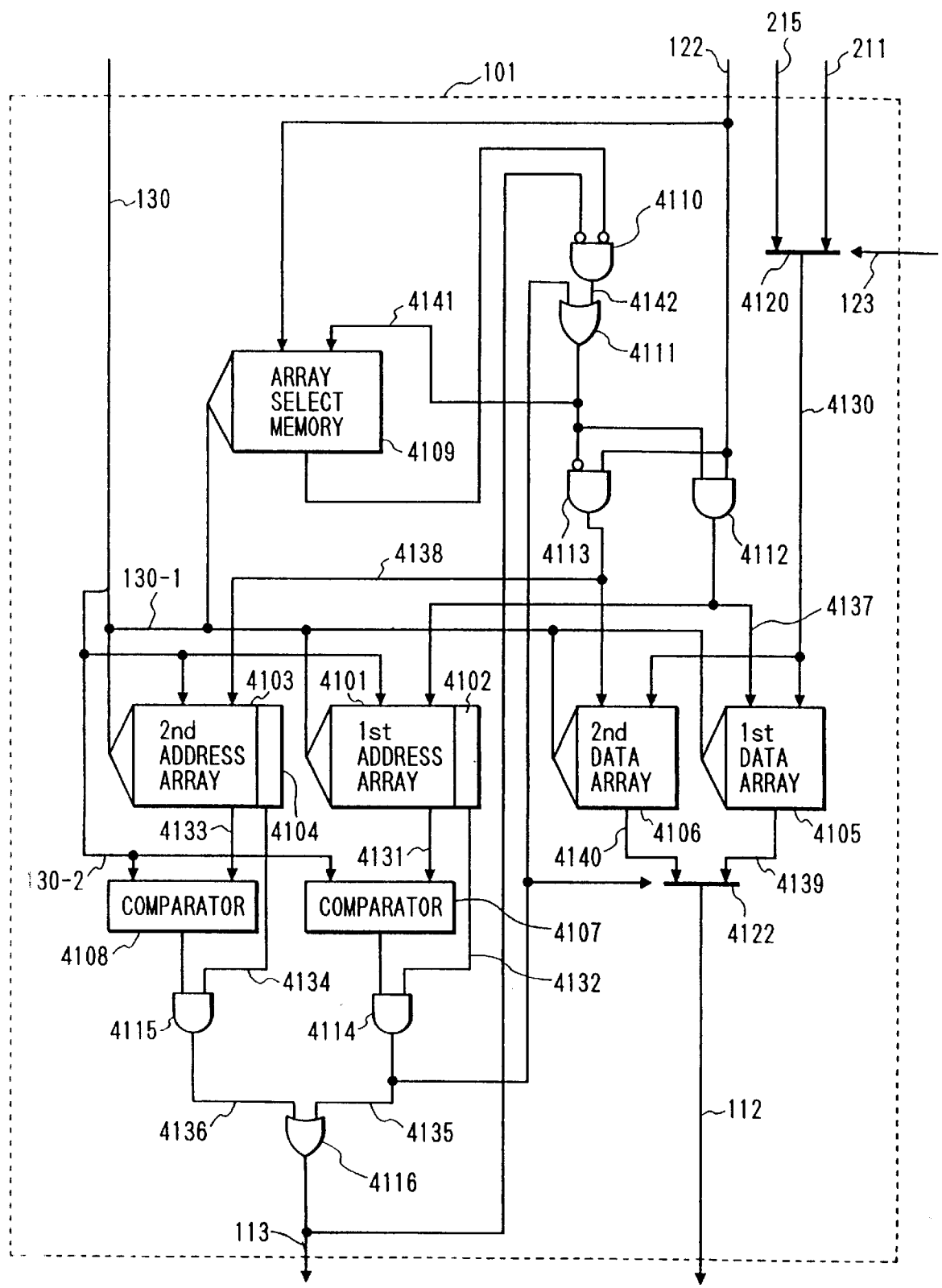
FIG. 41 is a schematic diagram of a second embodiment of the first cache memory 101 in FIG. 2.

FIG. 41 shows details of the second embodiment of the first cache memory 101 in FIG. 2. The cache memory in FIG. 41 is a two-way set associative type cache memory that has a capacity of 1 megabyte and a block size of 16 bytes. Reference numerals 4101 and 4103 are address arrays; 4102 and 4104 are valid bits; 4105 and 4106 are data arrays; 4107 and 4108 are comparators; 4109 is an array selection memory; 4110, 4112, 4113, 4114 and 4115 are AND gates; 4111 and 4116 are OR gates; and 4120 and 4122 are selectors. In the description that follows, the address array 4101, valid bit 4102 and data array 4105 are referred to collectively as an array 1; likewise, the address array 4103, valid bit 4104 and data array 4106 are referred to collectively as an array 2.

Under control of a control signal 123, the selector 4120 selects either transfer data 215 or write data 211 and sends its output 4130 to the data arrays 4105 and 4106. The first address array 4101 and valid bit 4102 are accessed using the low-order bit 130-1 of address 130. The comparator 4107 compares an address array output 4131 with the high-order bit 130-2 of address 130. When the AND gate 4114 senses that the output of the comparator 4107 and the valid bit 4132 are both asserted, the AND gate 4114 outputs a hit signal 4135 indicating a hit in the array 1. When a write signal 4137 to the array 1 is asserted, the first address array 4101 and valid bit 4102 fetch address 130-2 and set the corresponding valid bit. Similarly, the second address array 4103 and valid bit 4104 are accessed using the low-order bit 130-1 of address 130. The comparator 4108 compares an address array output 4133 with the high-order bit 130-2 of address 130. When the AND gate 4115 senses that the output of the comparator 4108 and the valid bit 4134 are both asserted, the AND gate 4115 outputs a hit signal 4136 indicating a hit in the array 2. When a write signal 4138 to the array 2 is asserted, the second address array 4103 and valid bit 4104 fetch address 130-2 and set the corresponding valid bit. The OR gate 4116 outputs a hit signal 113 when either the hit signal 4135 of the array 1 or the hit signal 4136 of the array 2 is asserted. The first data array 4105 is accessed using the low-order bit 130-1 of address 130. The data thus read out is placed onto a bus 4139. When the write signal 4137 to the array 1 is asserted, the output 4130 of the selector 4120 is written to the array 1. Likewise, the second data array 4106 is accessed using the low-order bit 130-1 of address 130. The data thus read out is placed onto a bus 4140. When the write signal 4138 to the array 2 is asserted, the output 4130 of the selector 4120 is written to the array 2. When the hit signal 4135 of the array 1 is asserted, the selector 4122 selects the output 4139 of the first data array; otherwise, the selector 4122 selects the output 4140 of the second data array. The selected result is placed onto a data bus 112. When a write signal 122 is asserted, the array selection memory 4109 retains information about which of the arrays 1 and 2 has data written thereto. The transfer data 215 from the main memory is written either to the array 2, if the preceding data was written to the array 1, or to the array 1, if the preceding data was written to the array 2. The write data 211 of the store instruction transferred from the instruction unit is written to either the array 1 or the array 2 in which a hit has been detected. In this case, the information retained in the array selection memory 4109 is ignored. What follows is a description of how the write signal 4137 to the array 1 and the write signal 4138 to the array 2 are generated. The array selection memory 4109 is accessed using the low-order bit 130-1 of address 130. The data thus read out is sent to the AND gate 4110. When the write signal 122 is asserted, the value of an array selection signal 4141 is written to the array selection memory 4109. When neither the hit signal 113 nor the output of the array selection memory 4109 is asserted, the AND gate 4110 outputs a control signal 4142. When either the hit signal 4135 of the array 1 or the control signal 4142 is asserted, the OR gate 4111 outputs the array selection signal 4141. The array selection signal 4141 indicates that the array 1 is selected for writing data thereto when asserted; and, the array selection signal 4141 indicates that the array 2 is selected for writing data thereto when not asserted. When both the write signal 122 and the array selection signal 4141 are asserted, the AND gate 4112 outputs the write signal 4137 to the array 1. Likewise, the AND gate 4113 outputs the write signal 4138 to the array 2 when the write signal 122 is asserted while the array selection signal 4141 is not asserted. The cache memory in FIG. 41, structured as a two-way set associative type, is more massive than the cache memory in FIG. 11 but prevents the occurrence of block conflict. Thus, the hit rate of the cache memory in FIG. 41 is higher than that of the cache memory in FIG. 11.

Figure 42:
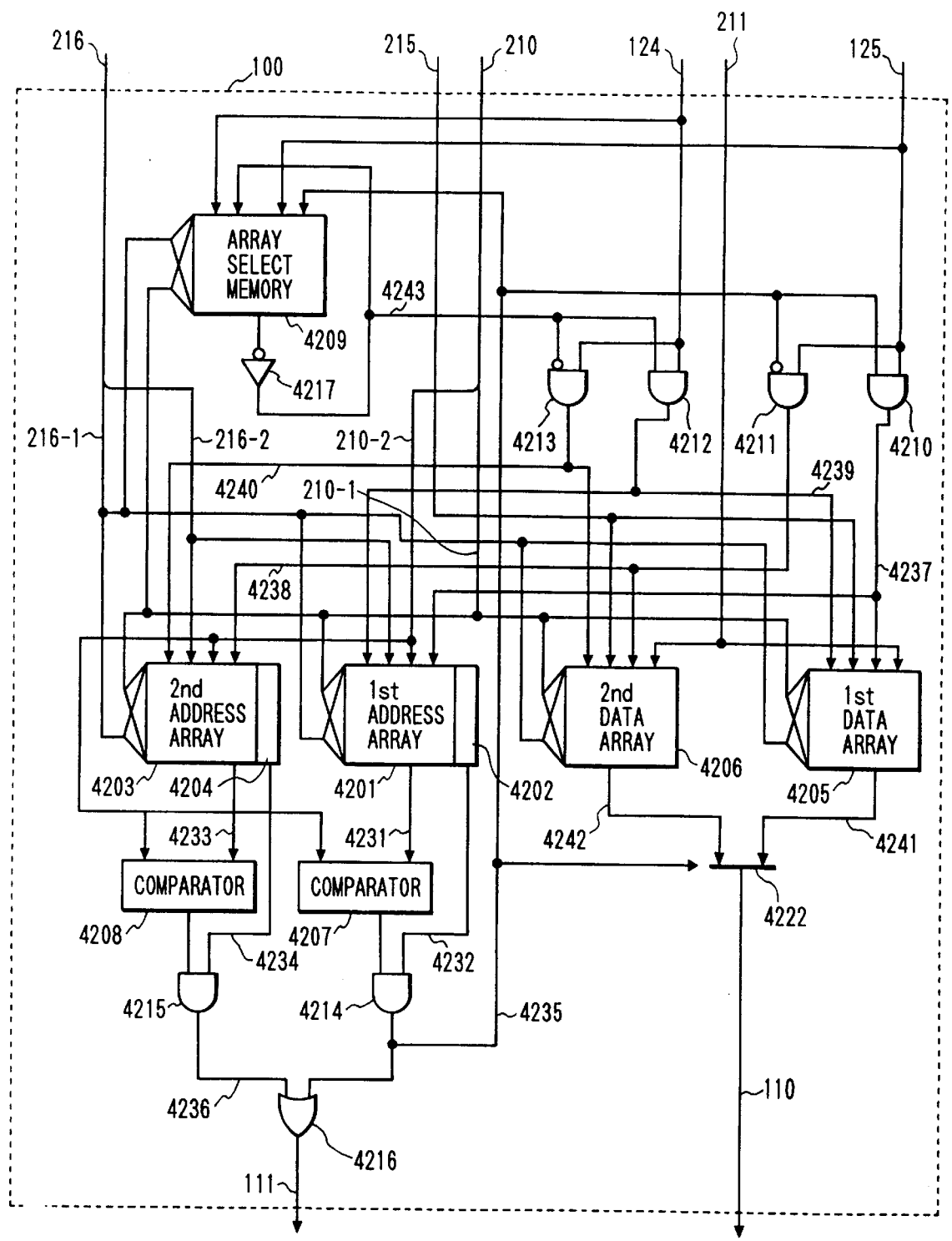
FIG. 42 is a schematic diagram of a second embodiment of the second cache memory 100 in FIG. 2.

FIG. 42 shows details of a second embodiment of the second cache memory 100 in FIG. 2. The cache memory in FIG. 42 is a two-way set associative type cache memory that has a capacity of 2 kilobytes and a block size of 32 bytes. Reference numerals 4201 and 4203 are address arrays; 4202 and 4204 are valid bits; 4205 and 4206 are data arrays; 4207 and 4208 are comparators; 4209 is an array selection memory; 4210, 4211, 4212, 4213, 4214 and 4215 are AND gates; 4216 is an OR gate; 4217 is an inverting circuit; and 4222 is a selector. In the description that follows, the address array 4201, valid bit 4202 and data array 4205 are referred to collectively as an array 1; and, the address array 4203, valid bit 4204 and data array 4206 are referred to collectively as an array 2.

The first address array 4201 and valid bit 4202 output the value of the address designated by the low-order bit 210-1 of read address 210. The comparator 4207 compares an address array output 4231 with the high-order bit 210-2 of address 210. When the AND gate 4214 senses that both the output of the comparator 4207 and a valid bit 4232 are asserted, the AND gate 4214 outputs a hit signal 4235 indicating a hit in the array 1. When a first write signal 4237 to the array 1 is asserted, the first address array 4201 and valid bit 4202 set the high-order bit 210-2 of read address 210 to the address designated by the low-order bit 210-1 of read address 210, and set the corresponding valid bit. When a second write signal 4239 to the array 1 is asserted, the high-order bit 216-2 of transfer address 216 is set to the address designated by the low-order bit 216-1 of transfer address 216, and the corresponding valid bit is set. Likewise, the second address array 4203 and valid bit 4204 output the value of the address designated by the low-order bit 210-1 of read address 210. The comparator 4208 compares an address array output 4233 with the high-order bit 210-2 of address 210. When the AND gate 4215 senses that the output of the comparator 4208 and the valid bit 4234 are both asserted, the AND gate 4215 outputs a hit signal 4236 indicating a hit in the array 2. When a first write signal 4238 to the array 2 is asserted, the second address array 4203 and valid bit 4204 set the high-order bit 210-2 of read address 210 to the address designated by the low-order bit 210-1 of read address 210, and set the corresponding valid bit. When a second write signal 4240 to the array 2 is asserted, the high-order bit 2162 of transfer address 216 is set to the address designated by the low-order bit 216-1 of transfer address 216, and the corresponding valid bit is set. The OR gate 4216 outputs a hit signal 111 when either the hit signal 4235 of the array 1 or the hit signal 4236 of the array 2 is asserted. The first data array 4205 places onto a bus 4241 the data of the address designated by the low-order bit 210-1 of read address 210. When the first write signal 4237 to the array 1 is asserted, the write data 211 is written to the address designated by the low-order bit 210-1 of read address 210. When the second write signal 4239 to the array 1 is asserted, the transfer data 215 is written to the address designated by the low-order bit 216-1 of transfer address 216. Likewise, the first data array 4206 places onto a bus 4242 the data of the address designated by the low-order bit 210-1 of read address 210. When the first write signal 4238 to the array 2 is asserted, the write data 211 is written to the address designated by the low-order bit 210-1 of read address 210. When the write signal 4240 to the array 2 is asserted, the transfer data 215 is written to the address designated by the low-order bit 216-1 of transfer address 216. When the hit signal 4235 of the array 1 is asserted, the selector 4222 selects the output 4241 of the first data array; otherwise, the selector 4222 selects the output 4242 of the second data array. The selected result is placed onto a data bus 110. When an entry request 124 or a write request 125 is asserted, the array selection memory 4209 retains information about which of the arrays 1 and 2 has the data written thereto. The transfer data 215 from the main memory is written either to the array 2, if the preceding data was written to the array 1, or to the array 1, if the preceding data was written to the array 2. The write data 211 of the store instruction transferred from the instruction unit is written to either the array 1 or the array 2 in which a hit has been detected. In this case, the information retained in the array selection memory 4209 is ignored. What follows is a description of how the write signals 4237 and 4239 to the array 1 and the write signals 4238 and 4240 to the array 2 are generated. The array selection memory 4209 supplies the inverting circuit 4217 with the data of the address designated by the low-order bit 2161 of transfer address 216. When the write request 125 is asserted, the value of the hit signal 4235 for the array 1 is written to the address designated by the low-order bit 210-1 of read address 210. When the entry request 124 is asserted, the value of an array selection signal 4243 is written to the address designated by the low-order bit 216-1 of transfer address 216. The inverting circuit 4217 outputs the array selection signal 4243 when the output of the array selection memory 4209 is not asserted. The AND gate 4210 outputs the first write signal 4237 to the array 1 when both the write request 125 and the hit signal 4235 of the array 1 are asserted. The AND gate 4211 outputs the first write signal 4238 to the array 2 when the write request 125 is asserted while the hit signal 4235 of the array 1 is not asserted. Similarly, the AND gate 4212 outputs the second write signal 4239 to the array 1 when the entry request 124 and the array selection signal 4243 are both asserted. The AND gate 4213 outputs the second write signal 4240 to the array 2 when the entry request 124 is asserted while the array selection signal 4243 is not asserted. The cache memory in FIG. 42, being a two-way set associative type, is less massive than the full set associative type cache memory in FIG. 9, yet it provides a greater capacity. The block size of as many as 32 bytes allows a large amount of data to be transferred at one time from the main memory. Thus, when data of contiguous addresses are to be processed, an appreciably smaller number of prefetch instructions are needed to transfer a fixed quantity of data from the main memory to the second cache memory. This enhances the data processing performance.

Figure 34:
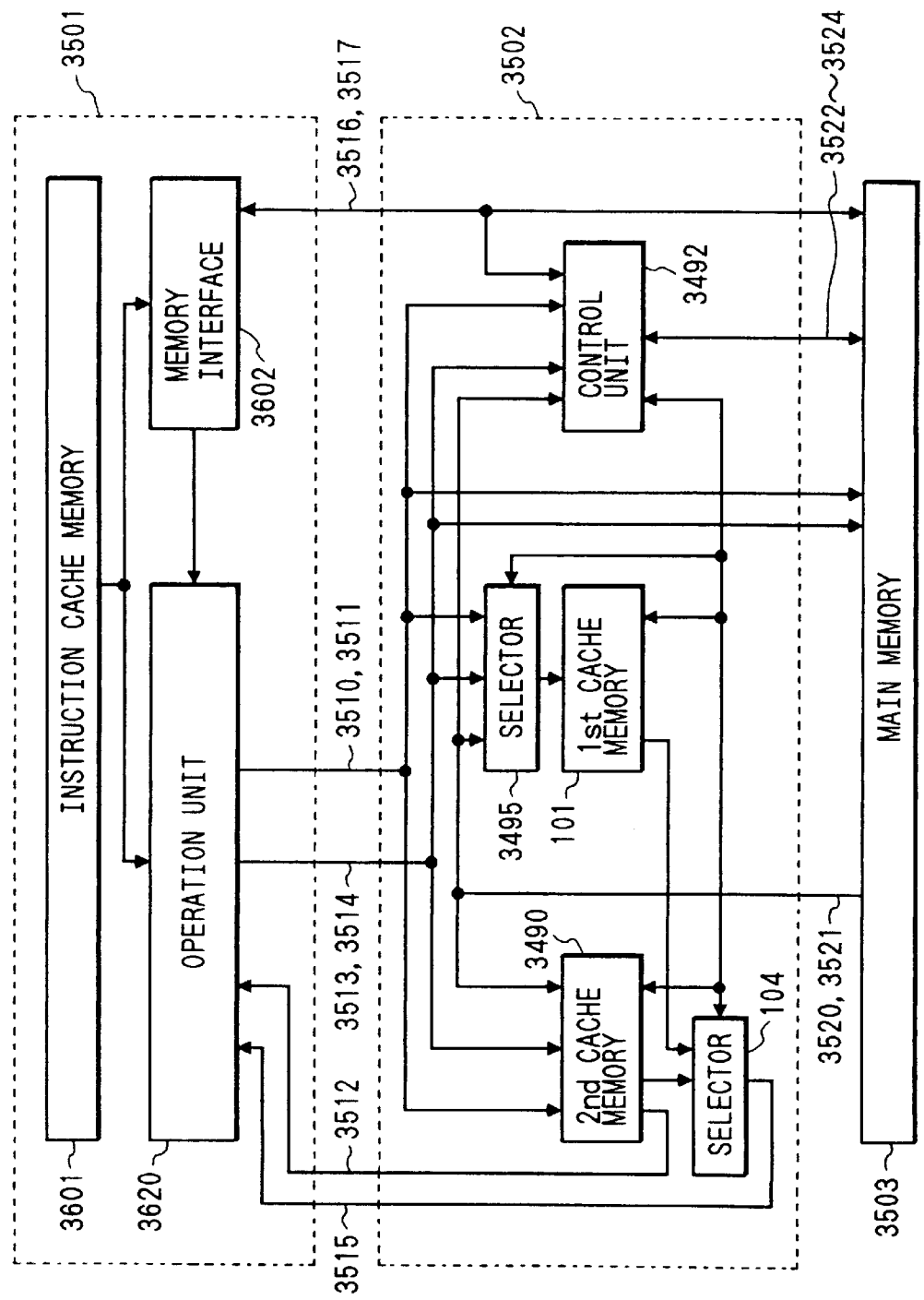
FIG. 34 is a schematic block diagram of another embodiment of the present invention.

FIG. 34 shows a general view of a second embodiment of the present invention. Of the components of the second embodiment in FIG. 34, those identical to their counterparts in the embodiment of FIG. 1 are given the same reference numerals. The second embodiment is characterized in that it has two address buses 3510 and 3513, and four data buses 3511, 3512, 3514 and 3515. This constitution allows two memory reference instructions to be processed in parallel.

The second embodiment in FIG. 34 comprises an instruction unit 3501, a memory unit 3502 and a main memory 3503.

The instruction unit 3501, a unit for executing instructions, comprises an instruction cache memory 3601, a memory interface 3602 and an arithmetic unit 3620. The instruction unit 3501 exchanges data with a first and a second cache memory 101 and 3490 over the buses 3510 through 3512 and 3513 through 3515. More specifically, the instruction unit 3501 sends addresses, data and control signals to the memory unit 3502 and main memory 3503 over the address buses 3510 and 3513, four-byte-wide write data buses 3511 and 3514, and a control signal line 3516.

The memory unit 3502 is constituted by the first cache memory 101, the second cache memory 3490, selectors 104 and 3495 to input/output data, and a control section comprising a control unit 3492. The first cache memory 101 is the same in constitution as the first cache memory of the first embodiment shown in FIG. 1; the first cache memory 101 is a one-port large-capacity cache memory. The second cache memory 3490 is a three-port small-capacity cache memory. The memory unit 3502 sends data and a wait signal to the instruction unit 3501 over the four-byte-wide read data buses 3512 and 3515 and via a wait signal line 3517, and transmits a request signal to the main memory 3503 over request signal lines 3523 and 3524.

The main memory 3503 stores instructions and data, and transfers data over buses 3520 and 3521 to the first cache memory 101 and the second cache memory 3490. That is, the main memory 3503 sends data, addresses and a response signal to the memory unit 3502 over the transfer data bus 3520, transfer address bus 3521 and a response signal line 3522.

The operation code of the instructions processed by the instruction unit 3501 in FIG. 34 is the same in format as the operation code shown in FIG. 12. The types of instructions to be processed are the same as those listed in FIG. 13.

Figure 36:
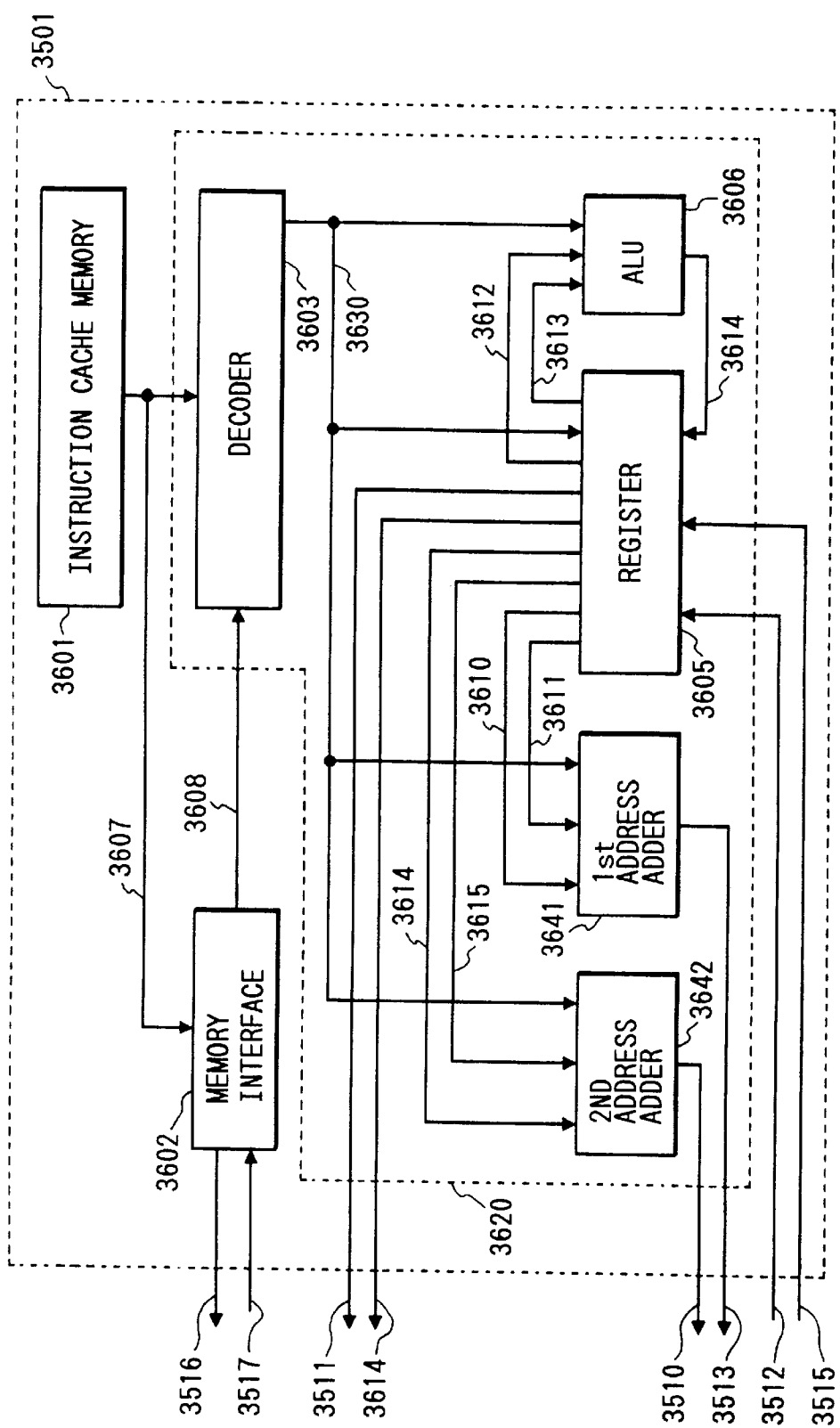
FIG. 36 is a schematic diagram of the instruction unit 3501 in FIG. 34.

FIG. 36 shows details of the instruction unit 3501 in FIG. 34. In FIG. 36, reference numeral 3601 is an instruction cache memory; 3603 is a decoder; 3602 is a memory interface; 3605 is a register; 3606 is an ALU; and 3641 and 3642 are address adders. The instruction cache memory 3601 sends an instruction to the decoder 3603 and memory interface 3602 over a bus 3607. The decoder 3603 decodes the received instruction, and controls the register 3605, ALU 3606 and address adders 3641 and 3642 using a signal 3630. The ALU 3606 receives data from the register 3605 over buses 3612 and 3613, operates on the data, and writes the result of the operation to the register 3605 over a bus 3614.

The first address adder 3641 receives data from the register 3605 over buses 3610 and 3611, performs an add operation on the data, and places onto the bus 3513 the result of the operation as the address for a load or a store operation. For a store operation, the data to be stored is read from the register 3605 and placed onto the bus 3514. For a load operation, the data that was read out is received via the bus 3515 and written to the register 3605. Likewise, the second address adder 3642 reads data from the register 3605 over the buses 3614 and 3615, performs an add operation on the data, and places onto the bus 3510 the result of the operation as the address for a load or a store operation. For a store operation, the data to be stored is read from the register 3605 and placed onto the bus 3511. For a load operation, the data that was read out is received over the bus 3512 and written to the register 3605.

Upon execution of instructions LD, ST, PF1 and PF2, the memory interface 3602 outputs a control signal 3516 and receives a wait signal 3517. When the wait signal 3517 is set to 1, a signal 3608 is output to the decoder 3603 to halt the pipeline operation until the wait signal 3517 is brought to 0.

FIG. 37 is an illustration for explaining the pipeline operation in effect when the data processor in FIG. 34 executes instructions. In FIG. 37, IF represents an instruction fetch stage; D is a decode stage; E is an operation and address add stage; A i9 a cache access stage; W is a register write stage; R is a cache access retry stage; and X is a wait stage. When two load instructions (instructions 1 and 2) are to be processed in parallel, the instruction 1 causes the first and the second cache memory to be accessed concurrently in stage A whereas the instruction 2 causes the second cache memory alone to be accessed in stage A. Following a hit in the second cache memory, the instruction 1 causes the data read from the second cache memory to be written to the register in stage W. When there occurs a hit in the second cache memory, the instruction 2 causes the data read from the second cache memory to be written to the register in stage W. The instruction 3 causes the first and the second cache memory to be accessed concurrently in stage A, and the instruction 4 causes only the second cache memory to be accessed in stage A. Following a hit in the second cache memory, the instruction 3 causes the data read from the second cache memory to be written to the register in stage W. When there occurs a miss in the second cache memory, the instruction 4 causes the first cache memory to be accessed in stage R so as to write the read-out data to the register in stage W. When instructions 5 and 6 are to be processed in parallel, the instruction 5 causes the first and the second cache memory to be accessed concurrently in stage A; whereas, the instruction 6 causes the second cache memory alone to be accessed in stage A. Following a hit in the first cache memory, the instruction 5 causes the data read from the first cache memory to be written to the register in stage W. When there occurs a hit in the second memory, the instruction 6 causes the data read from the second cache memory to be written to the register in stage W. Where instructions 7 and 8 are to be processed in parallel, the instruction 7 causes the first and the second cache memory to be accessed concurrently in stage A; whereas, the instruction 8 causes the second cache memory alone to be accessed. Following a hit in the first cache memory, the instruction 7 causes the data read from the first cache memory to be written to the register in stage W. When there occurs a miss in the second cache memory, the instruction 8 causes the first cache memory to be accessed in stage R so as to write the read-out data to the register in stage W.

The pipeline operation, upon execution of the store operation, is the same as that upon execution of the load instruction. That is, the cache memories are checked in stage A or R for a hit. In case of a hit, the data is written to the applicable cache memory in stage A or R.

As described, two memory reference instructions are processed in parallel when the second instruction attains a hit in the second cache memory. Thus, if the PF2 instruction is used to transfer data to the second cache memory, two memory reference instructions are always carried out in parallel, whereby the processing performance is enhanced.

Figure 35:
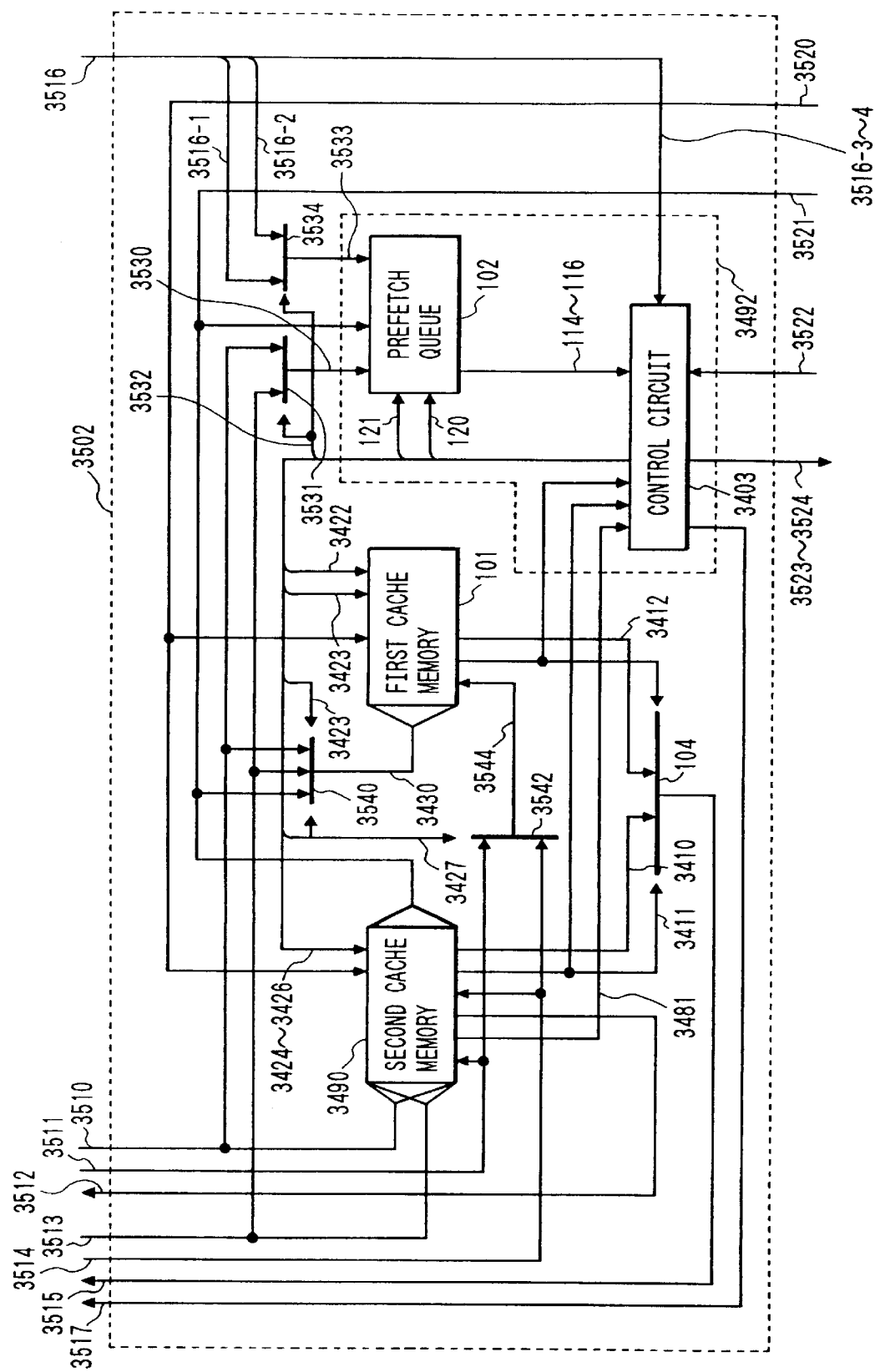
FIG. 35 is a schematic diagram of the memory unit 3502 in FIG. 34.

FIG. 35 shows details of the memory unit 3502 in FIG. 34. In FIG. 35, reference numeral 101 is a first cache memory; 3490 is a second cache memory; 102 is a four-entry prefetch queue; 3403 is a control circuit; and 104, 3540, 3542, 3531 and 3534 are selectors.

The first cache memory 101 receives as its input an address 3430, transfer data 3520, a selector control signal 3423, a write signal 3422 and write data 3544; and outputs read data 3412 and a hit signal 3413. The second cache memory 3490 receives addresses 3510 and 3513, a transfer address 3521, transfer data 3520, an entry signal 3424, write signals 3425 and 3426, and write data 3511 and 3514; and outputs read data 3410 and 3512 and hit signals 3411 and 3481. The prefetch queue 102 receives a cache selection signal 3533, the transfer address 3521, an address 3530, a set signal 120 and a reset signal 121; and outputs a full signal 114, a hit signal 115 and a cache selection signal 116.

The control circuit 3403 receives control signals 3516-3 and 3516-4 from the instruction unit; the full signal 114, hit signal 115 and cache selection signal 116 from the prefetch queue 102; the response signal 3522 from the main memory; the hit signals 3411 and 3481 from the second cache memory 3490; and the hit signal 3413 from the first cache memory. In turn, the control circuit 3403 outputs the wait signal 3517 to the instruction unit; the set signal 120, reset signal 121 and a selection signal 3532 to the prefetch queue 102: the request signals 3523 and 3524 to the main memory; the entry signal 3424 and write signals 3425 and 3526 to the second cache memory 3490; the write signal 3422 and selector control signal 3423 to the first cache memory 101; and the selector control signals 3423 and 3427 to the selectors 3540 and 3542.

The selector 104 receives the data 3410 and hit signal 3411 from the second cache memory 3490, and the data 3412 and hit signal 3413 from the first cache memory 101. When the hit signal 3411 is asserted, the selector 104 reads and outputs the data 3410 that is placed onto the data bus 3515; and, when the hit signal 3413 is asserted, the selector 104 reads and outputs the data 3412 that is placed onto the data bus 3515. Under control of the selector control signals 3423 and 3427, the selector 3540 selects one of address 3513, address 3510 and transfer address 3521. The selected address is sent as the selector output 3430 to the first cache memory 101. Under control of the selector control signal 3427, the selector 3542 selects either the write data 3514 or the write data 3511. The selected data is sent as the selector output 3544 to the first cache memory 101. The selector 3531, under control of the selection signal 3532, selects either address 3513 or address 3510. The selected address is sent as the selector output 3530 to the prefetch queue 102. The selector 3534, controlled by the selection signal 3532, selects either a set selection signal 3516-1 or a set selection signal 3516-2. The selected signal is sent as the selector output 3533 to the prefetch queue 102.

Where the write signal 3422 designates a read operation from the first cache memory 101, the content of address 3430 is read from the first cache memory 101; and, the read data 3412 and the hit signal 3413 are output from the first cache memory 101. Where the write signal 3422 designates a write operation to the first cache memory 101, the transfer data 3520 is written to the first cache memory 101 if the selector control signal 3423 is 1, or the content of the write data 3544 is written to the first cache memory 101 if the selector control signal 3423 is 0.

Where the write signal 3425 is negated to designate a read operation from the second cache memory 3490, the cache memory is searched for the content of address 3513. The data 3410 read out accordingly and the hit signal 3411 are then output from the second cache memory 3490. Where the write signal 3425 is asserted to designate a write operation to the second cache memory 3490, the cache memory is searched for a hit. In case of a hit, the content of the write data bus 3514 is written to the second cache memory 3490. Likewise, where the write signal 3426 is negated to designate a read operation from the second cache memory 3490, the second cache memory is searched for the content of address 3510. The data 3512 read out accordingly and the hit signal 3481 are then output from the second cache memory 3490. Where the write signal 3426 is asserted to designate a write operation to the second cache memory 3490, the second cache memory is searched for a hit. In case of a hit, the content of the write data bus 3511 is written to the second cache memory 3490. If the entry signal 3424 is asserted concurrently with the above operation, the transfer address 3521 paired with the transfer data 3520 is entered.

The prefetch queue 102 is capable of retaining up to four entries of data addresses being transferred from the main memory. When the set signal 120 is asserted, address 3530 and the content of the cache selection signal 3533 are entered into the queue 102. Where the reset signal 121 is asserted, the cache selection signal 116 corresponding to the transfer address 3521 is output from the queue and the corresponding entry is invalidated. If comparing address 3530 with the internally retained addresses reveals that the corresponding entry is being transferred from the main memory, the hit signal 115 is asserted. If the retained addresses are valid for all entries, the full signal 114 indicating that state is asserted.

Figure 40:
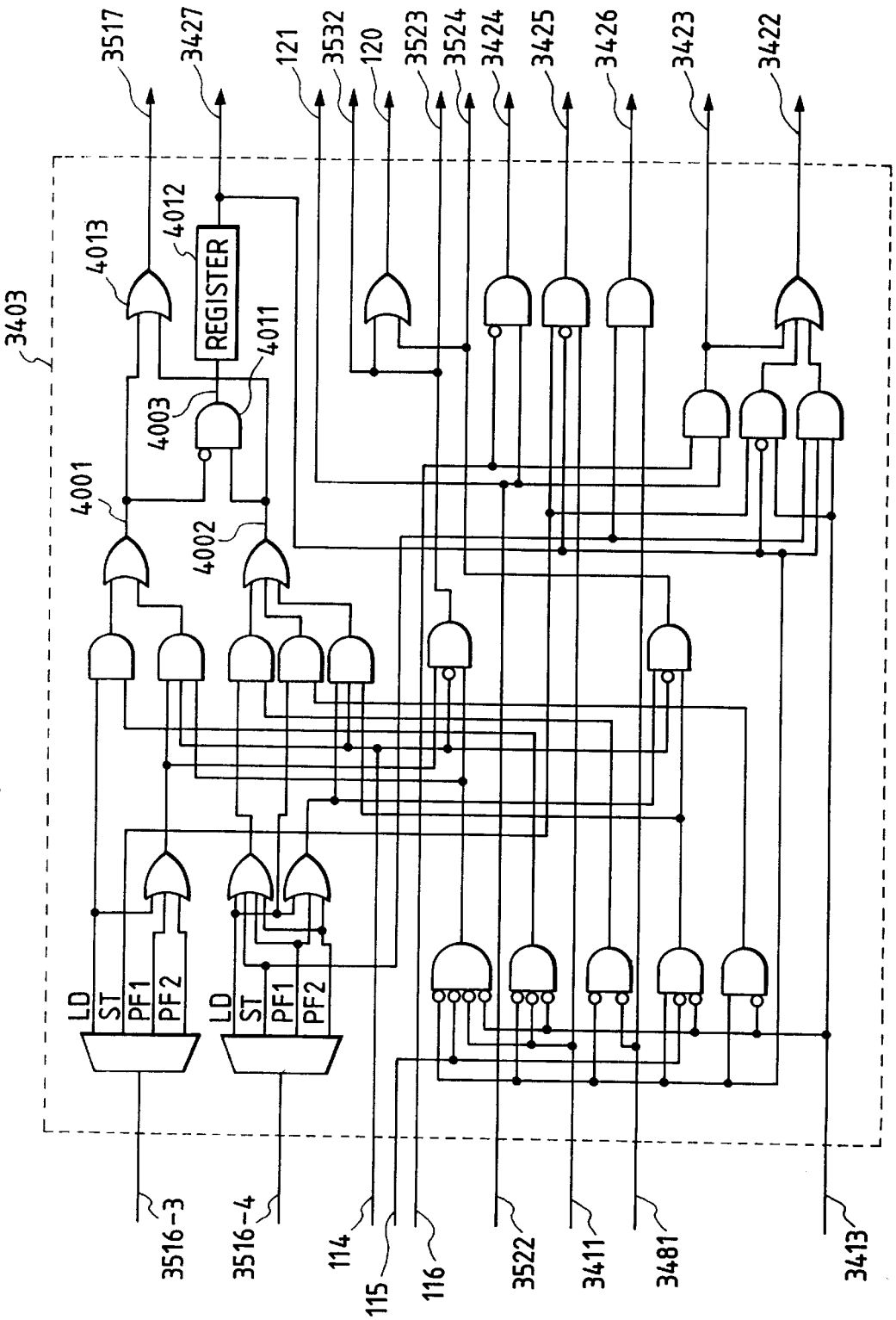
FIG. 40 is a schematic diagram of the control circuit 3403 in FIG. 35.

FIG. 40 shows details of the control circuit 3403 in FIG. 35. The control circuit 3403 decodes the control signal 3516-3 regarding the first instruction and the control signal 3516-4 regarding the second instruction, and accepts the start of any one of the instructions LD, ST, PF1 and PF2. If the first instruction is LD and if the hit signal 3413 from the first cache memory and the first hit signal 3411 from the second cache memory are both negated, it means that a miss has occurred in both cache memories. In that case, the wait signal 4001 of the first instruction is asserted so that the instruction unit will wait while the data is being transferred from the main memory. If the first instruction is LD, PF1 or PF2, if the hit signal 3413 from the first cache memory and the first hit signal 3411 from the second cache memory are both negated, and if the hit signal 115 from the prefetch queue is negated but the full signal 114 therefrom is asserted, that means the prefetch queue is full and no more instructions can be placed into the queue. In that case, the wait signal 4001 for the first instruction is asserted so that the instruction unit will wait until the prefetch queue is vacated. If the first instruction is LD, PF1 or PF2, if the hit signal 3413 from the first cache memory and the first hit signal 3411 from the second cache memory are both negated, and if the hit signal 115 and full signal 114 from the prefetch queue are both negated, then the transfer request signal 3523 to the main memory is asserted. At the same time, the selection signal 3532 and set signal 120 to the prefetch queue are both asserted, and the first instruction is entered into the prefetch queue. If the first instruction is ST and if the hit signal 3413 from the first cache memory is asserted, then the write signal 3422 to the first cache memory is asserted so that the corresponding data will be written to the first cache memory. Likewise, if the first instruction is ST and if the first hit signal 3411 from the second cache memory is asserted, then the first write signal 3425 to the second cache memory is asserted so that the corresponding data will be written to the second cache memory.

If the second instruction is LD, ST, PF1 or PF2 and if the second hit signal 3481 from the second cache memory is negated, it is necessary to access the first cache memory in the next cycle. Thus, the wait signal 4002 of the second instruction is asserted. Access to the first cache memory by the second instruction is accomplished after access to the cache memory by the first instruction has ended with the wait signal 4001 of the first instruction being negated. An AND gate 4011 asserts a control signal 4003 when the wait signal 4001 of the first instruction is negated and the wait signal 4002 of the second instruction is asserted. A register 4012 asserts the selection signal 3427 to the first cache memory one cycle after the control signal 4003 is asserted. When the selection signal 3427 is 1, the first cache memory is accessed by the second instruction and the first instruction is kept from accessing any cache memory. If the second instruction is LD, if the selection signal 3427 to the first cache memory is asserted, and if the hit signal 3413 from the first cache memory is negated, that means a miss has occurred in both cache memories. In that case, the wait signal 4002 of the second instruction is asserted so that the instruction unit will wait while the data is being transferred from the main memory. If the second instruction is LD, PF1 or PF2, if the selection signal 3427 to the first cache memory is asserted, if the hit signal 3413 from the first cache memory is negated, and if the hit signal 115 from the prefetch queue is negated but the full signal 114 therefrom is asserted, that means the prefetch queue is full and no more instructions can be placed into the queue. In that case, the wait signal 4002 of the second instruction is asserted so that the instruction unit will wait until the prefetch queue is vacated. If the second instruction is LD, PF1 or PF2, if the selection signal 3427 to the first cache memory is asserted, if the hit signal 3413 from the first cache memory is negated, and the hit signal 115 and the full signal 114 from the prefetch queue are negated, then the transfer request signal 3523 to the main memory is asserted. At the same time, the set signal 120 to the prefetch queue is asserted and the second instruction is entered into the prefetch queue. If the second instruction is ST, if the selection signal 3427 to the first cache memory is asserted, and if the hit signal 3413 from the first cache memory is asserted, then the write signal 3422 to the first cache memory is asserted so that the applicable data will be written thereto. If the second instruction is ST and if the second hit signal 3481 from the second cache memory is asserted, then the second write signal 3426 to the second cache memory is asserted so that the applicable data will be written thereto.

An OR gate 4013 asserts the wait signal 3517 to the instruction unit when either the wait signal 4001 of the first instruction or the wait signal 4002 of the second instruction is asserted.

When the response signal 3522 from the main memory is asserted, the reset signal 121 to the prefetch queue is asserted so that the applicable entry will be reset from the prefetch queue 102. At the same time, a check is made of the cache selection signal 116 to see if the signal designates a write operation to the first cache memory. If the cache selection signal 116 is found to designate a write operation to the first cache memory, the write signal 3422 and selection signal 3423 to the first cache memory are asserted. If the cache selection signal 116 is found to designate a write operation to the second cache memory, the entry signal 3424 to the second cache memory is asserted.

Figure 38:
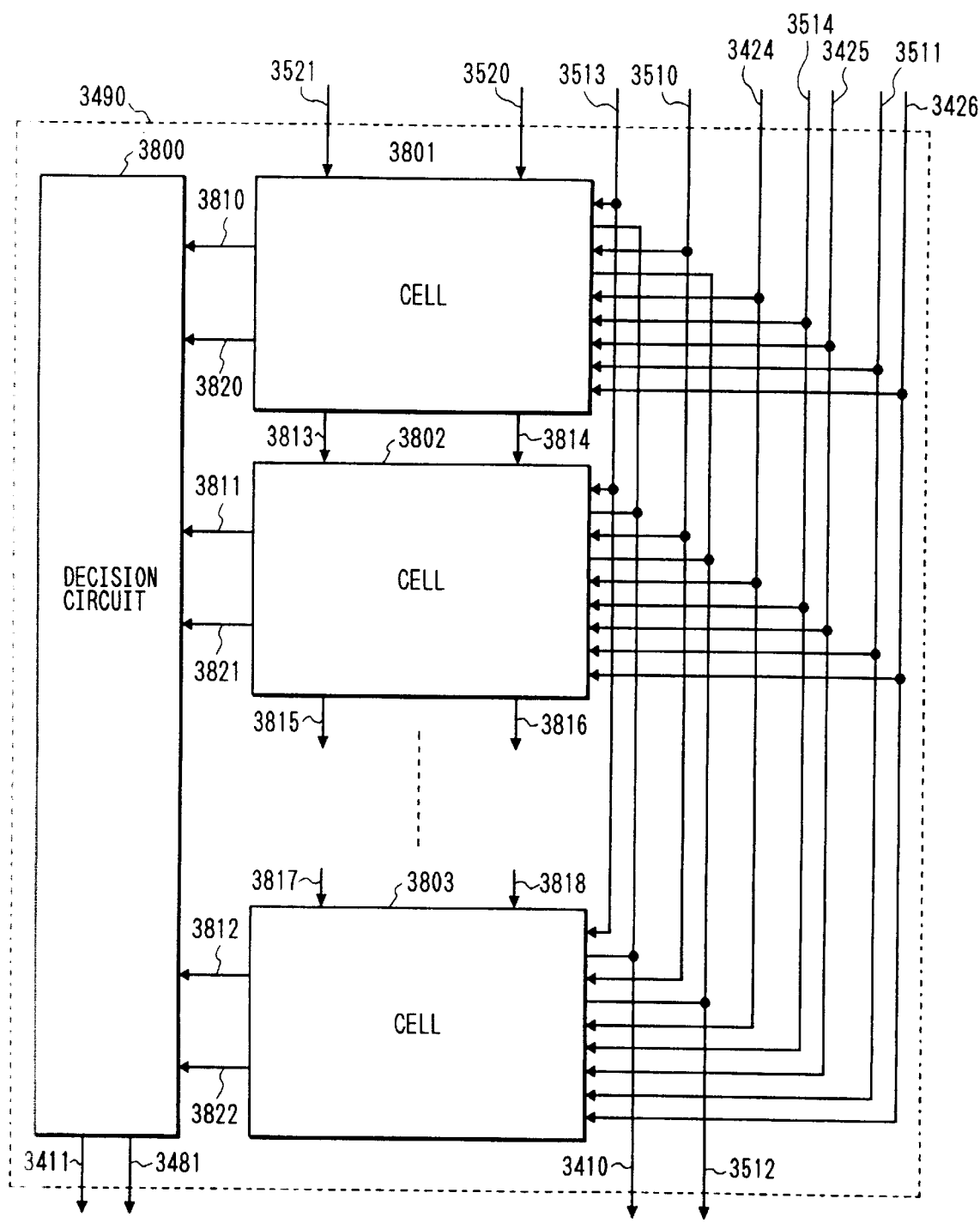
FIG. 38 is a schematic diagram of the second cache memory 3490 in FIG. 35.

FIG. 38 shows details of the second cache memory 3490 in FIG. 35. The cache memory of FIG. 38 is a full associative type cache memory having a block size of 4 bytes and a capacity of 256 bytes. In FIG. 38, reference numeral 3800 is a judging circuit, and 3801 through 3803 are cells that hold combinations of valid bits, addresses and data. The cells 3801 through 3803 receive the read addresses 3513 and 3510, the entry request 3424, the write data 3514 and 3511, and the write requests 3425 and 3426; and, in turn, the cells output the data 3410 and 3512. The cells 3801 through 3803 also output hit signals 3810 through 3812 and 3820 through 3822 to the judging circuit 3800. The cell 3801 receives the transfer address 3521 and transfer data 3520, and forwards address 3813 and data 3814 to the cell 3802. Likewise, the cell 3802 forwards address 3815 and data 3816. The last cell 3803 receives address 3817 and data 3818.

The judging circuit 3800 asserts the hit signal 3411 if any one of the hit signals 3810 through 3812 from the cells 3801 through 3803 is asserted. Similarly, the judging circuit 3800 asserts the hit signal 3481 if any one of the hit signals 3820 through 3822 from the cells 3801 through 3803 is asserted. The cell 3801 compares read address 3513 with the internally retained address. If the two addresses match and are found valid, the cell 3801 outputs the hit signal 3810 and places the internally retained applicable data onto a bus 3410. If the write request 3425 is asserted, the cell 3801 compares the internally retained address with address 3513. If the two addresses match and the valid bit is asserted, the cell 3801 fetches the content of the write data 3514. Likewise, the cell 3801 compares read address 3510 with the internally retained address. If the two addresses match and are found valid, the cell 3801 outputs the hit signal 3820 and places the internally retained applicable data onto a bus 3512. When the write request 3426 is asserted, the cell 3801 compares the internally retained address with address 3510. If the two addresses match and the valid bit is asserted, the cell 3801 fetches the content of the write data 3511. If the entry request 3424 is asserted in parallel with the above operation, the cell 3801 asserts its valid bit and fetches the transfer address 3521 and transfer data 3520. At this point, the cell 3802 fetches via the signals 3813 and 3814 the address and data that were retained by the cell 3801. That is, the cells 3801 through 3803 constitute an FIFO structure.

Figure 39:
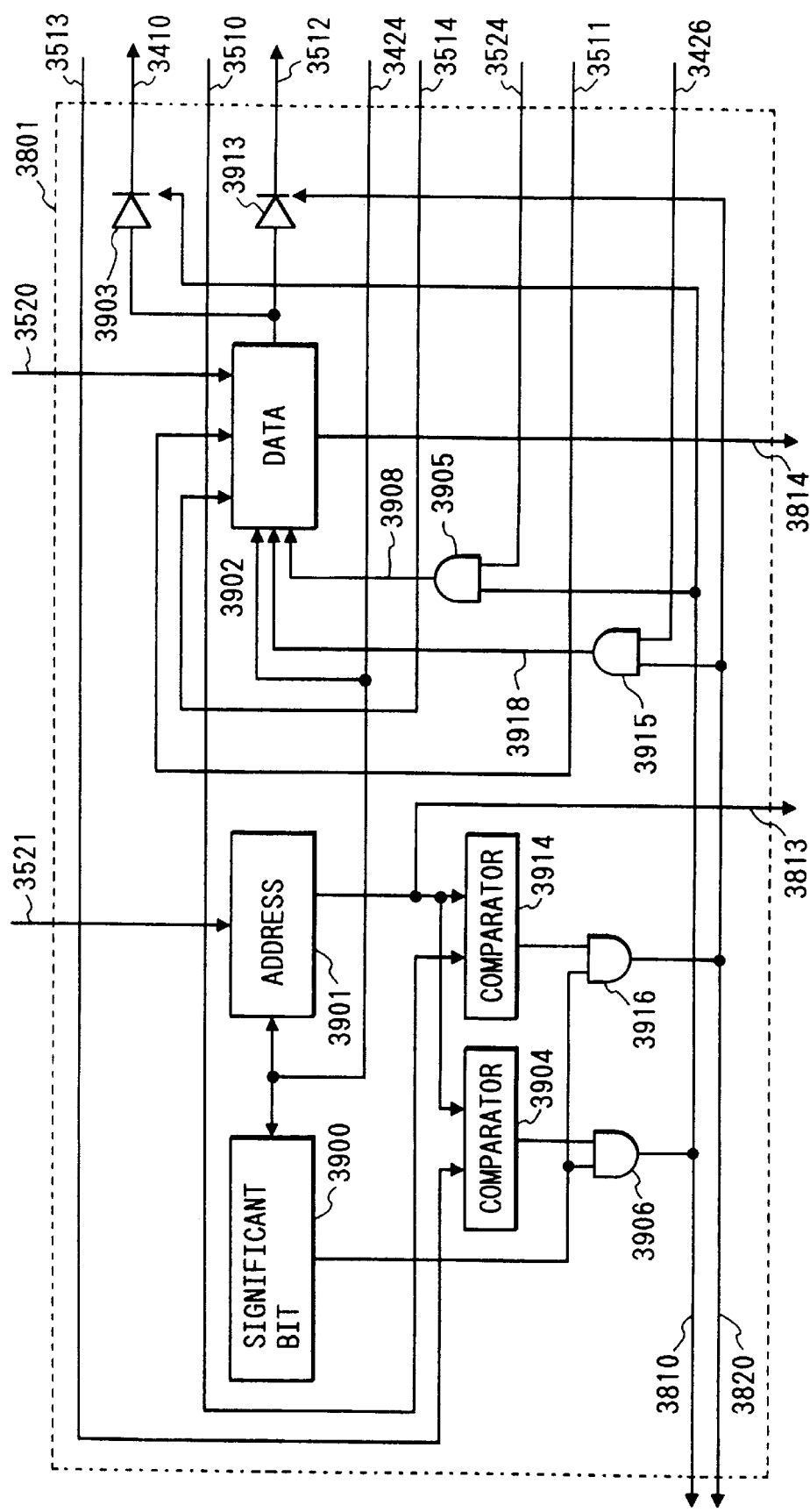
FIG. 39 is a schematic diagram of the cell 3801 in FIG. 38.

FIG. 39 shows details of the cell 3801 in FIG. 38. In FIG. 39, reference numerals 3900, 3901 and 3902 are registers that hold a valid bit, an address and data, respectively; 3904 and 3914 are comparators; 3905, 3906, 3915 and 3916 are AND gates; and 3903 and 3913 are tri-state buffers. The entry request 3424 is connected to the register 3900 that holds a valid bit, to the register 3901 that holds an address, and to the register 3902 that holds data. When the entry request 3424 is asserted, the valid bit 3900 is set, the register 3901 fetches the transfer address 3521, and the register 3902 fetches the transfer data 3520. The comparator 3904 compares address 3513 with the output 3813 of the address-holding register. When the output of the comparator 3904 and the valid bit are both asserted, the AND gate 3906 asserts the hit signal 3810 and opens the tri-state buffer 3903 to place the content of the data-holding register onto the data bus 3410. When the AND gate 3905 senses that the hit signal 3810 and the write request 3425 are both asserted, the AND gate 3905 asserts a signal 3908 to the data-holding register 3902 and causes the register 3902 to fetch the write data 3514. Likewise, the comparator 3914 compares address 3510 with the output 3813 of the address-holding register. When the output of the comparator 3914 and the valid bit are both asserted, the AND gate 3916 asserts the hit signal 3820 and opens the tri-state buffer 3913 to place the content of the data-holding register onto the data bus 3512. When the AND gate 3915 senses that the hit signal 3820 and the write request 3426 are both asserted, the AND gate 3915 asserts the signal 3918 to the data-holding register 3902 and causes the register 3902 to fetch the write data 3511.

As described, the cache memory of FIG. 38 is a full associative type cache memory that processes in parallel an access by two memory reference instructions and the write operation of transfer data from the main memory. Although complicated structurally so as to implement such functions, the cache memory of FIG. 38 is reduced in overall size because its capacity is as small as 256 bytes. This means that the cache memory can operate at high speed.

Figure 43:
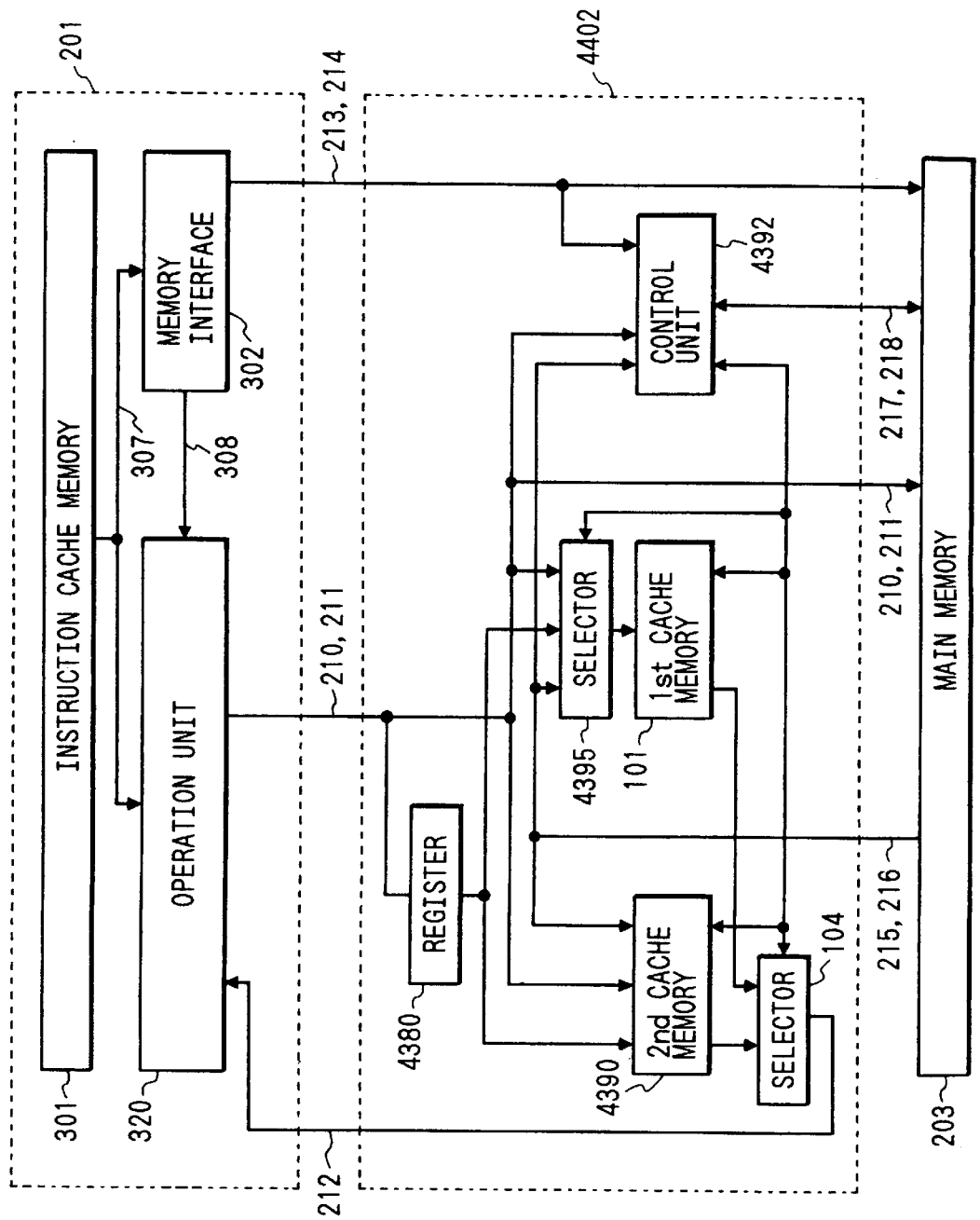
FIG. 43 is a schematic block diagram of a third embodiment of the present invention.

FIG. 43 shows a general view of a third embodiment of the present invention. Of the components of the third embodiment shown in FIG. 43, those identical to their counterparts in the embodiment of FIG. 1 are given the same reference numerals. The third embodiment is characterized in that its memory unit 4402 has a register 4380 for holding information about the ST instruction. The arrangement allows a cache hit judgment on the ST instruction and a data write operation to be carried out in different machine cycles. This reduces the time required to process the ST instruction per machine cycle and boosts the operating frequency correspondingly.

The third embodiment shown in FIG. 43 comprises an instruction unit 201, the memory unit 4402 and a main memory 203.

The instruction unit 201 is the same in constitution as that of the embodiment shown in FIG. 1.

The memory unit 4402 comprises a first cache memory 101, a second cache memory 4390, and a control section including selectors 104 and 4395, as well as a control unit 4392 for exchanging data with the first and the second cache memory. The first cache memory 101 is a single-port large-capacity cache memory which is the same in constitution as the first cache memory of the embodiment in FIG. 1. The second cache memory 4390 has three ports for parallel processing of access by a memory reference instruction, the writing of data by the ST instruction, and the writing of transfer data from the main memory. The memory unit 4402 sends data and a wait signal to the instruction unit 201 over a four-byte-wide read data bus 212 and a wait signal line 214, and transmits a request signal to the main memory 203 over a request signal line 218.

The main memory 203 is the same in structure as the main memory of the embodiment in FIG. 1.

The operation code of the instructions processed by the instruction unit 201 in FIG. 43 is the same in format as the operation code shown in FIG. 12. The types of the instructions to be processed are the same as those listed in FIG. 13.

Figure 45A:
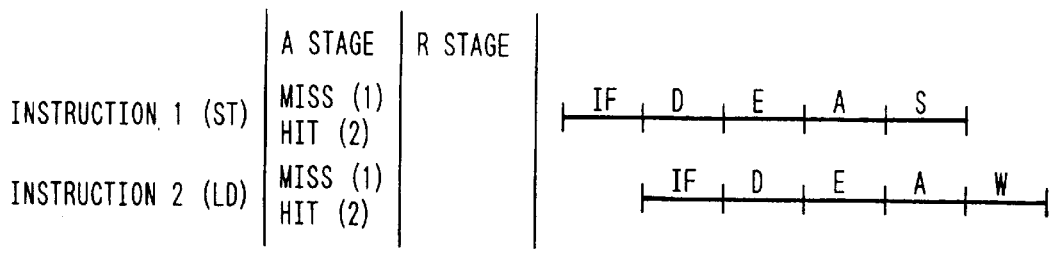
FIGS. 45(a), 45(b), 45(c) and 45(d) are diagrams for explaining the pipeline operation in effect when the data processor in FIG. 43 executes instructions.
Figure 45B:
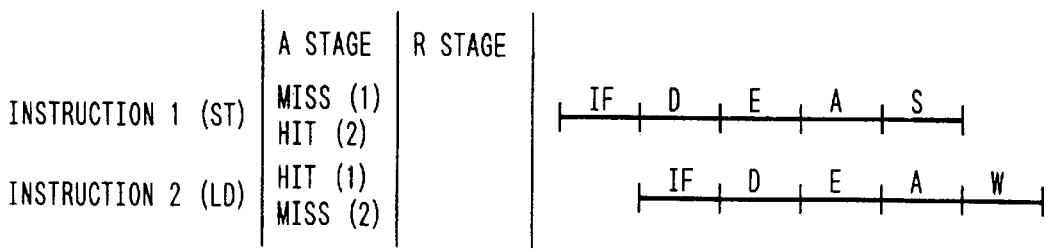
Figure 45C:
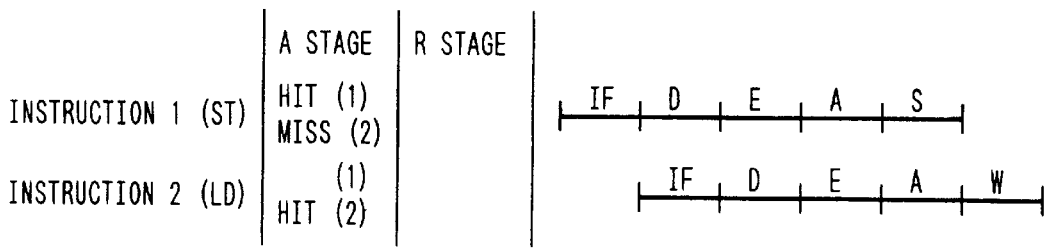
Figure 45D:
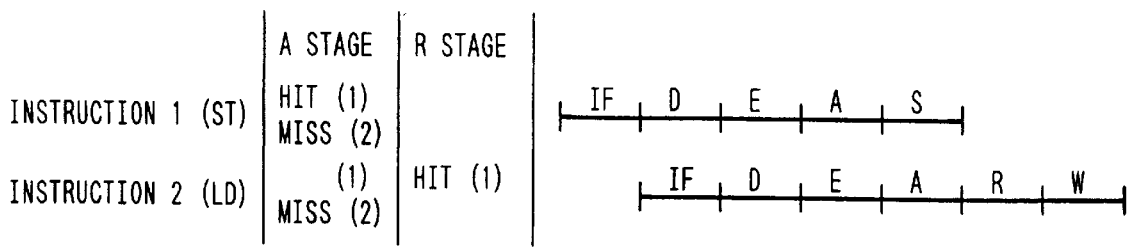

FIGS. 45(a), 45(b), 45(c) and 45(d) are illustrations for explaining the pipeline operation in effect when the data processor of FIG. 43 executes instructions. In FIGS. 45(a) through 45(d), IF represents an instruction fetch stage; D is a decode stage: E is an operation and address add stage; A is a cache access stage; W is a register write stage; R is a cache access retry stage; X is a wait stage; and S is an ST instruction data write stage. Unlike the pipeline operation shown in FIG. 4, the pipeline operation depicted in FIGS. 45(a) through 45(d) has the writing of data by the ST instruction carried out not in the stage A, but in stage S. Referring now to FIG. 45(a), instruction 1 gains access to both the first and the second cache memory simultaneously in stage A. Following a hit in the second cache memory, instruction 1 causes the applicable data to be written to the second cache memory in stage S. Instruction 2 accesses both the first and the second cache memory simultaneously in stage A. The reading of data from the second cache memory by instruction 2 is accomplished in the same cycle as that in which data is written to the second cache memory by instruction 1, whereas the second cache memory allows the reading of data by the LD instruction and the writing of data by the ST instruction to be processed in a single machine cycle. That is, the processing of instruction 2 is carried out without extra penalty. Following a hit in the second cache memory, instruction 2 causes the data read from the second cache memory to be written to the register in stage W. Referring to FIG. 45(b), instruction 1 gains access to both the first and the second cache memory simultaneously in stage A. Following a hit in the second cache memory, instruction 1 causes the applicable data to be written to the second cache memory in stage S. Instruction 2 accesses the first and the second cache memory simultaneously in stage A. The reading of data from the second cache memory by instruction 2 is performed in the same cycle as that in which data is written to the second cache memory by instruction 1, whereas the second cache memory allows the reading of data by the LD instruction and the writing of data by the ST instruction to be processed in a single machine cycle. That is, the processing of instruction 2 is carried out without extra penalty. Following a hit in the first cache memory, instruction 2 causes the data read from the first cache memory to be written to the register in stage W. Referring now to FIG. 45(c), instruction 1 gains access to the first and the second cache memory simultaneously in stage A. Following a hit in the first cache memory, instruction 1 causes the applicable data to be written to the first cache memory in stage S. Instruction 2 accesses the second cache memory alone in stage A. Because the reading of data from the first cache memory by instruction 2 cannot be performed in the same cycle as that in which data is written to the first cache memory by instruction 1, the first cache memory is not accessed in stage A. Following a hit in the second cache memory, instruction 2 causes the data read from the second cache memory to be written to the register in stage W without gaining access to the first cache memory. Referring to FIG. 45(d), instruction 1 accesses the first and the second cache memory simultaneously in stage A. Following a hit in the first cache memory, instruction 1 causes the applicable data to be written to the first cache memory in stage S. Instruction 2 gains access only to the second cache memory in stage A. Because the reading of data from the first cache memory by instruction 2 cannot be performed in the same cycle as that in which data is written to the first cache memory by instruction 1, the first cache memory is not accessed in stage A. Following a miss in the second cache memory, instruction 2 accesses the first cache memory in stage R. With a hit taking place in the first cache memory as a result of access thereto in stage R. the data read from the first cache memory is written to the register in stage W.

When the hit check of the ST instruction and the writing of data thereby are carried out in different stages, the amount of processing per stage is reduced and the processing speed is enhanced. When the ST instruction attains a hit in the second cache memory, the next LD instruction is executed without extra penalty. This means that if the PF2 instruction is used to transfer data to the second cache memory in advance, the processing is always carried out without extra penalty, whereby the performance is enhanced.

Figure 44:
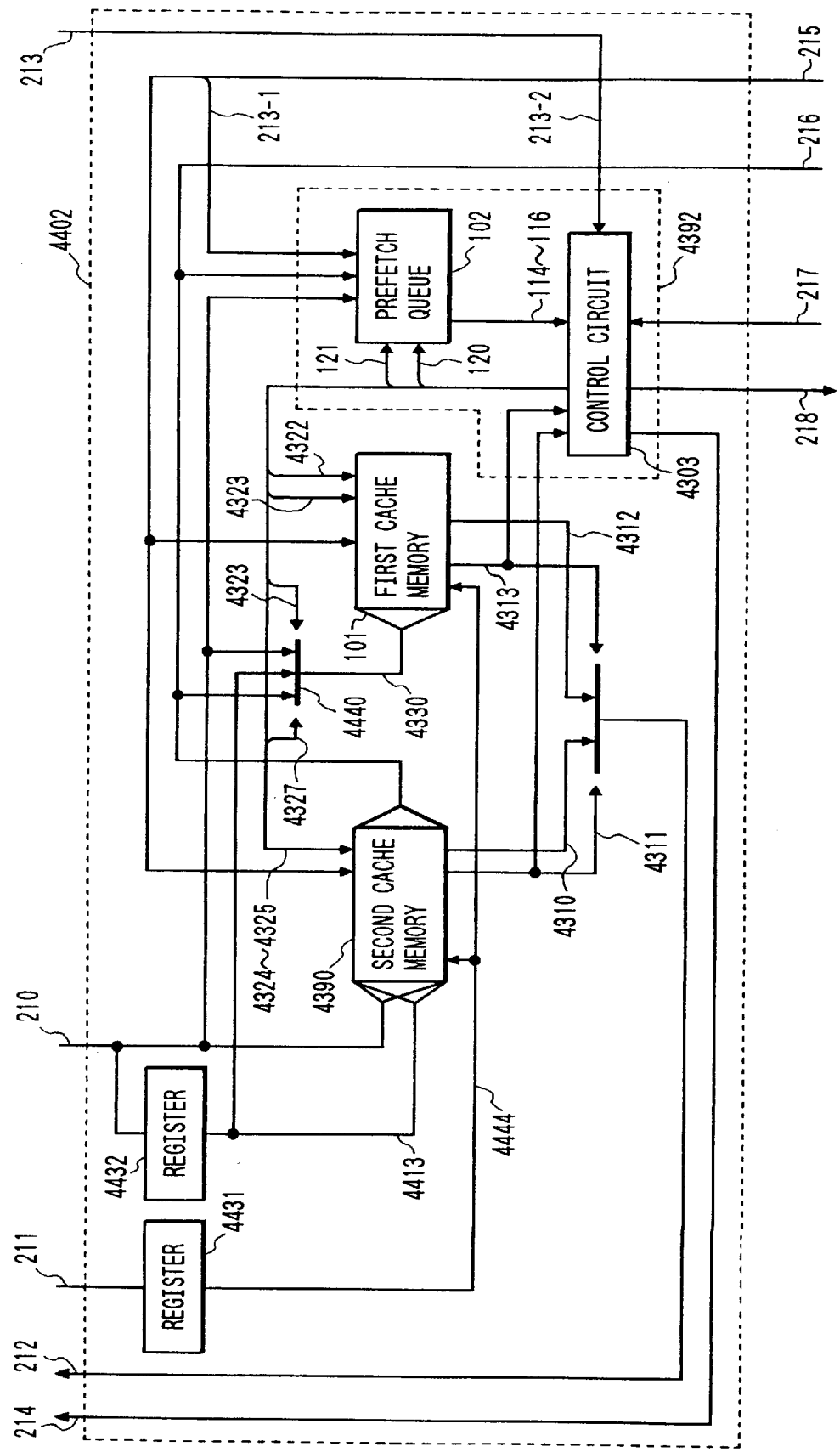
FIG. 44 is a schematic diagram of the memory unit 4402 in FIG. 43.

FIG. 44 shows details of the memory unit 4402 in FIG. 43. In FIG. 44, reference numeral 101 is a first cache memory, 4390 is a second cache memory, 102 is a four-entry prefetch queue, 4303 is a control circuit, 104 and 4440 are selectors, and 4431 and 4432 are registers.

The first cache memory 101 receives address 4330, transfer data 215, a selector control signal 4323, a write signal 4322 and write data 4444; and outputs read data 3212 and a hit signal 4313. The second cache memory 4390 receives read address 210, a write address 4413, transfer address 216, transfer data 215, an entry signal 4324, a write signal 4325 and the write data 4444; and outputs a read data 4310 and a hit signal 4311. The prefetch queue 102 receives a cache selection signal 213-1, transfer address 216, address 210, a set signal 120 and a reset signal 121; and outputs a full signal 114, a hit signal 115 and a cache selection signal 116.

The control circuit 4303 receives a control signal 213-2 from the instruction unit; the full signal 114, hit signal 115 and cache selection signal 116 from the prefetch queue 102; a response signal 217 from the main memory; the hit signal 4311 from the second cache memory 4390; and the hit signal 4313 from the first cache memory. In turn, the control circuit 4303 outputs a wait signal 214 to the instruction unit; the set signal 120 and reset signal 121 to the prefetch queue 102; a transfer request signal 218 to the main memory; the entry signal 4324 and write signal 4325 to the second cache memory 4390; the write signal 4322 and selector control signal 4323 to the first cache memory 101; and the selector control signals 4323 and 4327 to the selector 4440 respectively.

The selector 104 receives the data 4310 and hit signal 4311 from the second cache memory, and the data 4312 and hit signal 4313 from the first cache memory 101. When the hit signal 4311 is asserted, the selector 104 reads and outputs the data 4310 that is placed onto a read data bus 212; and, when the hit signal 4313 is asserted, the selector 104 reads and outputs the data 4312 that is placed onto the read data bus 212. The selector 4440, under control of the selector control signals 4323 and 4327, selects one of address 210, address 4413 and transfer address 216. The selected address is output as the selector output 4330 to the first cache memory 101.

Where the write signal 4322 designates a read operation from the first cache memory 101, the content of address 4330 is read from the first cache memory 101. The read data 4312 is output along with the hit signal 4313. Where the write signal 4322 designates a write operation to the first cache memory 101, either the transfer data 215 is written thereto if the selector control signal 4323 is 1, or the content of the write data 4444 is written if the selector control signal 4323 is 0.

The second cache memory 4390 is checked for the content of address 210. The data 4310 read out accordingly and the hit signal 4311 are then output from the second cache memory 4390. If the write signal 4325 is asserted to designate a write operation, the second cache memory 4390 is checked for the content of address 4413. In case of a hit, the content of the data bus 4444 is written to the second cache memory 4390. If the entry signal 4324 is asserted in parallel with the above operation, transfer address 216 paired with the transfer data 215 is entered into the second cache memory 4390.

The operation of the prefetch queue 102 shown in FIG. 44 is the same as that of the prefetch queue 102 shown in FIG. 2.

The register 4431 receives the write data 211 and places it onto the data bus 4444 in the next cycle. The register 4432 receives address 210 and places it onto the bus 4413 in the next cycle.

Figure 48:
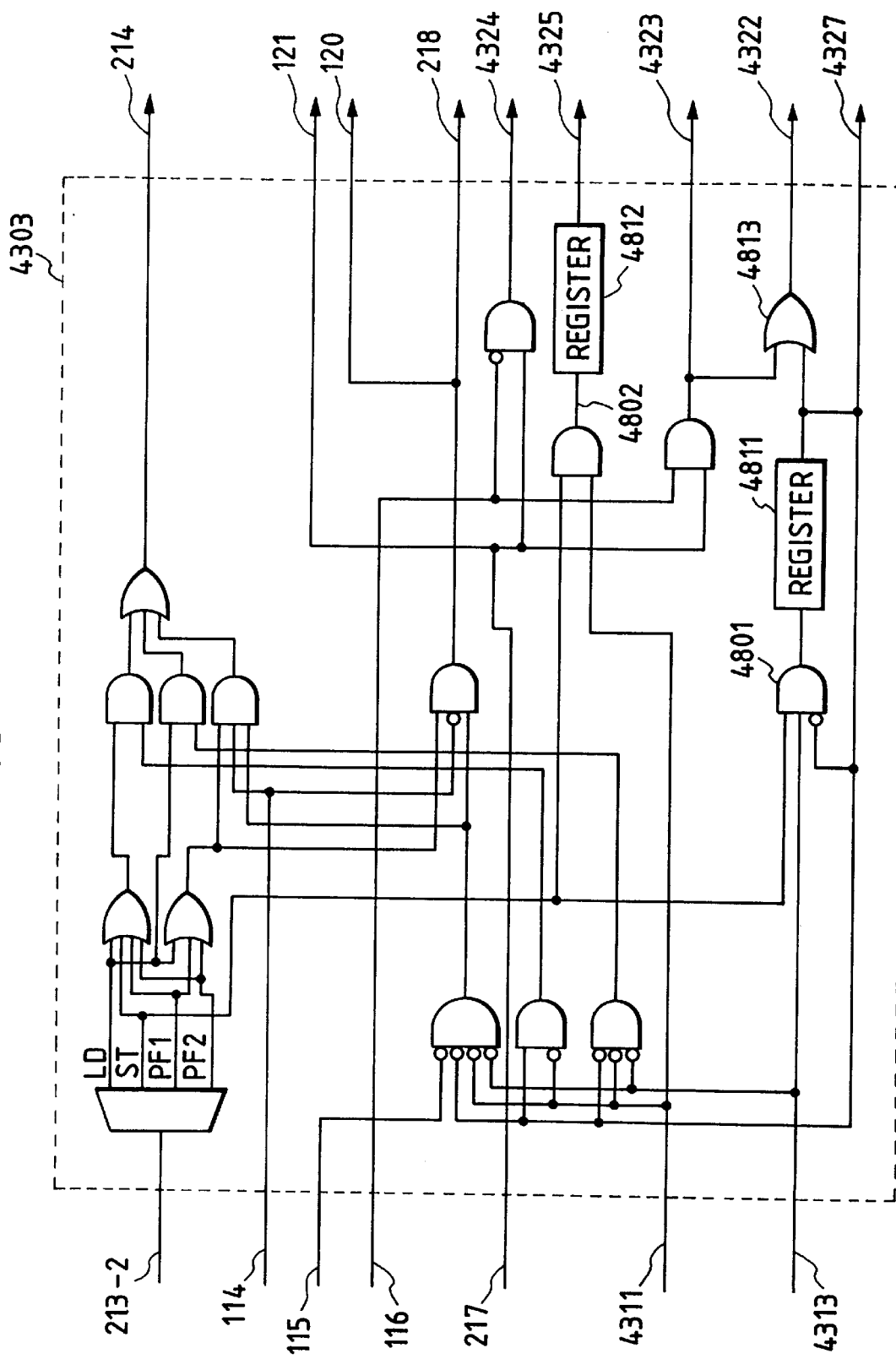
FIG. 48 is a schematic diagram of the control circuit 4303 in FIG. 44.

FIG. 48 shows details of the control circuit 4303 in FIG. 44. The control circuit 4303 decodes the control signal 213-2 to accept the start of any one of the instructions LD, ST, PF1 and PF2. The control signal 4327 designates the writing of store data to the first cache memory. When the control signal 4327 is set to 1, the first cache memory cannot be accessed by any other instruction. If the control signal 4327 is set to 1, if the LD, ST, PF1 or PF2 instruction is being executed, and if the hit signal 4311 from the second cache memory is negated, then the wait signal 214 is asserted because of the need to access the first cache memory in the next cycle. If the control signal 4327 is set to 0, if the LD instruction is being executed, and if the hit signal 4313 from the first cache memory and the hit signal 4311 from the second cache memory are both negated, that means a miss has occurred in both cache memories. Thus, the wait signal 214 is asserted so that the instruction unit will wait while data is being transferred from the main memory. If the control signal 4327 is set to 0, if the LD, PF1 or PF2 instruction is being executed, if the hit signal 4313 from the first cache memory and the hit signal 4311 from the second cache memory are both negated, and if the hit signal 115 from the prefetch queue is negated but the full signal 114 therefrom is asserted, that means the prefetch queue is full and no more instructions can be placed into the queue. In that case, the wait signal 214 is asserted so that the instruction unit will wait until the prefetch queue is vacated. If the control signal 4327 is set to 0, if the LD, PF1 or PF2 instruction is being executed, if the hit signal 4313 from the first cache memory and the hit signal 4311 from the second cache memory are both negated, and if the hit signal 115 and full signal 114 from the prefetch queue are both negated, then the transfer request signal 218 to the main memory is asserted. At the same time, the set signal 120 to the prefetch queue is asserted and an entry is made into the prefetch queue. If the control signal 4327 is set to 0, if the ST instruction is being executed, and if the hit signal 4313 from the first cache memory is asserted, then a control signal 4801 is asserted. When the control signal 4801 is asserted, a register 4811 asserts the control signal 4327 in the next cycle. When the control signal 4327 is asserted, an OR gate 4813 asserts the write signal 4322 to the first cache memory. This causes store data to be written to the first cache memory. Likewise, if the hit signal 4311 from the second cache memory is asserted during execution of the ST instruction, a control signal 4802 is asserted. With the control signal 4802 asserted, the register 4812 asserts the write signal 4325 to the second cache memory in the next cycle. This causes store data to be written to the second cache memory.

When the response signal 217 from the main memory is asserted, the reset signal 121 to the prefetch queue 102 is asserted so that the applicable entry will be reset from the queue. At the same time, a check is made on the cache selection signal 116 to see if it designates a write operation to the first cache memory. If the cache selection signal 116 is found to designate a write operation to the first cache memory, then the write signal 4322 and selection signal 4323 to the first cache memory are asserted. If the cache selection signal 116 is found to designate a write operation to the second cache memory, then the entry signal 4324 to the second cache memory is asserted. The transfer data is then entered into the selected cache memory.

Figure 46:
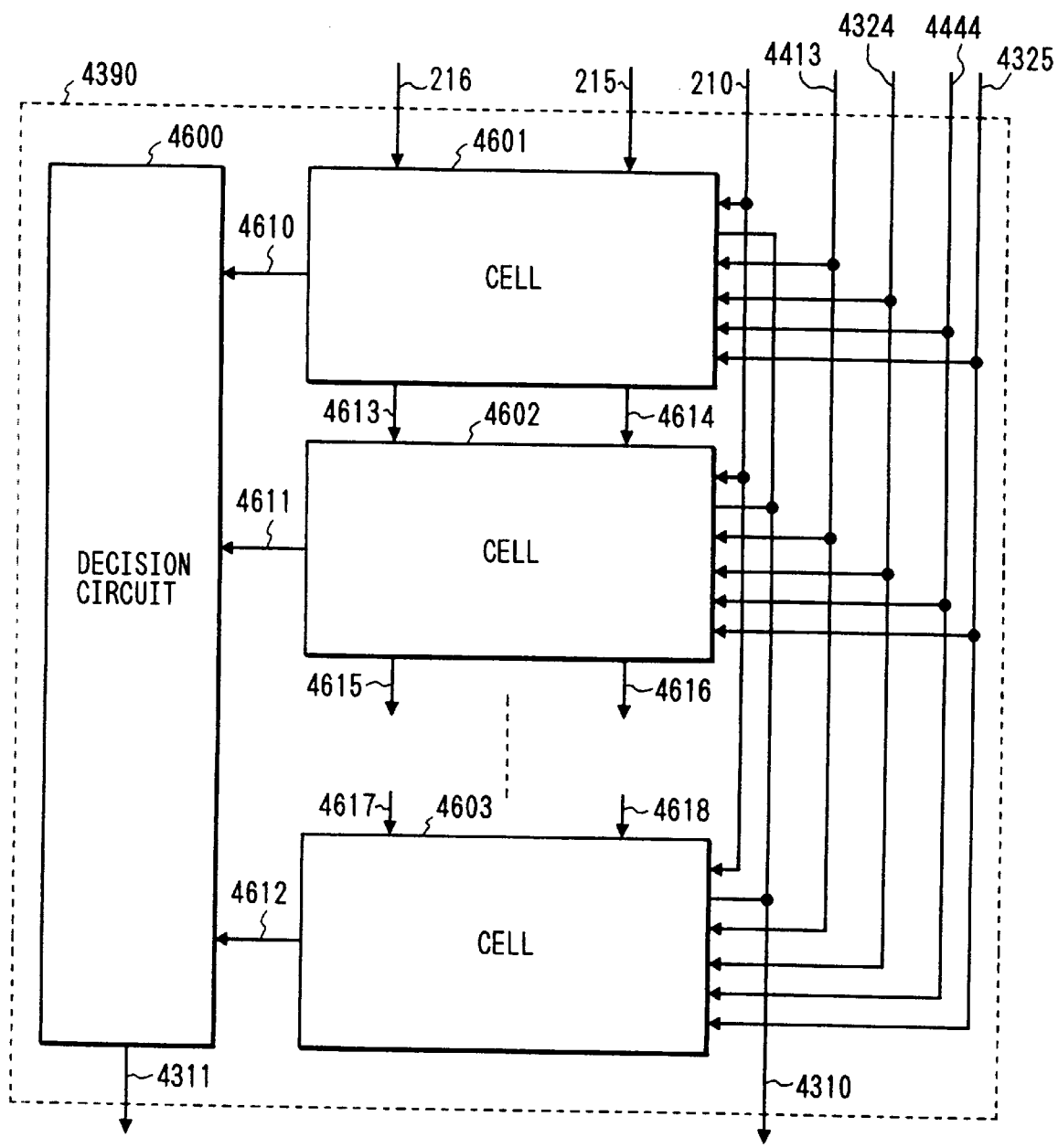
FIG. 46 is a schematic block diagram of the second cache memory 4390 in FIG. 44.

FIG. 46 shows details of the second cache memory 4390 in FIG. 44. The cache memory shown in FIG. 46 is a full associative type cache memory that has a block size of 4 bytes and a capacity of 256 bytes. In FIG. 46, reference numeral 4600 is a judging circuit, and 4601 through 4603 are cells that hold combinations of valid bits, addresses and data. The cells 4601 through 4603 receive read address 210, write address 4413, the entry request 4324, the write data 4444 and write request 4325; and outputs the data 4310. In addition, the cells 4601 through 4603 send hit signals 4610 through 4612 respectively to the judging circuit 4600. The cell 4601 receives transfer address 216 and the transfer data 215, and outputs address 4613 and data 4614 to the cell 4602. Likewise, the cell 4602 sends address 4615 and data 4616 to the next cell. The last cell 4612 receives address 4617 and data 4618.

When any one of the hit signals 4610 through 4612 is asserted, the judging circuit 4600 asserts the hit signal 4311. The cell 4601 compares read address 210 with the internally retained address. If the two addresses match and are found valid, the cell 4601 outputs the hit signal 4610 and places the internally retained corresponding data onto a bus 4310. If the write request 4325 is asserted, the cell 4601 compares write address 4413 with the internally retained address. If the two addresses match and the valid bit is asserted, the cell 4601 fetches the content of the write data 4444. If the entry request 4324 is asserted in parallel with the above operation, the cell 4601 asserts its valid bit and fetches transfer address 216 and the transfer data 215. At this point, the cell 4602 fetches via the signals 4613 and 4614 the address and data which are retained in the cell 4601. That is, the cells 4601 through 4603 constitute an FIFO structure.

Figure 47:
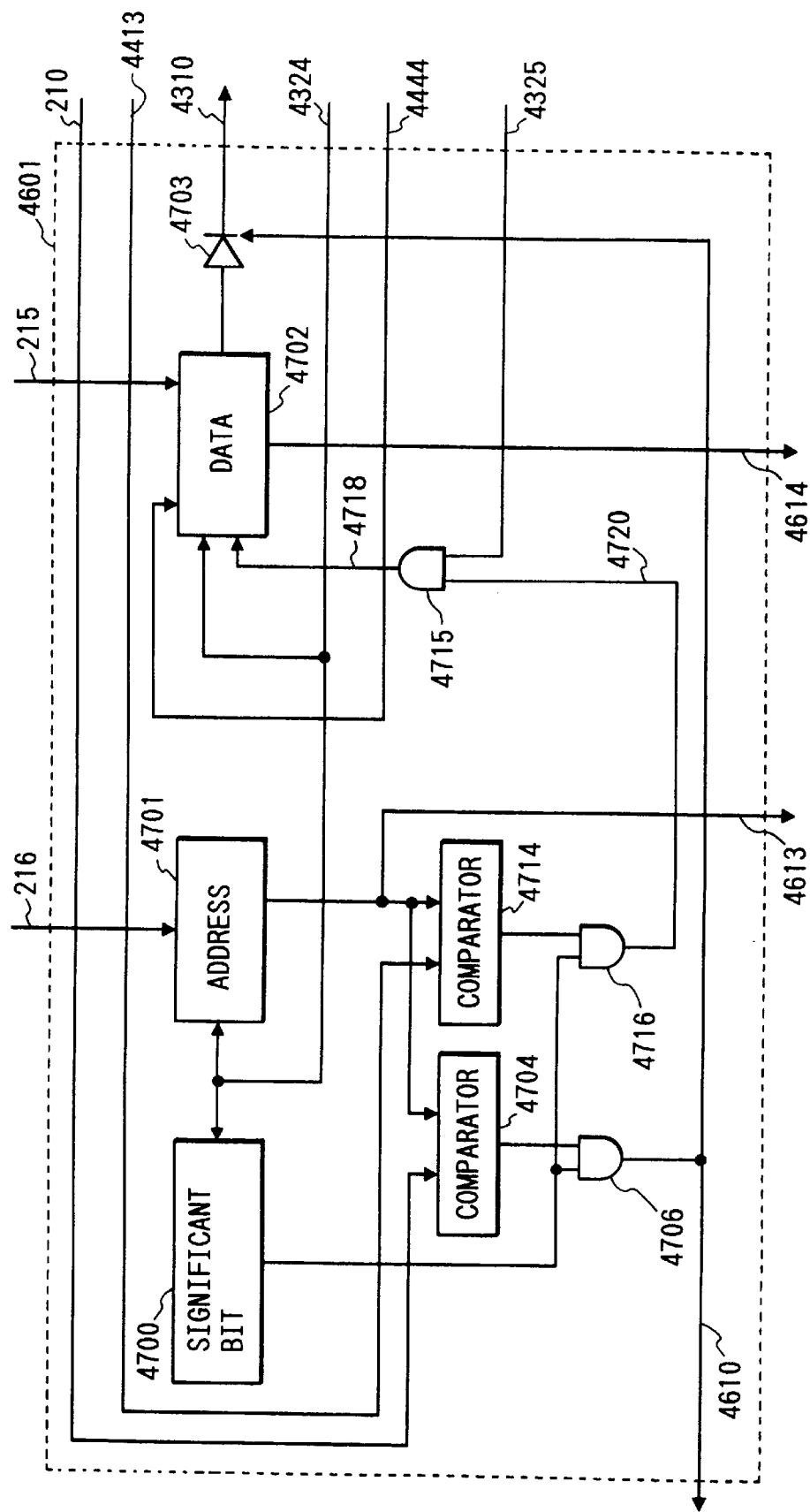
FIG. 47 is a schematic diagram of the cell 4601 in FIG. 46.

FIG. 47 shows details of the cell 4601 in FIG. 46. In FIG. 47, reference numerals 4700, 4701 and 4702 are registers that hold a valid bit, an address and data, respectively; 4704 and 4714 are comparators; 4706, 4715 and 4716 are AND gates; and 4703 is a tri-state buffer. The entry request 4324 is connected to the register 4700 that holds a valid bit, to the register 4701 that holds an address and to the register 4702 that retains data. When the entry request 4324 is asserted, the valid bit 4700 is set, the address-holding register 4701 fetches transfer address 216, and the data-holding register 4702 fetches transfer data 215. The comparator 4704 compares read address 210 with the output 4613 of the address-holding register. If the output of the comparator 4704 and the valid bit are both asserted, then the AND gate 4706 asserts the hit signal 4610 and opens the tri-state buffer 4703 to place the content of the data-holding register onto the data bus 4310. Meanwhile, the comparator 4714 compares write address 4413 with the output 4613 of the address-holding register. If the output of the comparator 4714 and the valid bit are both asserted, the AND gate 4716 asserts a hit signal 4720. When the hit signal 4720 and write request 4325 are both asserted, the AND gate 4715 asserts a signal 4718 to the data-holding register 4702 to place the write data 4444 into the data-holding register 4702.

As described, the cache memory of FIG. 46 is a full associative type cache memory that processes in parallel the access by memory reference instructions, the writing of data by the ST instruction and the writing of transfer data from the main memory. Although complicated structurally so as to implement such functions, the cache memory of FIG. 46 is reduced in overall size because its capacity is as small as 256 bytes. This means that the cache memory can operate at high speed.

Figure 49:
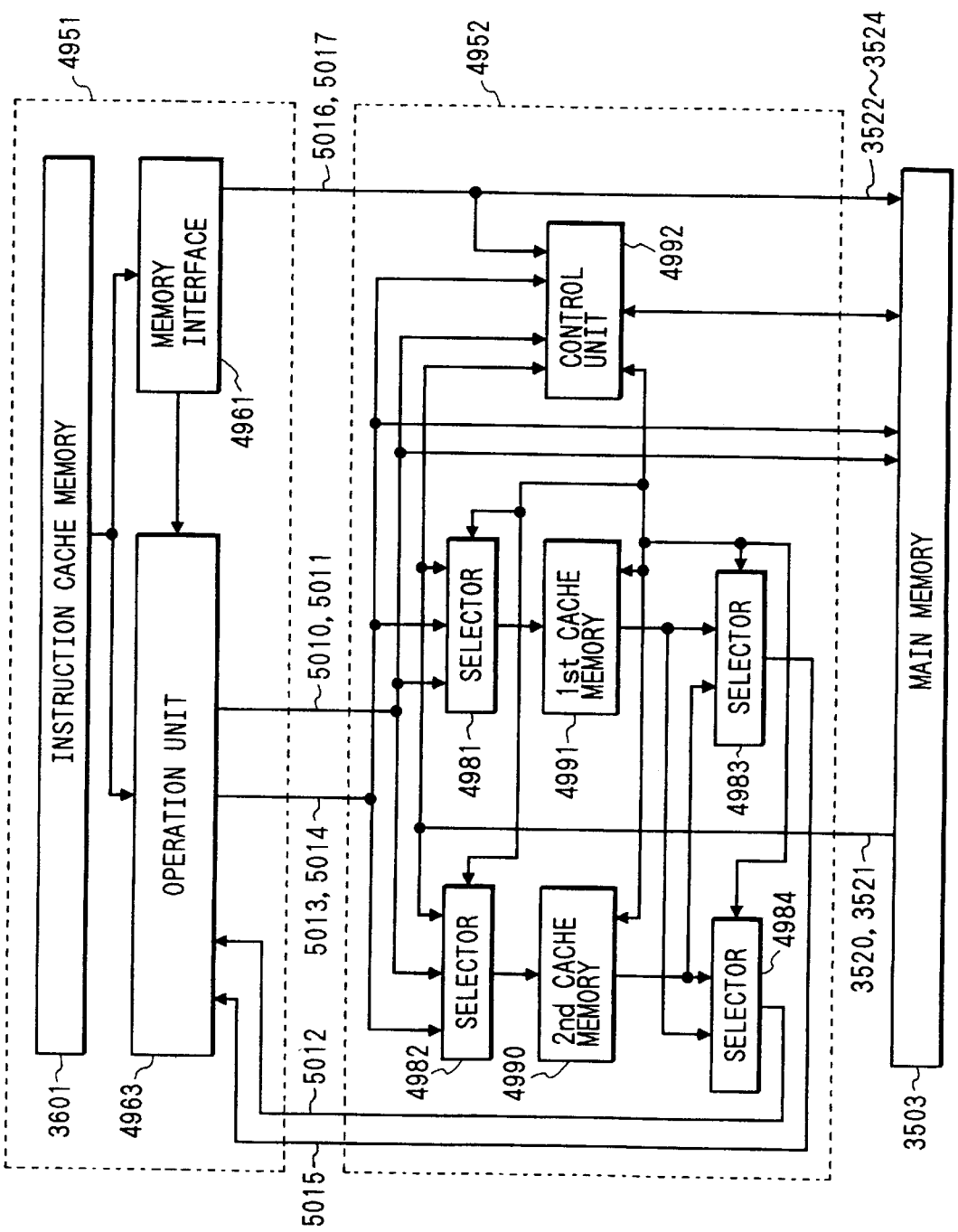
FIG. 49 is a schematic block diagram of a fourth embodiment of the present invention.

FIG. 49 shows a general view of a fourth embodiment of the present invention. Of the components of the fourth embodiment in FIG. 49, those identical to their counterparts in the embodiment of FIG. 34 are given the same reference numerals. The fourth embodiment is characterized in that the first and second cache memories are each a single-port cache memory and that references to the first cache memory and the second cache memory are processed in parallel. Because the second cache memory of the embodiment in FIG. 34 is small in capacity, the hit rate of that embodiment using the cache memory tends to drop with respect to data that are likely to be used repeatedly. By contrast, the embodiment shown in FIG. 49 has a second cache memory which provides a large capacity, but is relatively small physically. Thus, the hit rate of the fourth embodiment does not drop when it utilizes a second cache memory in accommodating data that are likely to be used repeatedly. With the repeatedly usable data placed in both the first and the second cache memory, the fourth embodiment can process memory reference instructions in parallel regarding such repeatedly usable data.

The operation code of the instructions processed by the instruction unit 4951 in FIG. 49 is the same in format as the operation code shown in FIG. 12.

FIG. 51 is an illustration for explaining the types of instructions to be processed by the data processor of FIG. 49. In FIG. 51, the AND, OR, NOT, ADD, SUB and BRA instructions are the same as those explained with reference FIG. 13.

The load instruction LD1 adds the contents of registers A and B. takes the result of the addition as an address, reads data from that address, and loads the read data in register C. This instruction is used when the first cache memory is highly likely to contain the applicable data. Thus, the first cache memory is accessed preferentially when the LD1 instruction is processed.

The load instruction LD2 also adds the contents of registers A and B. takes the result of the addition as an address, reads data from that address, and loads the read data in register C. This instruction is used when the second cache memory is highly likely to contain the applicable data. Thus, the second cache memory is accessed preferentially when the LD2 instruction is processed.

The store instruction ST1 takes the content of register B as an address and writes the content of register A to that address. This instruction is used when the first cache memory is highly likely to contain the applicable data. Thus, the first cache memory is accessed preferentially when the ST1 instruction is processed.

The store instruction ST2 also takes the content of register B as an address and writes the content of register A to that address. This instruction is used when the second cache memory is highly likely to contain the applicable data. Thus, the second cache memory is accessed preferentially when the ST2 instruction is processed.

The PF1 and PF2 instructions are the same as those explained with reference to FIG. 13.

FIGS. 50(a) and 50(a) are illustrations for explaining the pipeline operation in effect when the data processor of FIG. 49 executes instructions. In FIGS. 50(a) and 50(b), IF represents an instruction fetch stage; D is a decode stage; E is an operation and address add stage; A is a cache access stage; W is a register write stage; R is a cache access retry stage; and X is a wait stage. For execution of the LD1 or ST1 instruction, the first cache memory is accessed in stage A. In case of a miss, the second cache memory is accessed in stage R. For execution of the LD2 or ST2 instruction, the second cache memory is accessed in stage A. With a miss detected, the first cache memory is accessed in stage R. The pipeline operation of FIG. 50(a) will now be described. When two load instructions (instructions 1 and 2) are to be processed in parallel, instruction 1 gains access to the first cache memory in stage A, while instruction 2 accesses the second cache memory also in stage A. Following a hit in the first cache memory, instruction 1 reads the data from the first cache memory and writes the read data to the register in stage W. Following a hit in the second cache memory, instruction 2 reads the data from the second cache memory and writes the read data to the register in stage W. Where instructions 3 and 4 are to be processed in parallel, instructions 3 and 4 gain access, respectively, to the first and the second cache memory in stage A. Following a hit in the first cache memory, instruction 3 reads the data from the first cache memory and writes the read data to the register in stage W. Following a miss in the second cache memory, instruction 4 accesses the first cache memory in stage R. reads the data therefrom and writes the read data to the register in stage W. Where instructions 5 and 6 are to be processed in parallel, instructions 5 and 6 gain access respectively to the first and the second cache memory in stage A. Following a miss in the first cache memory, instruction 5 accesses the second cache memory in stage R, reads the data therefrom and writes the read data to the register in stage W. Following a hit in the second cache memory, instruction 6 reads the data from the second cache memory and writes the read data to the register in stage W. Where instructions 7 and 8 are to be processed in parallel, instructions 7 and 8 gain access respectively to the first and the second cache memory in stage A. Following a miss in the first cache memory, instruction 7 accesses the second cache memory in stage R. reads the data therefrom and writes the read data to the register in stage W. Following a miss in the second cache memory, instruction 8 accesses the first cache memory in stage R. reads the data therefrom and writes the read data to the register in stage W. The pipeline operation of FIG. 50(b) will now be described. In this case, instructions 1, 3, 5 and 7 are each the LD2 instruction; and instructions 2, 4, 6 and 8 are each the LD1 instruction. In this case, instructions 1, 3, 5 and 7 gain access to the second cache memory in stage A, whereas instructions 2, 4, 6 and 8 access the first cache memory in stage A. Other details of the operation are the same as in the pipeline operation of FIG. 50(a).

The pipeline operation in executing the store instruction is similar to that in executing the load instruction. That is, the cache memories are checked in stage A or in stage R. In case of a hit, the data is written to the applicable cache memory in stage A or in stage R.

As described, when the LD1 or ST1 instruction attains a hit in the first cache memory or when the LD2 or ST2 instruction gains a hit in the second cache memory, the memory reference instructions may be processed in parallel. Thus, the LD1 and ST1 instructions are used to access the data that was transferred to the first cache memory by the PF1 instruction; and the LD2 and ST2 instructions are used to access the data that was transferred to the second cache memory by the PF2 instruction. This makes it possible to process the memory reference instructions in parallel, whereby the processing performance is boosted.

The fourth embodiment shown in FIG. 49 will now be described. The data processor of FIG. 49 comprises the instruction unit 4951, a memory unit 4952 and a main memory 3503.

The instruction unit 4951 is substantially the same in constitution as that described with reference to FIG. 36, except for small differences in the decoder and memory interface structures. These differences are attributable to the different types of instructions to be processed, i.e. the instructions in FIG. 13 now being replaced by those in FIG. 51 so that the decoder and the memory interface need to be slightly modified to deal with the different instruction types. The instruction unit 4951 exchanges data with a first cache memory 4991 and a second cache memory 4990 over buses 5010 through 5012 and 5013 through 5015. That is, the instruction unit 4951 sends addresses, data and control signals to the memory unit 4952 and main memory 3503 over the address buses 5010 and 5013, four-byte-wide write data buses 5011 and 5014, and a control signal line 5016.

The memory unit 4952 is composed of the first cache memory 4991, the second cache memory 4990, and a control section including selectors 4981 through 4984 and a control unit 4992 for exchanging data with the two cache memories. The first and second cache memories 4991 and 4990 are a direct map type cache memory each having a capacity of 512 kilobytes and a block size of 16 bytes. Except for a difference in capacity, each of these cache memories is the same in constitution as the cache memory described with reference to FIG. 11. The memory unit 4952 sends data and a wait signal to the instruction unit 4951 over the four-byte-wide data buses 5012 and 5015 and a wait signal line 5017, and outputs transfer request signals 3523 and 3524 to the main memory 3503.

The main memory 3503, which stores instructions and data, transfers data to the first cache memory 4991 and second cache memory 4990 over buses 3520 and 3521. That is, the main memory 3503 outputs data, an address and a response signal to the memory unit 4952 over the transfer data bus 3520, transfer address bus 3521 and a response signal line 3522.

Where the first instruction is the LD1 instruction, the instruction unit 4951 places onto the address bus 5013 the address of the data to be loaded, and uses a control signal 5016 to indicate that the LD1 instruction is now in effect. The memory unit 4952 first selects address 5013 using the selector 4981 and performs a read operation on the first cache memory 4991. In case of a hit in the first cache memory 4991, the memory unit 4952 causes the selector 4983 to select the data read from the first cache memory 4991 and places the selected data onto the data bus 5015. In case of a miss in the first cache memory 4991, the memory unit 4952 sets to 1 the wait signal 5017 to the instruction unit 4951, causes the selector 4982 to select address 5013 in the next cycle, and performs a read operation on the second cache memory 4990. In case of a hit in the second cache memory 4990, the memory unit 4952 causes the selector 4983 to select the data read from the second cache memory 4990, and places the selected data onto the data bus 5015. At the same time, the wait signal 5017 is set to 0. In case of a miss in the second cache memory 4990, the data transfer request signal 3523 to the main memory 3503 is set to 1. Upon receipt of the transfer request signal 3523, the main memory 3503 reads the applicable data, places the read data onto the transfer data bus 3520, and returns the response signal 3522 to the memory unit 4952. In turn, the memory unit 4952 writes the transferred data to the first cache memory 4991, simultaneously transfers the data to the instruction unit 4951 over the data bus 5015, and sets the wait signal 5017 to 0.

Where the first instruction is the LD2 instruction, the instruction unit 4951 places onto the address bus 5013 the address of the data to be loaded, and uses the control signal 5016 to indicate that the LD2 instruction is now in effect. The memory unit 4952 first causes the selector 4982 to select address 5013 and performs a read operation on the second cache memory 4990. In case of a hit in the second cache memory 4990, the memory unit 4952 causes the selector 4983 to select the data read from the second cache memory 4990, and places the selected data onto the data bus 5015. In case of a miss in the second cache memory 4990, the memory unit 4952 sets to 1 the wait signal 5017 to the instruction unit 4951, causes the selector 4981 to select address 5013 in the next cycle, and performs a read operation on the first cache memory 4991. In case of a hit in the first cache memory 4991, the memory unit 4952 causes the selector 4983 to select the data read from the first cache memory 4991, and places the selected data onto the data bus 5015. At the same time, the wait signal 5017 is set to 0. In case of a miss in the first cache memory 4991, the data transfer request signal 3523 to the main memory 3503 is set to 1. Upon receipt of the transfer request signal 3523, the main memory 3503 reads the applicable data, places the read data onto the transfer data bus 3520, and returns the response signal 3522 to the memory unit 4952. In turn, the memory unit 4952 writes the transferred data to the second cache memory 4990, simultaneously transfers the data to the instruction unit 4951 over the data bus 5015, and sets the wait signal 5017 to 0.

Where the first instruction is the ST1 instruction, the instruction unit 4951 places the write address onto the address bus 5013, puts onto the data bus 5014 the data to be written, and uses the control signal 5016 to indicate that the ST1 instruction is now in effect. The memory unit 4952 first causes the selector 4981 to select address 5013 and performs a read operation on the first cache memory 4991. In case of a hit in the first cache memory 4991, the memory unit 4952 causes the selector 4981 to select write data 5014, and writes the selected data to the first cache memory 4991. In case of a miss in the first cache memory 4991, the memory unit 4952 sets to 1 the wait signal 5017 to the instruction unit 4951, causes the selector 4982 to select address 5013 in the next cycle, and performs a read operation on the second cache memory 4990. In case of a hit in the second cache memory 4990, the memory unit 4952 causes the selector 4982 to select the write data 5014, and writes the selected data to the second cache memory 4990. In case of a miss in the second cache memory 4990, the memory unit 4952 sets the wait signal 5017 to 0 without transferring data from the main memory 3503. In parallel with the above operation, the main memory 3503 has the same data written thereto.

Where the first instruction is the ST2 instruction, the instruction unit 4951 places the write address onto the address bus 5013, puts onto the data bus 5014 the data to be written, and uses the control signal 5016 to indicate that the ST2 instruction is now in effect. The memory unit 4952 first causes the selector 4982 to select address 5013 and performs a read operation on the second cache memory 4990. In case of a hit in the second cache memory 4990, the memory unit 4952 causes the selector 4982 to select the write data 5014 and writes the selected data to the second cache memory 4990. In case of a miss in the second cache memory 4990, the memory unit 4952 sets to 1 the wait signal 5017 to the instruction unit 4951, causes the selector 4981 to select address 5013 in the next cycle, and performs a read operation on the first cache memory 4991. In case of a hit in the first cache memory 4991, the memory unit 4952 causes the selector 4981 to select the write data 5014 and writes the selected data to the first cache memory 4991. In case of a miss in the first cache memory 4991, the memory unit 4952 sets the wait signal 5017 to 0 without transferring data from the main memory 3503. In parallel with the above operation, the main memory 3503 has the same data written thereto.

Where the first instruction is the PF1 instruction, the instruction unit 4951 places onto the address bus 5013 the data to be prefetched, and uses the control signal 5016 to indicate that the PF1 instruction is now in effect. The memory unit 4952 causes the selectors 4981 and 4982 to select address 5013, and performs read operations simultaneously on the first cache memory 4991 and on the second cache memory 4990. In case of a hit in the first or second cache memory 4991 or 4990, the memory unit 4952 terminates its processing without transferring data from the main memory 3503. In case of a miss in both the first and the second cache memory 4991 and 4990, the memory unit 4952 sets to 1 the data transfer request signal 3523 to the main memory 3503. Upon receipt of the transfer request signal 3523, the main memory 3503 reads the applicable data, places the read data onto the transfer data bus 3520, and returns the response signal 3522 to the memory unit 4952. In turn, the memory unit 4952 writes the transferred data to the first cache memory 4991. Where the first instruction is the PF2 instruction, the processing is approximately the same except that the data transferred from the main memory 3503 is written to the second cache memory 4990.

The processing of the second instruction is substantially the same as that of the first instruction. Data exchanges are conducted over the address bus 5010, read data bus 5012 and write data bus 5011.

Figure 16:
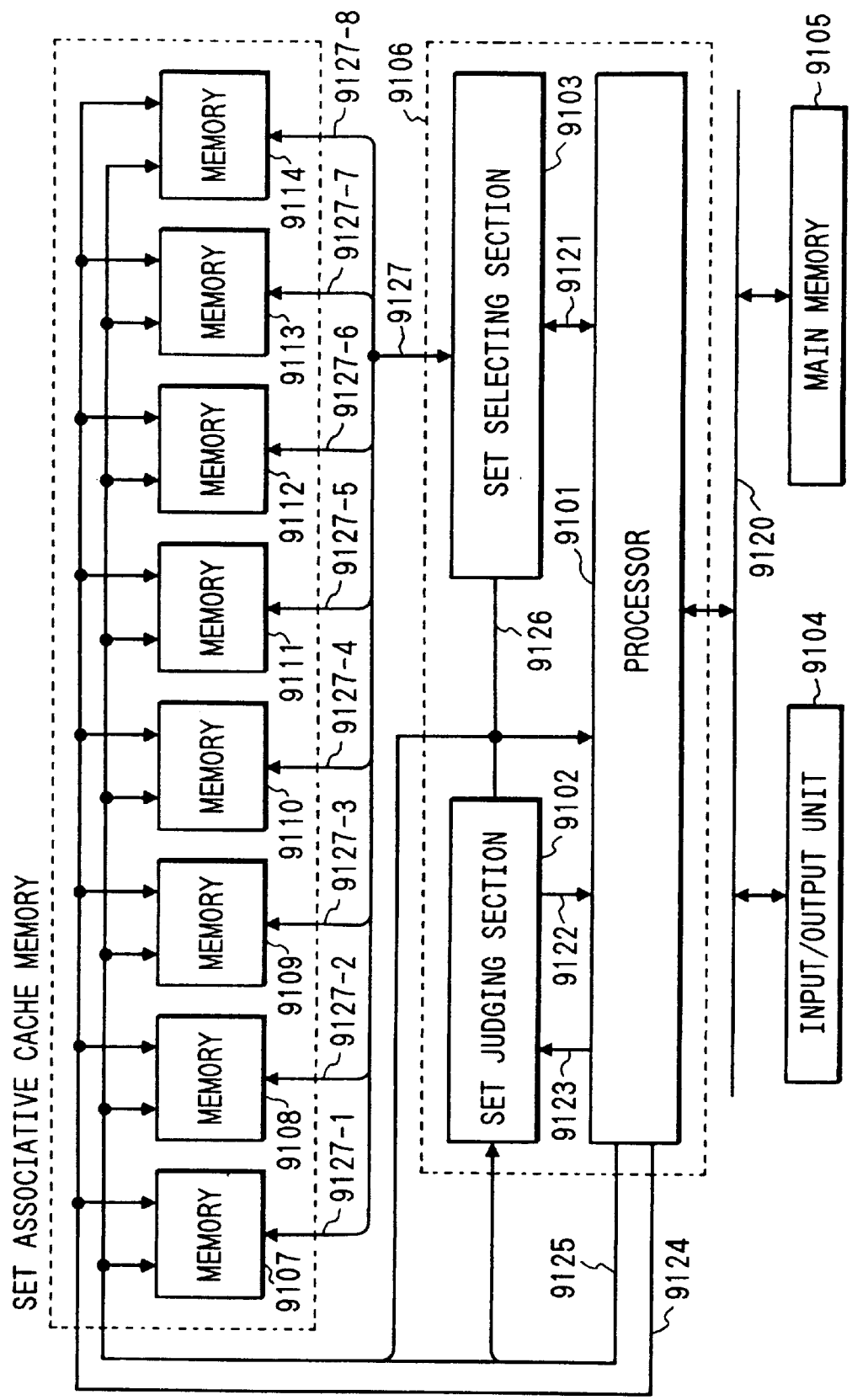
FIG. 16 is a schematic block diagram of an embodiment of the present invention.
Figure 17:
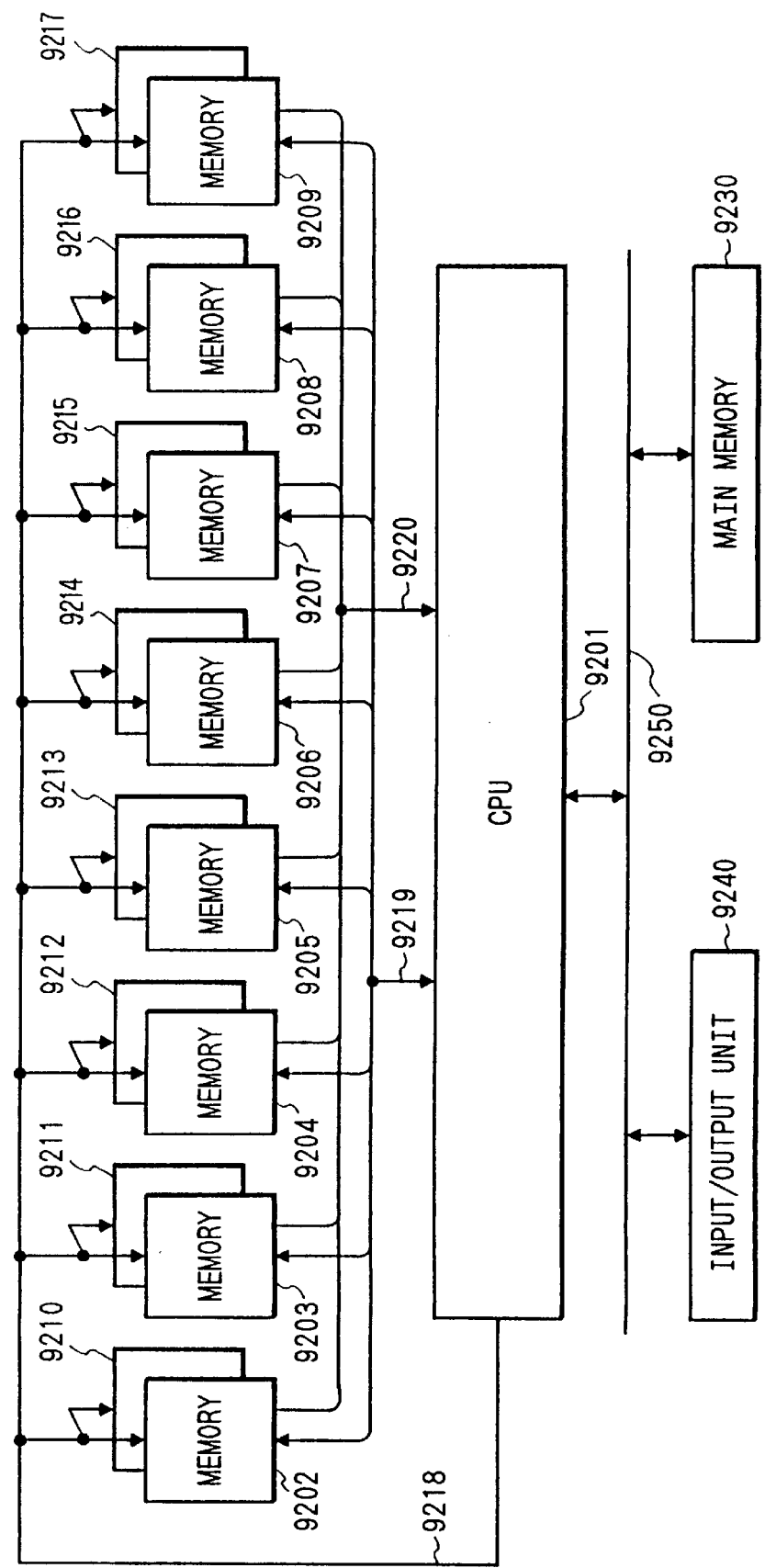
FIG. 17 is a schematic block diagram of a conventional processor.

FIG. 16 shows a further embodiment of the present invention. In FIG. 16, symbol 9101 represents a processor, 9102 represents a set judging section storing an address array, 9103 represents a set selecting section, 9107 to 9114 represent memories having a capacity of 1 M bits and a width of 8 bits used for a data array, 9106 represents a CPU, 9104 represents an input/output unit, and 9105 represents a main memory. The set judging section 9102, set selecting section 9103, and memories 9107 to 9114 constitute a two-set associative cache memory (the capacity per set is 0.5 M bytes) for data with a total capacity of 1 M bytes.

The processor 9101 transmits an address 9124 and a control signal 9125 for reading 8-byte data to the memories 9107 to 9114 and to the set judging section, and receives 8-byte data from the set selecting section. The memories 9107 to 9114 are connected to the data bus 9127. The bus 9127 includes one-byte buses 9127-1 to 9127-8. The memories 9107 to 9114 are connected to the buses 9127-1 to 9127-8, respectively. The memories 9107 to 9114, as described later, hold data for two sets and thereby transmit corresponding 8-byte data in the first set and corresponding 8-byte data in the second set to the set selecting section 9103 through the bus 9127 by dividing the overall data into two blocks. The set judging section 9102 receives the address 9124 from the processor 9101 and transmits a signal 9126 indicating which set to select to the set selecting section 9103 and a signal 9122 indicating whether a cache memory is hit to the processor 9101. The set selecting section 9103 selects the two-block data received through the bus 9127 in accordance with the signal 9126 sent from the set judging section 9102 and sends selected data to the processor 9101 through the bus 9121.

When writing 8-byte data, the processor 9101 outputs an address through the bus 9124 and sends data to the set selecting section 9103 through the bus 9121. The set selecting section 9103 sends received data to the memories 9107 to 9114 through the bus 9127. Thus, data is written in the memories 9107 to 9114 in accordance with the control signal 9125.

Moreover, the processor 9101 transfers data to and from the input/output unit 9104 and the main memory 9105 through the bus 9120. In the case of a cache memory error, the processor 9101 reads a desired block from the main memory 9105 through the bus 9120 and transfers it to the memories 9107 to 9114 through the buses 9121 and 9127.

Figure 18:
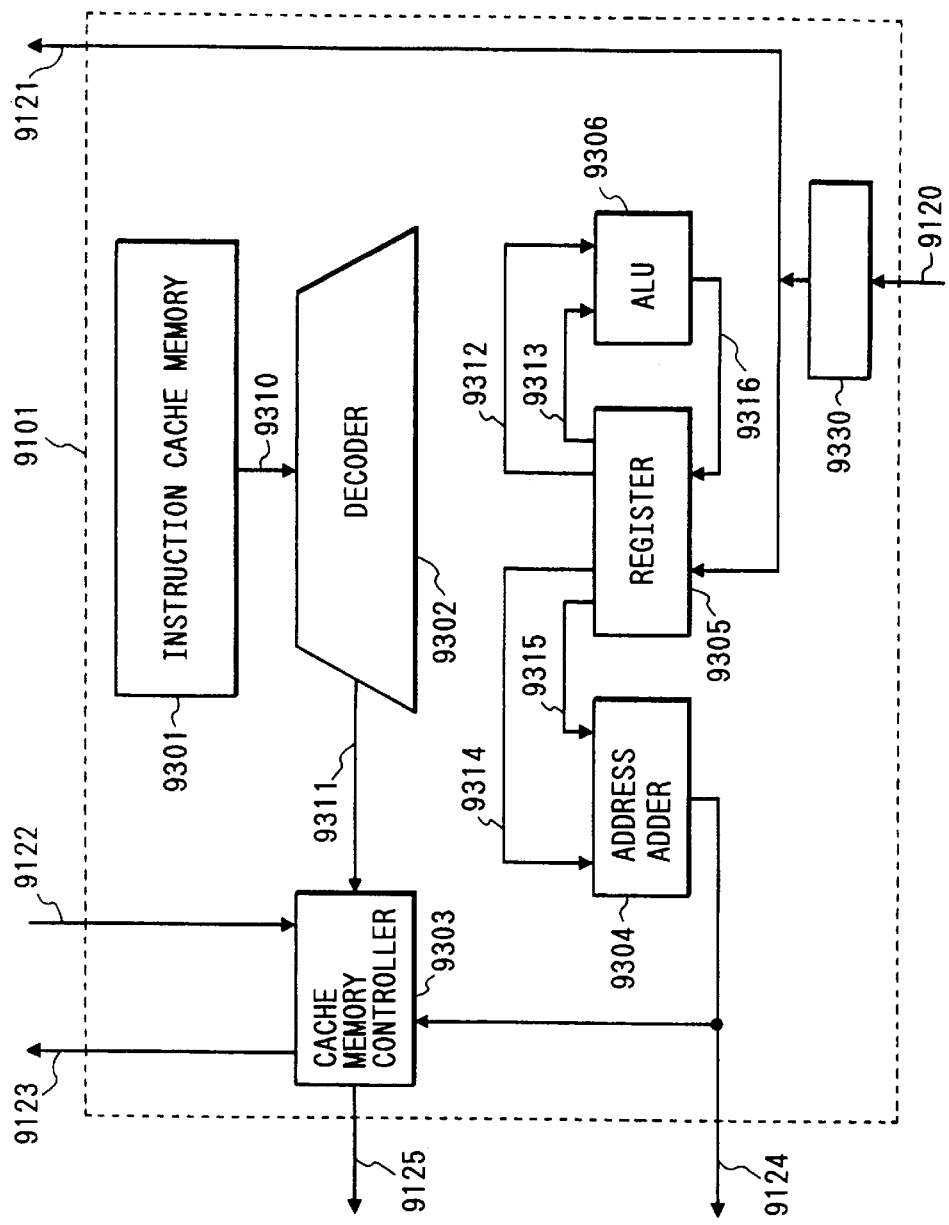
FIG. 18 is a schematic block diagram of the processor 9101 in FIG. 16.

FIG. 18 shows details of a first embodiment of the processor 9101 in FIG. 16. In FIG. 18, symbol 9301 represents an instruction cache memory, 9302 represents a decoder, 9303 represents a cache memory controller, 9305 represents a register, 9306 represents an ALU, 9304 represents an address adder, and 9303 represents a buffer. An instruction is transferred from the instruction cache memory 9301 to the decoder 9302 through a signal line 9310. The decoder 9302 controls the cache memory controller 9303 through a signal line 9311 and also controls the ALU 9306, register 9305, and address adder 9904. The ALU 9306 processes the data transferred from the buses 9312 and 9313 and writes the data in the register 9305 through the bus 9316. The address adder 9304 reads data from the register 9305 through the buses 9314 and 9315, computes an address to be loaded or stored, and outputs the result to the bus 9124. When loading the address, the adder 9304 incorporates data into the register 9305 from the bus 9121. When storing the address, the adder 9304 outputs data to the bus 9121 from the register 9305. When transferring data from a memory to a cache memory, the adder 9304 incorporates the data from the memory into the buffer 9330 and outputs the data to the bus 9121. The cache memory controller 9303 is started by the decoder 9302 and outputs the cache memory control signal 9125 to be loaded or stored. Moreover, the controller 9303 receives the cache memory hit signal 9122 and controls transfer of data from the main memory 9105 to the memories 9107 to 9114 in the case of a cache memory error. In this case, the controller 9303 enters necessary data in the set judging section 9102 through the bus 9123.

Figure 19:
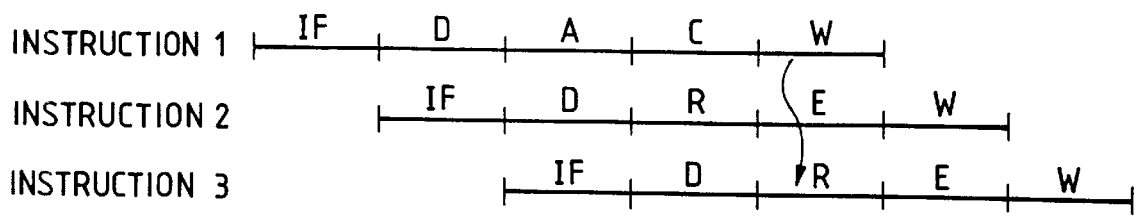
FIG. 19 is a diagram for explaining the pipeline operation of the processor 9101 in FIG. 16.

FIG. 19 is an illustration for explaining pipeline operations. In FIG. 19, an instruction 1 is a load instruction and instructions 2 and 3 are inter-register operation instructions. Symbol IF represents a instruction cache memory read stage, D represents a decode stage, A represents a register-read and address-computation stage, C represents a cache memory read stage, and W represents a register write stage. Symbol R represents a register read stage and E represents an operation stage in the ALU.

For the instruction 2, it is impossible to use the contents of a register loaded by the instruction 1. For the instruction 3, however, it is possible to use the contents written in a register at the stage W of the instruction 1 by reading the contents by the register at the stage R of the instruction 3.

Figure 20:
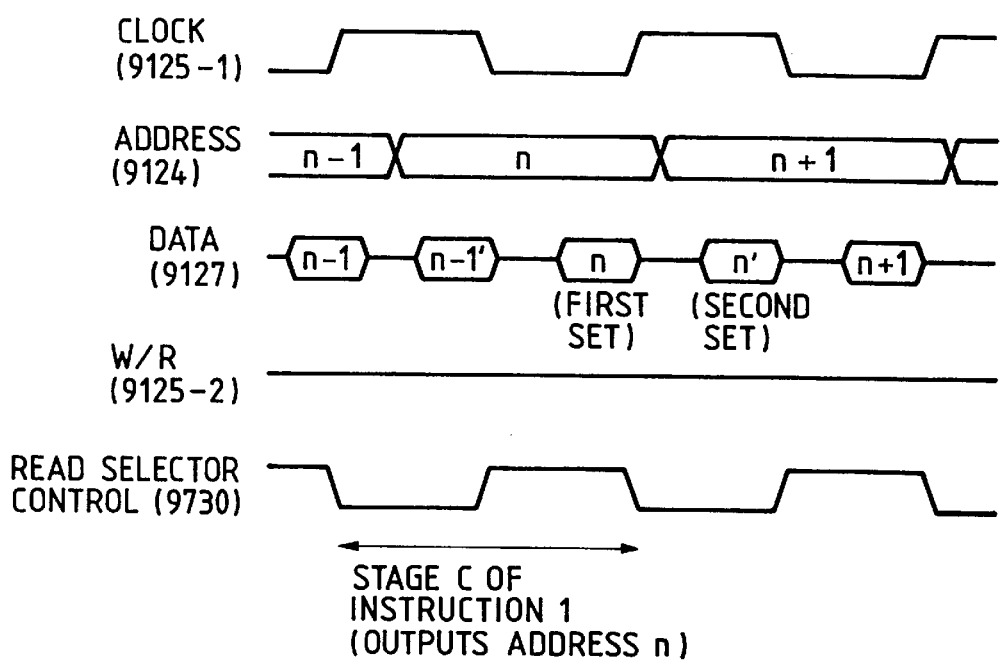
FIG. 20 is a timing diagram for memory operations for a data read operation.

FIG. 20 shows a timing chart for continuously executing the load instruction. The address 9124 changes in the sequence of "n−1", "n", and "n+1" every cycle and data n and data n' are sent to the data bus 9127 for the address n. The data is transferred twice every machine cycle. The control signal 9125 in FIG. 16 includes a clock 9125-1 and a read/write selection signal 9125-2 shown in FIG. 20. The data n is latched at the leading edge of the clock and the data n' is latched at the trailing edge of the clock.

Figure 21:
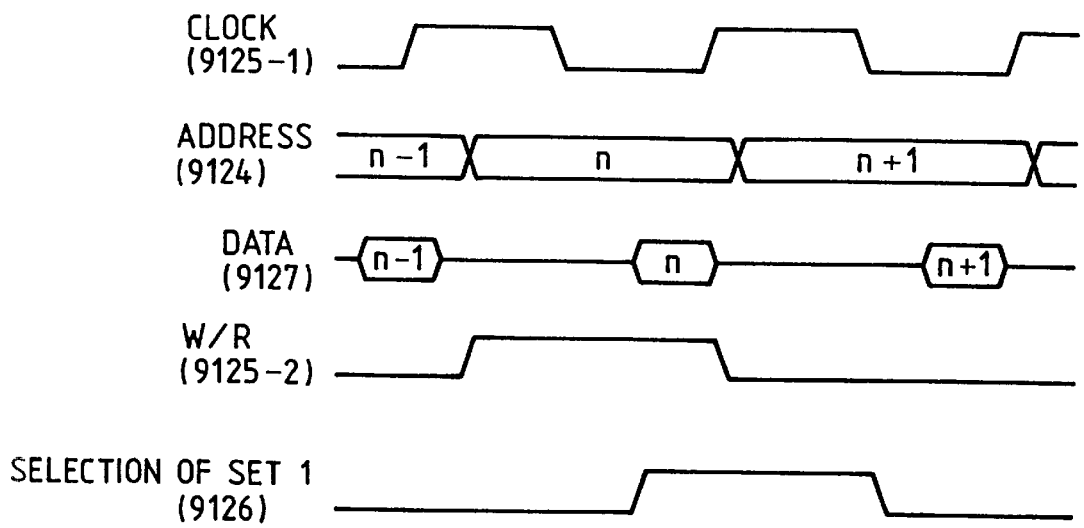
FIG. 21 is a timing diagram for memory operations for a data write operation.

FIG. 21 shows a timing chart when a store instruction is executed. The address n is the address of the store instruction while the data n is transmitted to the memory from the CPU through the data bus 9127. The read/write selection signal 9125-2 goes high for one cycle in order to indicate a data write operation.

Figure 22:
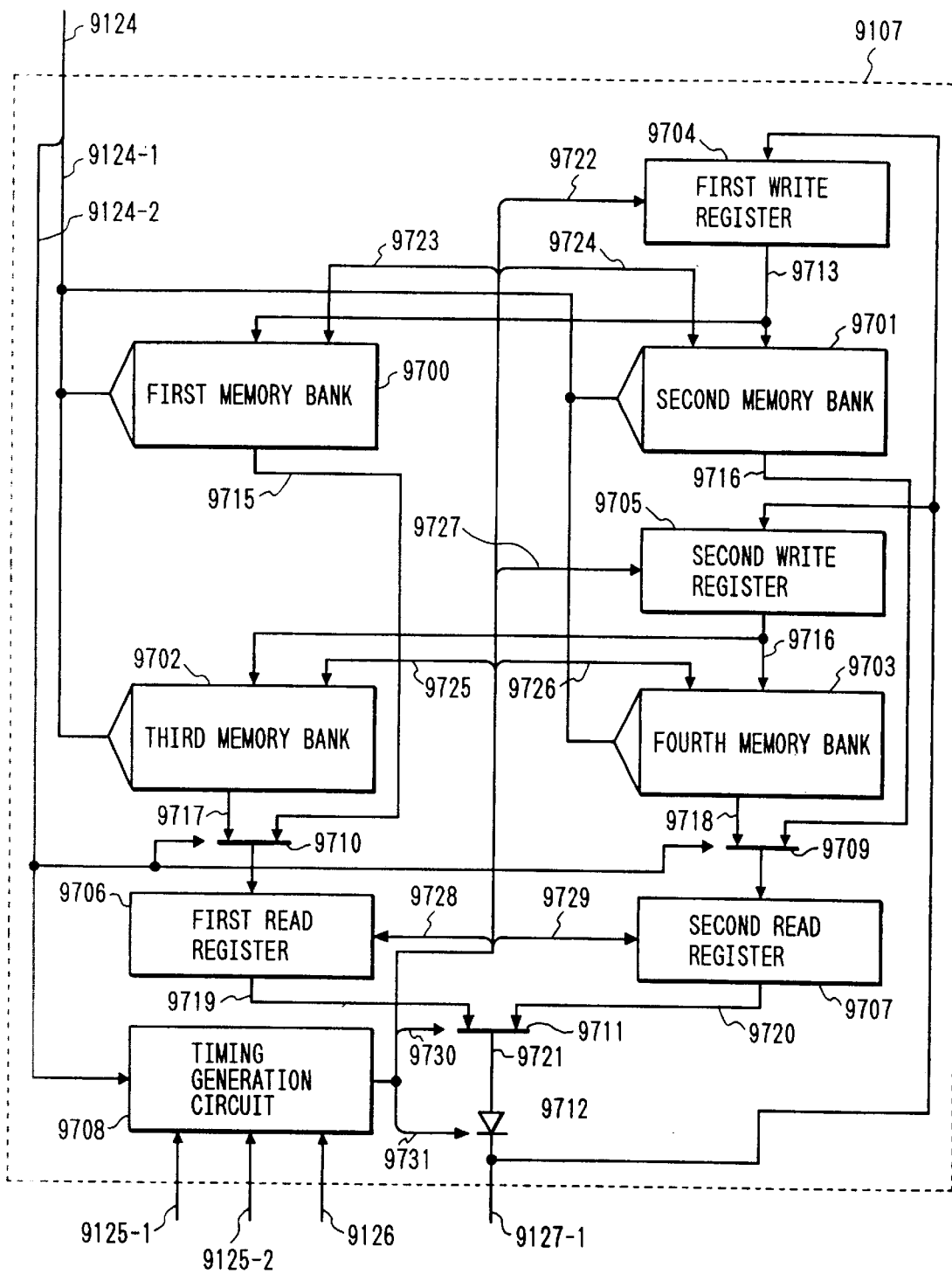
FIG. 22 is a block diagram of the memory 9107 in FIG. 16.

FIG. 22 shows details of the memory 9107. Though the constitution of only the memory 9107 is shown, the constitutions of the other memories 9108 to 9114 are the same. In FIG. 22, symbol 9700 represents a first memory bank, 9701 represents a second memory bank, 9703 represents a third memory bank, and 9703 represents a fourth memory bank. Symbol 9704 represents a first write register, 9705 represents a second write register, 9706 represents a first read register, and 9707 represents a second read operation. Symbols 9709, 9710, and 9711 represents selectors and 9712 represents a tri-state buffer. Symbol 9708 represents a timing generation circuit. The first memory bank 9700 and the third memory bank 9702 constitute a first set and the second memory bank 9701 and the fourth memory bank 9703 constitute a second set.

Figure 31:
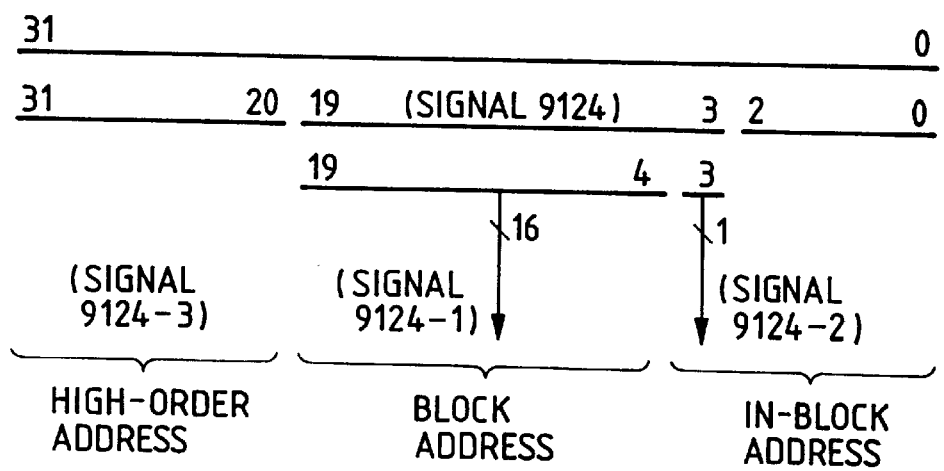
FIG. 31 is a diagram for explaining an address constitution.

The signal 9124 serves as an address input. FIG. 31 is an illustration for explaining an address constitution. An address is given for each byte and the block size is 16 bytes. Therefore, bits 0 to 3 serve as an in-block address and bits 4 to 19 serve as a block address. A signal 9124-1 in FIG. 32 corresponds to the bits 4 to 19, which is used as an address input of the memory banks 9700 to 9703. A signal 9124-2 corresponds to the bit 3, which indicates which eight bytes to read/write among 16 bytes of one block.

The following is a description of the read operation as performed by the memory 9107 in FIG. 22. Outputs of the first memory bank 9700 and the third memory bank 9702 are transmitted to the selector 9710 through the signals 9715 and 9717, respectively. The selector 9710 selects the signal 9715 when the signal 9124-2 is set to 0 and the signal 9717 when the signal 9124-2 is set to 1. Selected data is set to the first read register 9706 by the data read from the first set. Similarly, outputs of the second memory bank 9701 and the fourth memory bank 9703 are transmitted to the selector 9709 through signals 9716 and 9718, respectively. The selector 9709 selects the signal 9716 when the signal 9124-2 is set to 0 and the signal 9718 when the signal 9124-2 is set to 1. The selected data is set to the second read register 9707 by the data read from the second set. The contents of the first read register 9706 and those of the second read register 9707 are transmitted to the selector 9711 through signal lines 9719 and 9720. An output of the selector 9711 is transmitted to the tri-state buffer 9712, and the tri-state buffer 9712 drives the 8-bit bus 9127.

The set timing for the first read register 9706 and the second read register 9707, change timing of the selector 9711, and drive timing of the driver 9712 are controlled by the timing generation circuit 9708 through signals 9728, 9729, 9730, and 9731, respectively, as shown in FIG. 20. The signal 9730 selects the first read register 9706 when it is high and the second read register 9707 when it is low, which serves as a reverse signal to the clock, as shown in FIG. 20. The timing generation circuit 9708 generates a timing signal in accordance with the clock 9125-1 and read/write selection signal 9125-2. The following is a description of the write operation. Because data is driven through the bus 9127-1 in the case of a write operation, the data is set to the first write register 9704 or second write register 9705. A bank is selected by the timing generation circuit 9708 that transmits the set signal 9722 to the first write register 9704 or transmits the set signal 9727 to the second write register 9705 depending on the signal 9124-2. The data is set to the first write register 9704 when the signal 9124-2 is set to 0 and to the second write register 9705 when the signal 9124-2 is set to 1. An output of the first write register 9704 is transferred to the first memory bank 9700 or the second memory bank 9701 through the signal line 9713. An output of the second write register 9705 is transferred to the third memory bank 9702 or the fourth memory bank 9703 through the signal line 9714. The timing generation circuit 9708 generates write signals 9723 to 9726 for the memory banks 9700 to 9703. The timing generation circuit 9708, as shown in FIG. 21, controls the above timing in accordance with the clock 9125-1, read/write selection signal 9125-2, set selection signal 9126, and address 9124-2. The set selection signal represents the writing of data in the first set when it is high and writing of data in the second set when it is low. That is, the following expressions are logically obtained.

Signal 9723=Set selection signal*NOT(91242)*Read/write selection signal

Signal 9725=Set selection signal*9124-2*Read/write selection signal

Figure 23:
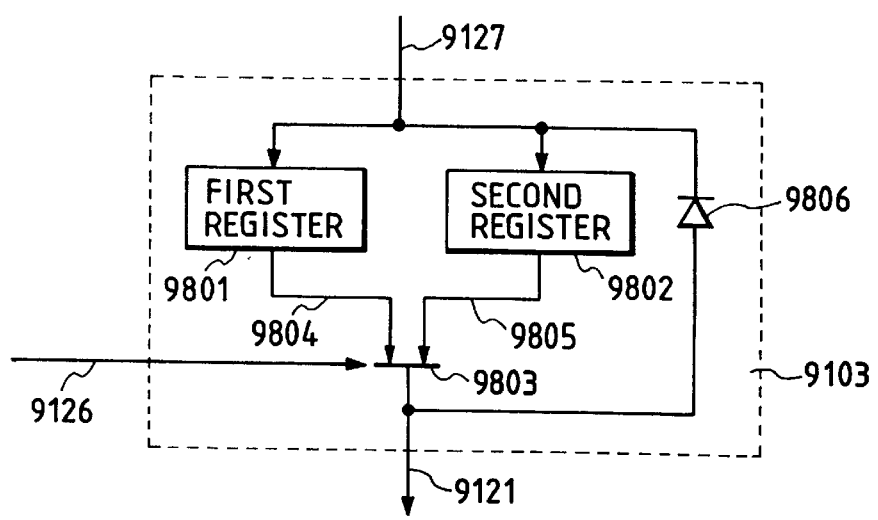
FIG. 23 is a schematic diagram of a first embodiment of the set selecting section 9103 in FIG. 16.

Signal 9724=NOT (Set selection signal)*NOT (9124-2) *Read/write selection signal Signal 9723=NOT (Set selection signal)*91242*Read/write selection signal FIG. 23 shows a first embodiment of the set selecting section 9103 in FIG. 16. In FIG. 23, symbol 9801 represents a first register, 9802 represents a second register, and 9806 represents a tri-state driver. Symbol 9803 represents a selector. In the case of a read operation, data of the first set, which is first sent through the bus 9127, is set to the first register 9801, and data of the second set, which is next sent through the bus 9127, is set to the second register 9802. The selector 9803 selects the output signal 9804 of the first register when the first set selection signal 9126 is set to 1 and the output signal 9805 of the second register when the signal 9126 is set to 0, and transmits either of the output signals to the processor 9101 through the signal 9121. In the case of a write operation, the selector 9803 transmits the data sent from the processor 9101 through the signal line 9121 to the bus 9127 by using the tri-state buffer 9806.

Figure 24:
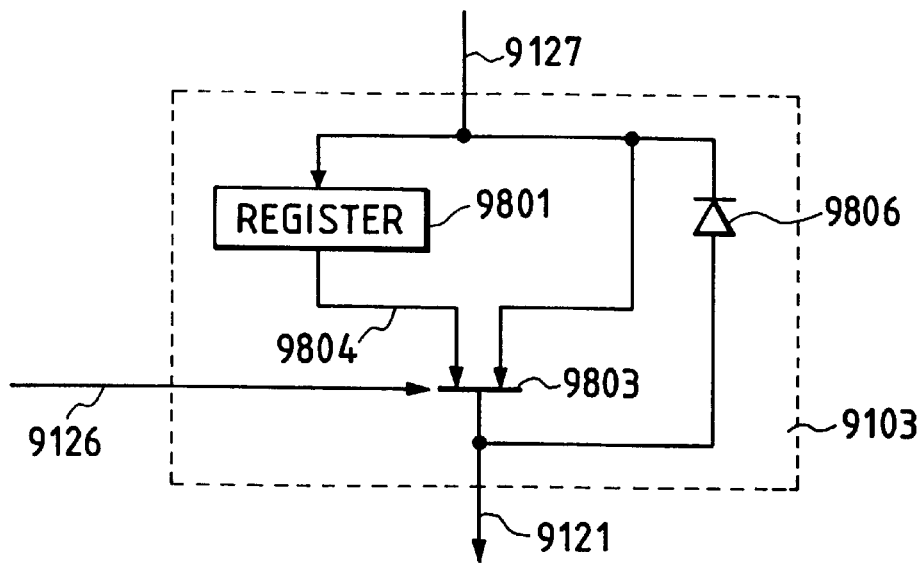
FIG. 24 is a schematic diagram of a second embodiment of the set selecting section 9103 in FIG. 16.

FIG. 24 shows a second embodiment of the set selecting section 9103 in FIG. 16. A part which is the same as that in FIG. 16 is provided with the same symbol. In FIG. 24, the second register is not used, though it is used in FIG. 23, and the selector 9803 directly inputs the data sent from the second set through the bus 9127. Thus, one register can be saved.

Figure 25:
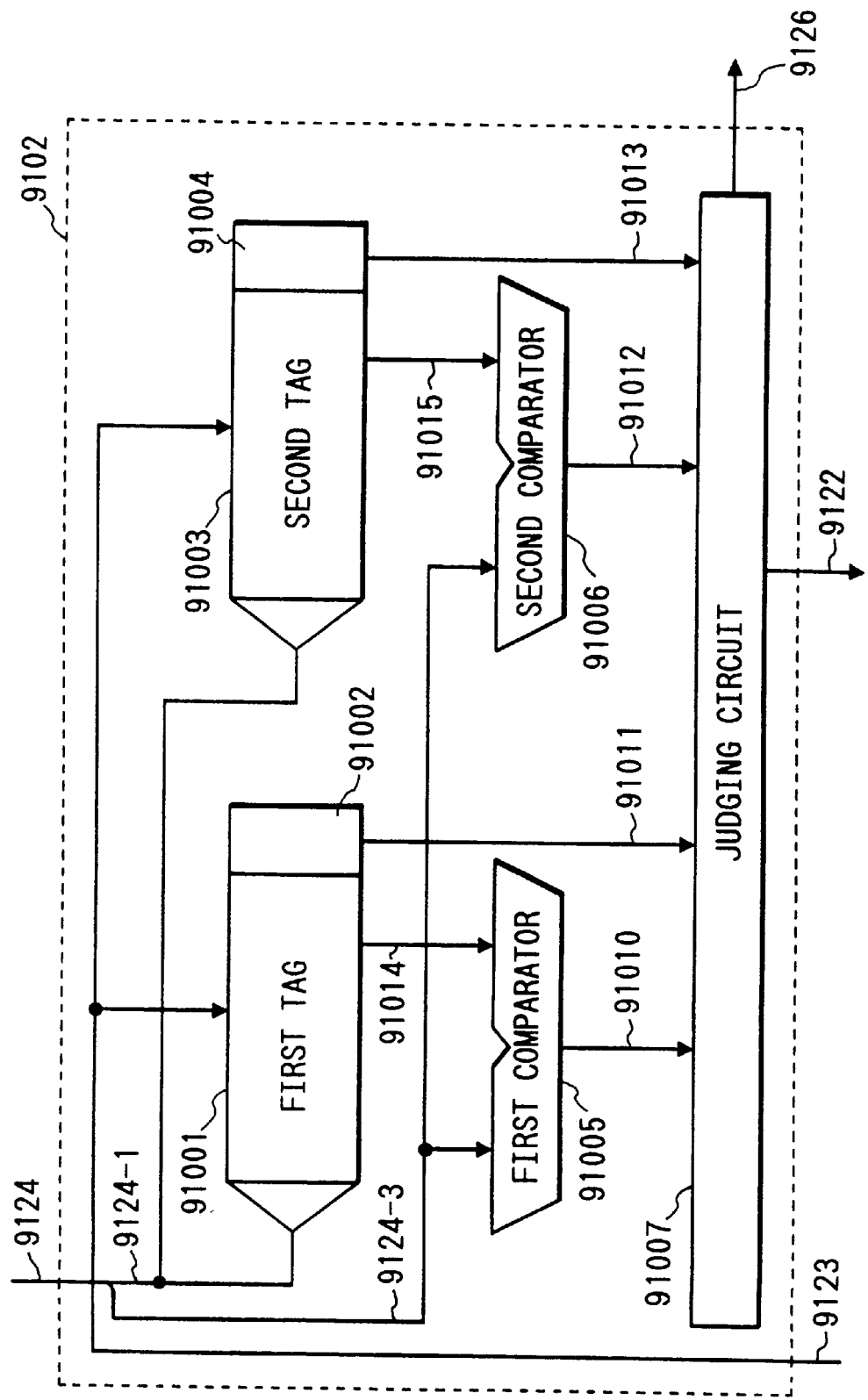
FIG. 25 is a schematic diagram of the set judging section 9102 in FIG. 16.

FIG. 25 shows details of the set judging section 9102 in FIG. 16. In FIG. 25, symbol 91001 represents a tag section of the first set, 91002 represents a valid bit section of the first set, 91003 represents a tag section of the second set, and 91004 represents a valid bit section of the second set. Symbols 91005 and 91006 represent comparators and 91007 represents a judging circuit. The first tag 91001, first valid bit 91002, second tag 91003, and second valid bit 91004 are read with an address 9124-1. The first comparator 91005 compares a signal 91014 sent from the first tag with an address 9124-3 and transmits a coincidence signal 91010 indicating whether they coincide to the judging circuit 91007. The hit position of the address 9124-3 is described in FIG. 31. Similarly, the second comparator 91006 compares a signal 91015 sent from the second tag with the address 9124-3 and transmits a coincidence signal indicating whether they coincide to the judging circuit 91007.

The judging circuit 91007 receives a coincidence signal 91010 from the first comparator 91005, a valid signal 91011 from the first valid bit section 91002, coincidence signal 91012 from the second comparator 91006, and a valid signal 91013 from the second valid bit section 91004, and selects the cache memory hit signal 9122 and the first set selection signal 9126. The circuit 91007 asserts the cache memory hit signal 9122 when either set is valid and a coincidence signal is asserted and asserts the first set selection signal 9126, when the signal 91010 is asserted and the signal 91011 is valid.

Figure 26:
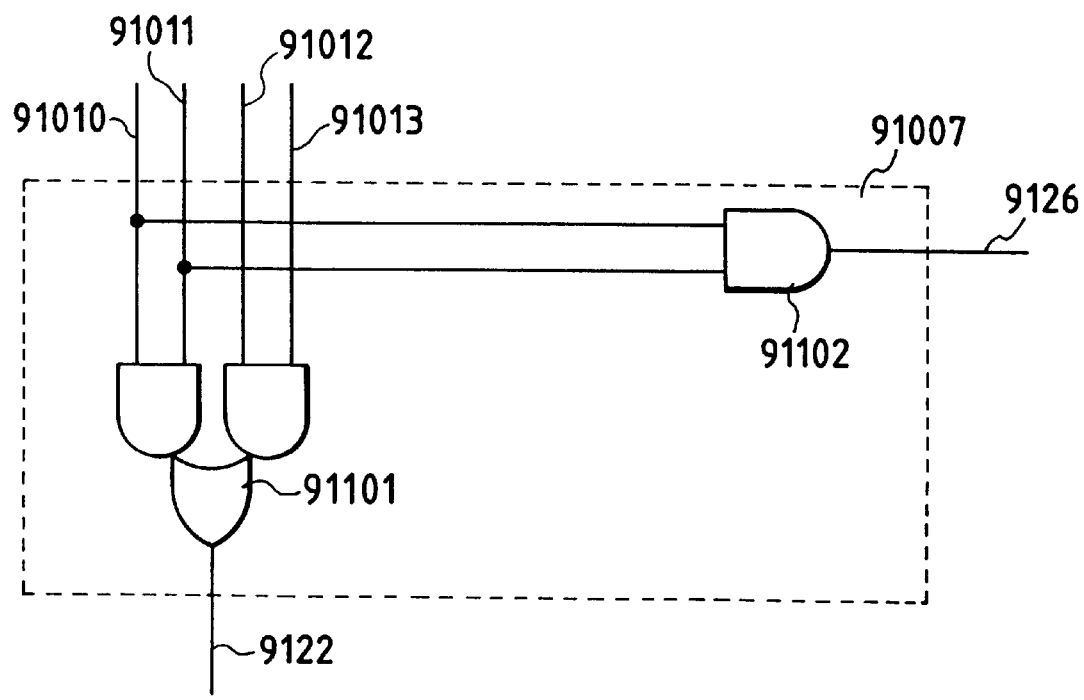
FIG. 26 is a schematic circuit diagram of the judging circuit 91007 in FIG. 25.

FIG. 26 shows details of the judging circuit in FIG. 25. In FIG. 26, symbol 91102 represents an AND gate and 91101 represents an AND-OR gate.

FIG. 27 shows a second embodiment of the processor 9101 in FIG. 16. A part which is the same as that in FIG. 18 showing the first embodiment of the processor 9101 is provided with the same symbol. The constitution in FIG. 27 is different from that in FIG. 18 in the fact that selectors 9330 and 9340 are used and data can be bypassed to the input of the ALU 9306 through the bus 9121. The decoder 9302 controls the selectors 9330 and 9340 by using signals 9331 and 9341.

Figure 28:
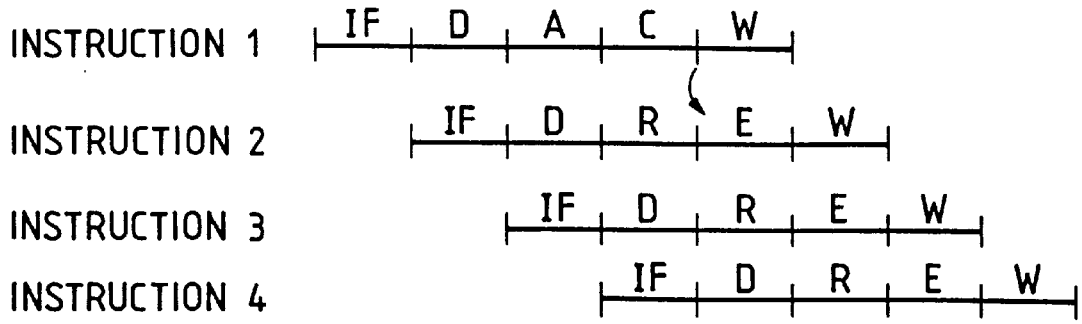
FIG. 28 is a diagram for explaining the pipeline operation of the processor 9101 in FIG. 27.

FIG. 28 is an illustration for explaining the pipeline operation of the processor shown in FIG. 27. Description of the pipeline operation is omitted because it is the same as that shown in FIG. 19. The pipeline operation shown in FIG. 28 is different from that shown in FIG. 19 in the fact that data loaded by the instruction 1 can be used for the instruction 2 by using the selectors 9330 and 9340 in FIG. 27.

Figure 29:
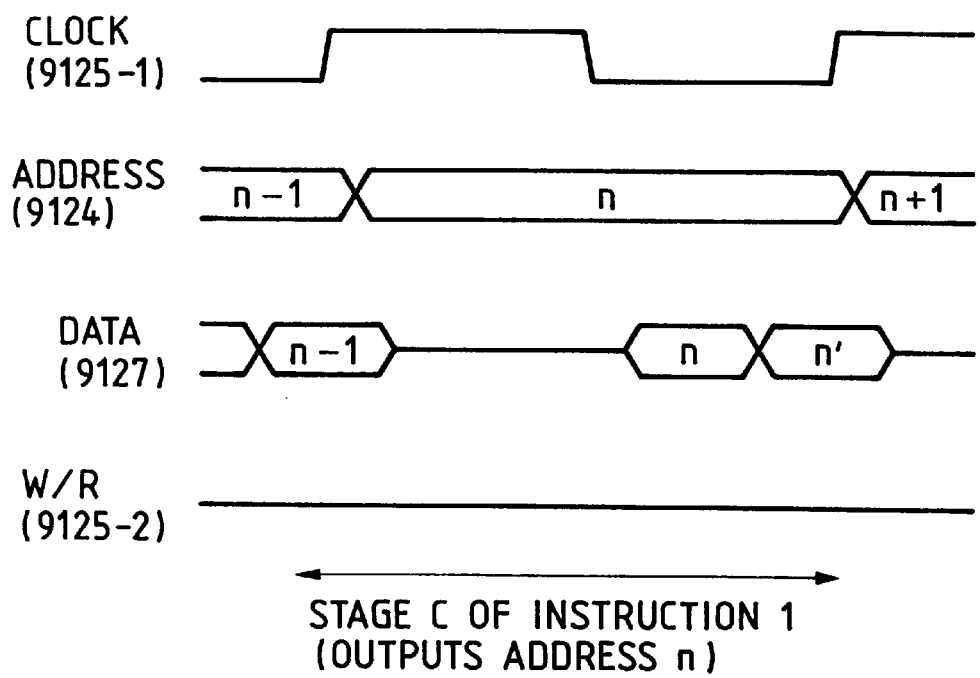
FIG. 29 is a timing diagram of memory operations for a data read operation.

FIG. 29 shows a timing chart of a memory for realizing the pipeline operation shown in FIG. 28. For this embodiment, the timing is more critical than that in FIG. 20 because the data n and the data n' must be returned in the cycle in which the address n appears.

In the case of the above-described second embodiment, the selectors 9330 and 9340 and their control are necessary and the memory access timing gets more critical. However, there is an advantage that loaded data can immediately be used by the next instruction.

Figure 32:
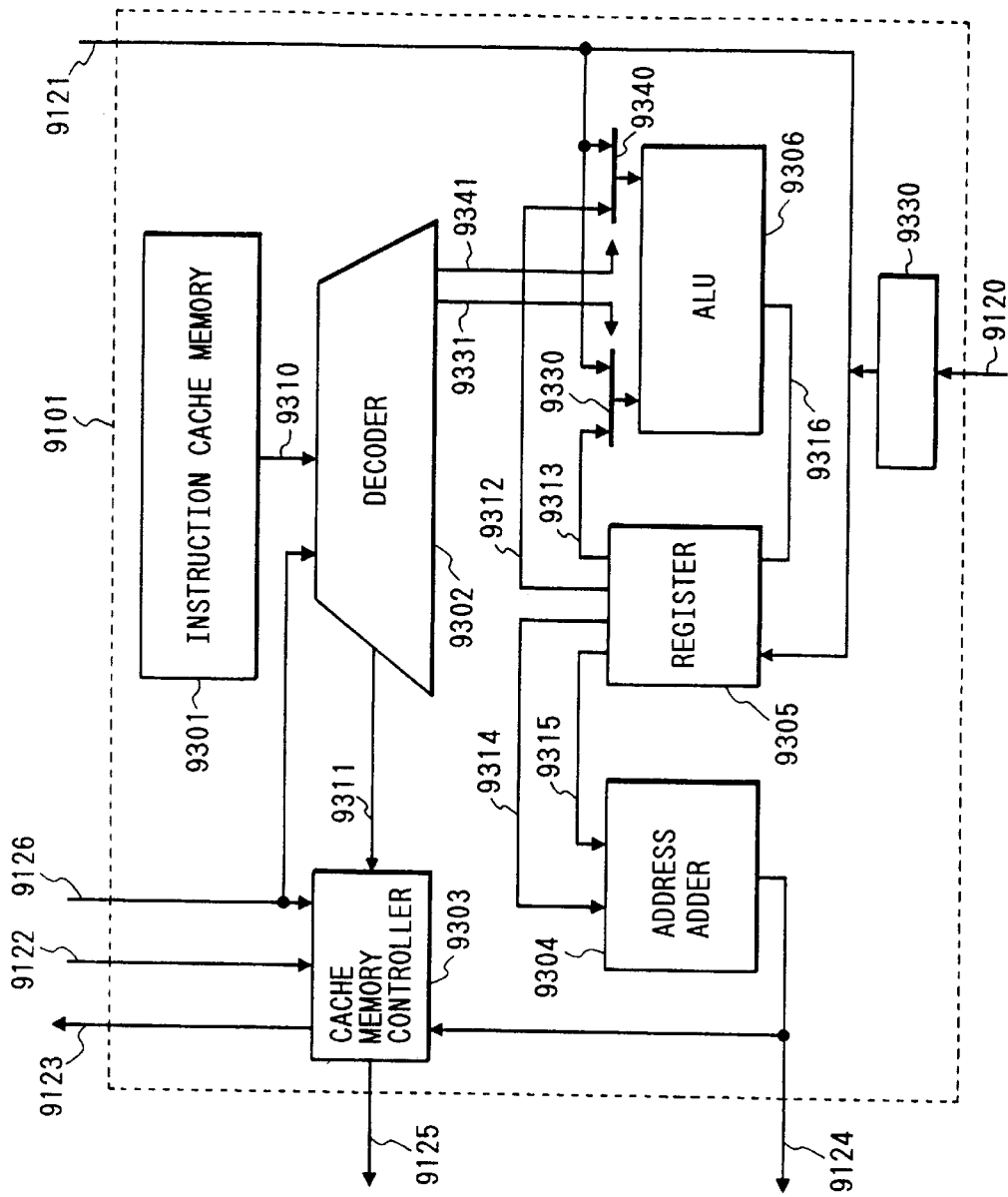
FIG. 32 is a schematic diagram of a third embodiment of the processor 9101 in FIG. 16.
Figure 33:
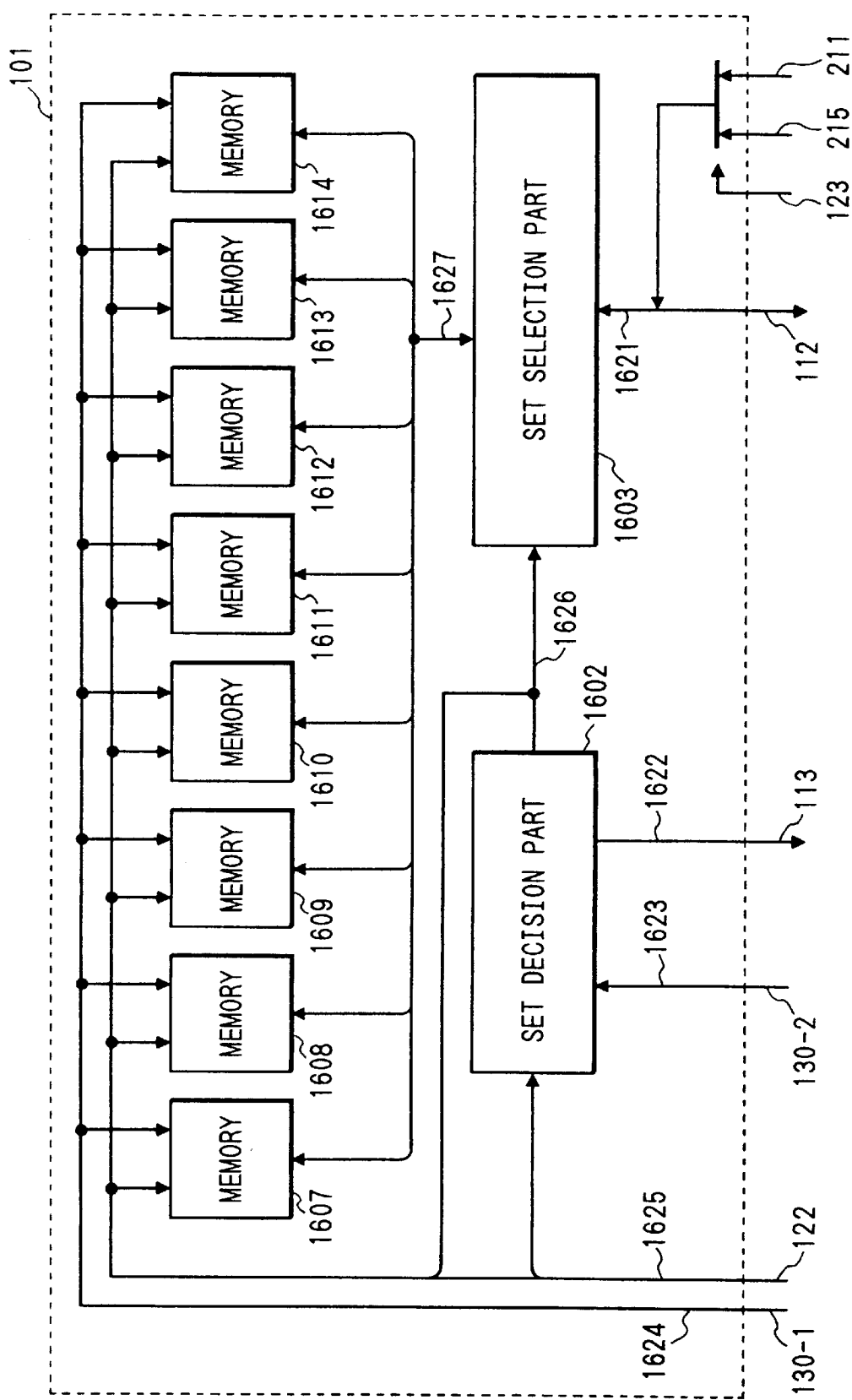
FIG. 33 is a schematic block diagram of a constitution including the first cache memory of FIG. 1 as a set associative type cache memory.

FIG. 32 shows a third embodiment of the processor 9101 in FIG. 16. The constitution shown in FIG. 32 is almost the same as that shown in FIG. 27 and the same part is provided with the same number. Therefore, the description thereof is omitted. The constitution of FIG. 32 is different from that shown in FIG. 27 in the fact that the set selection signal 9126 sent from the set judging section 9102 is also inputted to the decoder 9302.

Figure 30:
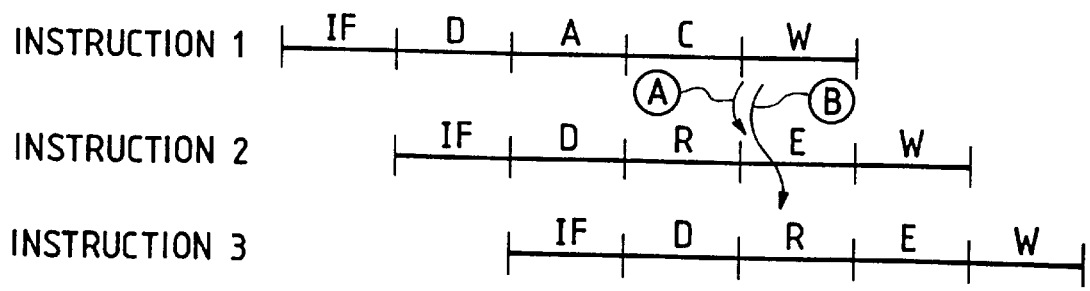
FIG. 30 is a diagram for explaining the pipeline operation of the processor 9101 in FIG. 32.

FIG. 30 shows the pipeline operation of the processor shown in FIG. 32. The memory timing in this embodiment is the same as that shown in FIG. 20. For the pipeline shown in FIG. 30, data is transferred to the ALU 9306 by the selector 9330 or 9340 for use as shown by the arrow A in FIG. 30 when the instruction 1 issues a load instruction and the first set is hit by the instruction 1. However, when the set 2 is hit by the instruction 1, the data cannot be used by the instruction 2, but it can be used by the instruction 3, as shown by the arrow B in FIG. 30. In this case, the data written at the stage W of the instruction 1 is used by reading it from a register at the stage R of the instruction 3. The third embodiment has an advantage that the data of the first set can immediately be used by the next instruction at the timing shown in FIG. 20, which is less severe than that in FIG. 29, by using the set selection signal 9126 and thereby controlling bypass control signals 9331 and 9341 by the decoder 9302.

The present invention makes it possible to decrease the number of memories necessary for a computer having m sets of associative cache memories up to 1/m smaller than the existing number of memories and therefore to decrease the price.

The present invention makes it possible to decrease the number of memories necessary for a computer having m sets of associative cache memories up to 1/m smaller than the existing number of memories and therefore to decrease the number of machine cycles. The present invention makes it possible to decrease the number of memories necessary for a computer having m sets of associative cache memories up to 1/m smaller than the existing number of memories and therefore to decrease the number of pins of a CPU.

What is claimed is:

1. A data processor comprising:

a main memory for storing data and instructions;

an instruction processor for processing said data in accordance with said instructions;

a cache memory part, connected between said main memory and said instruction processor, including a first cache memory and a second cache memory, said first cache memory having a large storage capacity and said second cache memory having a small storage capacity; and a controller, included in said cache memory part, which in response to an address to be accessed, selects one of said first and second cache memories and stores data into the selected cache memory, wherein said controller includes a storage having stored therein a plurality of addresses and information, each of said addresses being stored in corresponding relation to a portion of said information which indicates one of said first and second cache memories to be accessed, and wherein said controller in response to said address to be accessed refers to said portion of said information stored in said storage of said controller in corresponding relation to said address to be accessed and selects one of said first and second cache memories indicated by said portion of said information.

2. A data processor comprising:

a main memory for storing data and instructions;

an instruction processor for processing said data in accordance with said instructions;

a cache memory part, connected between said main memory and said instruction processor, including a first cache memory and a second cache memory, said first cache memory and said second cache memory having a different storage capacities; and a controller, included in said cache memory part, which in response to an address to be accessed, selects one of said first and second cache memories and stores data into the selected cache memory, wherein said controller includes a storage having stored therein a plurality of addresses and information, each of said addresses being stored in corresponding relation to a portion of said information which indicates one of said first and second cache memories to be accessed, and wherein said controller in response to said address to be accessed refers to said portion of said information stored in said storage of said controller in corresponding relation to said address to be accessed and selects one of said first and second cache memories indicated by said portion of said information.

\* \* \* \* \*